Nov. 17, 1964 H. W. COCHRANE 3,157,779
CORE MATRIX CALCULATOR
Filed June 28, 1960
46 Sheets-Sheet 1

INVENTOR
HARRY W. COCHRANE
BY
Murray Nanes
ATTORNEY

Nov. 17, 1964 H. W. COCHRANE 3,157,779

CORE MATRIX CALCULATOR

Filed June 28, 1960 46 Sheets-Sheet 3

Nov. 17, 1964 H. W. COCHRANE 3,157,779

CORE MATRIX CALCULATOR

Filed June 28, 1960 46 Sheets-Sheet 4

FIG. 3 ALPHA-NUMERIC CODE

| CHARACTER | EQUIVALENT CARD CODE REPRESENTATION | | CHARACTER CODE | | | | | | | | | |
|---|---|---|---|---|---|---|---|---|---|---|---|---|
| | | | CHARACTER ZONE | | | | | CHARACTER DIGIT | | | | |
| NUMERIC | ZONE | DIGIT | 0 | 1 | 2 | 3 | 6 | 0 | 1 | 2 | 3 | 6 |
| 0 | – | 0 | – | – | – | – | – | 1 | 0 | 0 | 1 | 0 |
| 1 | – | 1 | – | – | – | – | – | 1 | 1 | 0 | 0 | 0 |
| 2 | – | 2 | – | – | – | – | – | 1 | 0 | 1 | 0 | 0 |
| 3 | – | 3 | – | – | – | – | – | 0 | 1 | 1 | 0 | 0 |
| 4 | – | 4 | – | – | – | – | – | 0 | 1 | 0 | 1 | 0 |
| 5 | – | 5 | – | – | – | – | – | 0 | 0 | 1 | 1 | 0 |
| 6 | – | 6 | – | – | – | – | – | 1 | 0 | 0 | 0 | 1 |
| 7 | – | 7 | – | – | – | – | – | 0 | 1 | 0 | 0 | 1 |
| 8 | – | 8 | – | – | – | – | – | 0 | 0 | 1 | 0 | 1 |
| 9 | – | 9 | – | – | – | – | – | 0 | 0 | 0 | 1 | 1 |
| ALPHABETIC | | | CHARACTER ZONE | | | | | CHARACTER DIGIT | | | | |
| | | | 0 | 1 | 2 | 3 | 6 | 0 | 1 | 2 | 3 | 6 |
| A | 0 | 1 | 1 | 0 | 0 | 1 | 0 | 1 | 1 | 0 | 0 | 0 |
| B | 0 | 2 | 1 | 0 | 0 | 1 | 0 | 1 | 0 | 1 | 0 | 0 |
| C | 0 | 3 | 1 | 0 | 0 | 1 | 0 | 0 | 1 | 1 | 0 | 0 |
| D | 0 | 4 | 1 | 0 | 0 | 1 | 0 | 0 | 1 | 0 | 1 | 0 |
| E | 0 | 5 | 1 | 0 | 0 | 1 | 0 | 0 | 0 | 1 | 1 | 0 |
| F | 0 | 6 | 1 | 0 | 0 | 1 | 0 | 1 | 0 | 0 | 0 | 1 |
| G | 0 | 7 | 1 | 0 | 0 | 1 | 0 | 0 | 1 | 0 | 0 | 1 |
| H | 0 | 8 | 1 | 0 | 0 | 1 | 0 | 0 | 0 | 1 | 0 | 1 |
| I | 0 | 9 | 1 | 0 | 0 | 1 | 0 | 0 | 0 | 0 | 1 | 1 |
| J | 1 | 1 | 1 | 1 | 0 | 0 | 0 | 1 | 1 | 0 | 0 | 0 |
| K | 1 | 2 | 1 | 1 | 0 | 0 | 0 | 1 | 0 | 1 | 0 | 0 |
| L | 1 | 3 | 1 | 1 | 0 | 0 | 0 | 0 | 1 | 1 | 0 | 0 |
| M | 1 | 4 | 1 | 1 | 0 | 0 | 0 | 0 | 1 | 0 | 1 | 0 |
| N | 1 | 5 | 1 | 1 | 0 | 0 | 0 | 0 | 0 | 1 | 1 | 0 |
| O | 1 | 6 | 1 | 1 | 0 | 0 | 0 | 1 | 0 | 0 | 0 | 1 |
| P | 1 | 7 | 1 | 1 | 0 | 0 | 0 | 0 | 1 | 0 | 0 | 1 |
| Q | 1 | 8 | 1 | 1 | 0 | 0 | 0 | 0 | 0 | 1 | 0 | 1 |
| R | 1 | 9 | 1 | 1 | 0 | 0 | 0 | 0 | 0 | 0 | 1 | 1 |
| S | 2 | 2 | 1 | 0 | 1 | 0 | 0 | 1 | 0 | 1 | 0 | 0 |
| T | 2 | 3 | 1 | 0 | 1 | 0 | 0 | 0 | 1 | 1 | 0 | 0 |
| U | 2 | 4 | 1 | 0 | 1 | 0 | 0 | 0 | 1 | 0 | 1 | 0 |
| V | 2 | 5 | 1 | 0 | 1 | 0 | 0 | 0 | 0 | 1 | 1 | 0 |
| W | 2 | 6 | 1 | 0 | 1 | 0 | 0 | 1 | 0 | 0 | 0 | 1 |
| X | 2 | 7 | 1 | 0 | 1 | 0 | 0 | 0 | 1 | 0 | 0 | 1 |
| Y | 2 | 8 | 1 | 0 | 1 | 0 | 0 | 0 | 0 | 1 | 0 | 1 |
| Z | 2 | 9 | 1 | 0 | 1 | 0 | 0 | 0 | 0 | 0 | 1 | 1 |

FIG. 4A

INSTRUCTION WORD FORMAT

| | SIGN | OP (OPERATION CODE) | | MASK - SHIFT | | DATA ADDRESS | | | | INDEX WORD ADDRESS | |
|---|---|---|---|---|---|---|---|---|---|---|---|
| DIGIT POSITION | 11 | 10 | 9 | 8 | 7 | 6 | 5 | 4 | 3 | 2 | 1 |
| CHARACTER BIT CODE (2 OUT OF 5) | 0 1 2 3 6 | 0 1 2 3 6 | 0 1 2 3 6 | 0 1 2 3 6 | 0 1 2 3 6 | 0 1 2 3 6 | 0 1 2 3 6 | 0 1 2 3 6 | 0 1 2 3 6 | 0 1 2 3 6 | 0 1 2 3 6 |

FIG. 4B

INDEX WORD FORMAT

| | SIGN | NOT USED | | | | INDEX WORD | | | | NOT USED | |
|---|---|---|---|---|---|---|---|---|---|---|---|
| DIGIT POSITION | 11 | 10 | 9 | 8 | 7 | 6 | 5 | 4 | 3 | 2 | 1 |
| CHARACTER BIT CODE (2 OUT OF 5) | 0 1 2 3 6 | 0 1 2 3 6 | 0 1 2 3 6 | 0 1 2 3 6 | 0 1 2 3 6 | 0 1 2 3 6 | 0 1 2 3 6 | 0 1 2 3 6 | 0 1 2 3 6 | 0 1 2 3 6 | 0 1 2 3 6 |

FIG. 4C

DATA WORD FORMAT

| | SIGN | | | | | | | | | | |
|---|---|---|---|---|---|---|---|---|---|---|---|
| DIGIT POSITION | 11 | 10 | 9 | 8 | 7 | 6 | 5 | 4 | 3 | 2 | 1 |
| CHARACTER BIT CODE (2 OUT OF 5) | 0 1 2 3 6 | 0 1 2 3 6 | 0 1 2 3 6 | 0 1 2 3 6 | 0 1 2 3 6 | 0 1 2 3 6 | 0 1 2 3 6 | 0 1 2 3 6 | 0 1 2 3 6 | 0 1 2 3 6 | 0 1 2 3 6 |

Nov. 17, 1964 H. W. COCHRANE 3,157,779

CORE MATRIX CALCULATOR

Filed June 28, 1960 46 Sheets-Sheet 7

ONE DIGIT POSITION OF TOTAL SUM GENERATOR

Nov. 17, 1964 H. W. COCHRANE 3,157,779

CORE MATRIX CALCULATOR

Filed June 28, 1960 46 Sheets-Sheet 9

Nov. 17, 1964 H. W. COCHRANE 3,157,779

CORE MATRIX CALCULATOR

Filed June 28, 1960 46 Sheets-Sheet 10

Nov. 17, 1964 H. W. COCHRANE 3,157,779

CORE MATRIX CALCULATOR

Filed June 28, 1960 46 Sheets-Sheet 11

Nov. 17, 1964 H. W. COCHRANE 3,157,779

CORE MATRIX CALCULATOR

Filed June 28, 1960 46 Sheets-Sheet 12

Nov. 17, 1964

H. W. COCHRANE 3,157,779

CORE MATRIX CALCULATOR

Filed June 28, 1960

46 Sheets-Sheet 17

Nov. 17, 1964 H. W. COCHRANE 3,157,779

CORE MATRIX CALCULATOR

Filed June 28, 1960 46 Sheets-Sheet 18

Nov. 17, 1964 H. W. COCHRANE 3,157,779

CORE MATRIX CALCULATOR

Filed June 28, 1960

46 Sheets-Sheet 19

Nov. 17, 1964 H. W. COCHRANE 3,157,779

CORE MATRIX CALCULATOR

Filed June 28, 1960

46 Sheets-Sheet 21

Nov. 17, 1964 H. W. COCHRANE 3,157,779

CORE MATRIX CALCULATOR

Filed June 28, 1960 46 Sheets-Sheet 24

Nov. 17, 1964 H. W. COCHRANE 3,157,779

CORE MATRIX CALCULATOR

Filed June 28, 1960

46 Sheets-Sheet 25

FIG. 16
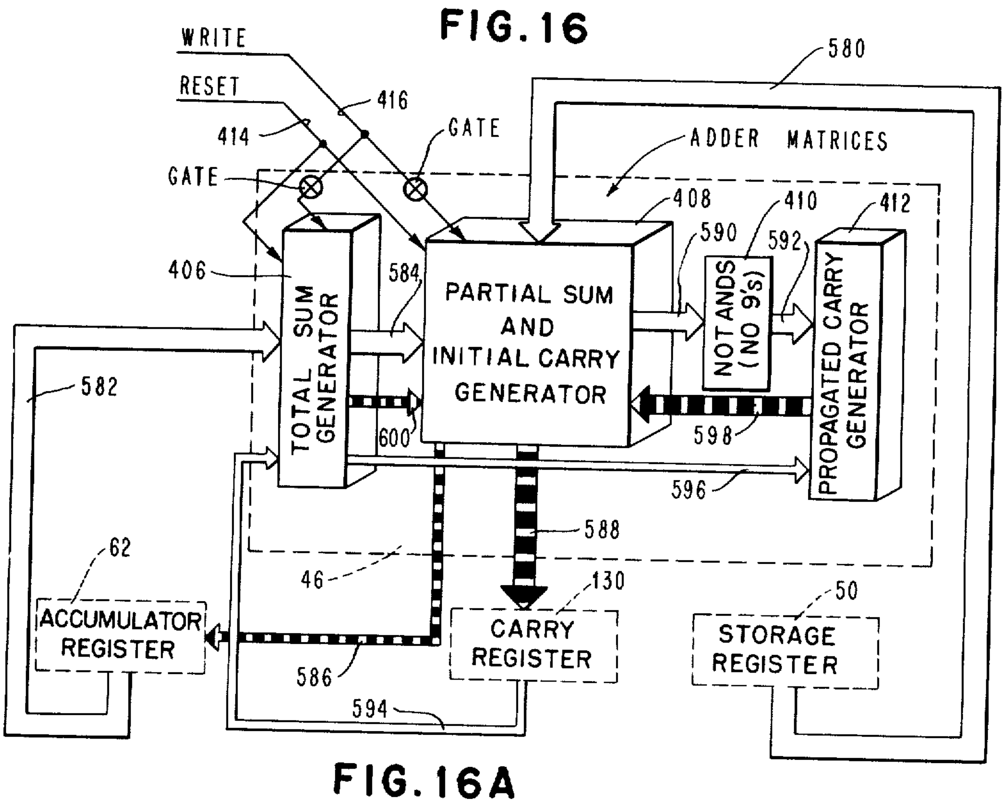
FIG. 16A
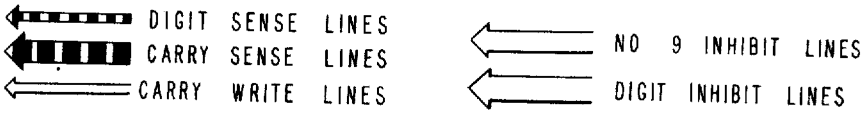
FIG. 19
| | 0 | 1 | 2 | 3 | 4 | 5 | 6 | 7 | 8 | 9 |
|---|---|---|---|---|---|---|---|---|---|---|
| 0 | 0 | 1 | 2 | 3 | 4 | 5 | 6 | 7 | 8 | 9 |
| 1 | 1 | 2 | 3 | 4 | 5 | 6 | 7 | 8 | 9 | 10 |
| 2 | 2 | 3 | 4 | 5 | 6 | 7 | 8 | 9 | 10 | 11 |
| 3 | 3 | 4 | 5 | 6 | 7 | 8 | 9 | 10 | 11 | 12 |
| 4 | 4 | 5 | 6 | 7 | 8 | 9 | 10 | 11 | 12 | 13 |
| 5 | 5 | 6 | 7 | 8 | 9 | 10 | 11 | 12 | 13 | 14 |
| 6 | 6 | 7 | 8 | 9 | 10 | 11 | 12 | 13 | 14 | 15 |
| 7 | 7 | 8 | 9 | 10 | 11 | 12 | 13 | 14 | 15 | 16 |
| 8 | 8 | 9 | 10 | 11 | 12 | 13 | 14 | 15 | 16 | 17 |
| 9 | 9 | 10 | 11 | 12 | 13 | 14 | 15 | 16 | 17 | 18 |

Nov. 17, 1964 H. W. COCHRANE 3,157,779

CORE MATRIX CALCULATOR

Filed June 28, 1960

46 Sheets-Sheet 27

Nov. 17, 1964 H. W. COCHRANE 3,157,779

CORE MATRIX CALCULATOR

Filed June 28, 1960 46 Sheets-Sheet 28

Nov. 17, 1964 H. W. COCHRANE 3,157,779

CORE MATRIX CALCULATOR

Filed June 28, 1960

46 Sheets-Sheet 29

Nov. 17, 1964 H. W. COCHRANE 3,157,779

CORE MATRIX CALCULATOR

Filed June 28, 1960 46 Sheets-Sheet 32

Nov. 17, 1964 H. W. COCHRANE 3,157,779

CORE MATRIX CALCULATOR

Filed June 28, 1960

46 Sheets-Sheet 33

Nov. 17, 1964 H. W. COCHRANE 3,157,779

CORE MATRIX CALCULATOR

Filed June 28, 1960

46 Sheets-Sheet 34

Nov. 17, 1964 H. W. COCHRANE 3,157,779

CORE MATRIX CALCULATOR

Filed June 28, 1960 46 Sheets-Sheet 35

Nov. 17, 1964 H. W. COCHRANE 3,157,779

CORE MATRIX CALCULATOR

Filed June 28, 1960

46 Sheets-Sheet 36

Nov. 17, 1964 H. W. COCHRANE 3,157,779

CORE MATRIX CALCULATOR

Filed June 28, 1960 46 Sheets-Sheet 38

Nov. 17, 1964 H. W. COCHRANE 3,157,779

CORE MATRIX CALCULATOR

Filed June 28, 1960 46 Sheets-Sheet 40

Nov. 17, 1964 H. W. COCHRANE 3,157,779

CORE MATRIX CALCULATOR

Filed June 28, 1960 46 Sheets-Sheet 42

Nov. 17, 1964

H. W. COCHRANE 3,157,779

CORE MATRIX CALCULATOR

Filed June 28, 1960

46 Sheets-Sheet 43

Nov. 17, 1964

H. W. COCHRANE 3,157,779

CORE MATRIX CALCULATOR

Filed June 28, 1960

46 Sheets-Sheet 44

Nov. 17, 1964 H. W. COCHRANE 3,157,779

CORE MATRIX CALCULATOR

Filed June 28, 1960 46 Sheets-Sheet 45

United States Patent Office 3,157,779

Patented Nov. 17, 1964

3,157,779

CORE MATRIX CALCULATOR

Harry W. Cochrane, Poughkeepsie, N.Y., assignor to International Business Machines Corporation, New York, N.Y., a corporation of New York Filed June 28, 1960, Ser. No. 39,315
14 Claims. (Cl. 235—157)

This invention relates to information handling and data processing machines or devices and more particularly to program controlled central data processing systems and methods of data processing for digital computers.

General objects of the invention are to increase computer performance per unit cost, to increase speed of operation, reduce unit costs, and improve reliability of operation particularly in computers of the type that employ stored programs and which may be controlled by standard programming methods.

A specific object is to improve the design of core matrices for use in computers, making the matrices simpler, more compact and less costly to assemble.

Another object is to reduce the amount of auxiliary apparatus required in the operation of a plurality of core matrices or other devices for performing logic and arithmetic, e.g., to reduce the number of core drivers, switching circuits, gating circuits, etc., required to operate the cores or other functional elements.

A further object is to relax requirements for precise values of voltage or current in a power supply system for a computer by providing wider operating margins for various components in the system.

Still another object is to reduce the level of noise currents in critical portions of the system by electronically disconnecting units of the system that are temporarily not in active use.

A feature of the invention is an extended use of core matrices in arithmetic and logic operations as well as in memory units and in programming, including branch programming.

Another feature is time sharing of auxiliary apparatus such as core drivers, switching circuits, gating circuits, etc., by various functional portions of the system. Further examples of time sharing include a single set of sense amplifiers, single sets of inhibit drivers, inhibit switches, central control devices, etc., and lines therefor, which are time shared by a plurality of the functional matrices in the computer.

A further feature is a provision for writing information into the system through an input buffer which is permanently connected to a set of sense lines, there being gating circuits arranged to connect, at times, the sense lines to a storage register for supplying information to it, the input buffer being actuated to receive information only during intervals when the sense lines are temporarily disconnected from the storage register, which latter may be handling unrelated information at the time.

These and other features make for a condition in which there are fewer components subject to possible failure and there are fewer soldered connections and mechanical connections required compared with other apparatus performing a comparable function.

The apparatus and methods disclosed afford great flexibility of use, resulting from the various special features described herein.

A specific feature is an improved adder and method of addition.

Another feature is a propagated carry generator.

Further features comprise apparatus and methods for multiplying and dividing.

Still further features include improved column shift and masking arrangements.

Other specific features include a special 2-out-of-5-bit code for representing either numeric or alphabetic characters.

The core matrices described herein are characterized by ease of assembly and by adaptability to automated assembly methods.

The computer described herein is characterized by well-defined paths for the flow of instructions, data and controls, a feature which makes the system easy to learn and to teach to others as well as easy to service. There are two main data paths which are under constant surveillance of error detection circuits.

The apparatus and methods described herein are adaptable to use in small-scale as well as large-scale systems, being expandable to meet the needs of systems of various sizes.

By speeding up operation and reducing unit cost, the invention tends to make feasible and economical many complex operations of types that previously required excessive lengths of time to perform or required too costly equipment.

A core matrix as used herein is a group of magnetic cores which are interlinked by a plurality of conductors, each of which conductors is coupled to one or more of the cores in the group.

A core or magnetic core as used herein is composed of magnetic material which exhibits a hysteresis effect. In one typical form, such a core may be employed as a bistable device. Thus if driven magnetically in one direction, as by means of one or more conductors coupled to the core, it will assume one magnetized state and will remain substantially indefinitely in that state until, by the application of sufficient magnetizing force in the opposite sense, as by means of the same or other conductors, it may be driven magnetically in the opposite direction. The transition from one state to the other will produce, in any conductor coupled to the core, a useful output signal of one polarity or the other depending upon the direction of the transition. The two stable states of such a core may be used to represent respective items of information; for example, one state may be used to represent the binary digit "one" and the other state may be used to represent the binary digit "zero."

Although magnetic cores have been illustrated herein for use as storage elements in the system described herein, it will be understood that other types of storage elements may be employed instead in the system.

The terms "line," "conductor," and "winding" will be used herein interchangeably to mean a conductor such as may be coupled to one or more cores.

The normal state of a core will generally be designated as the "zero" state. A core may be "set up," "set on" or switched whereupon it will then assume or be "flipped" into the "one" state. To flip a core requires the passage of at least a certain minimum amount of current through a wire coupled to the core and this current must be in the proper direction to reverse the magnetic flux in the core.

Magnetic cores made of ferrite, of toroidal shape and as small as 0.030 inch inside diameter and 0.050 inch outside diameter may be used. Such cores permit the assembling of complicated matrices in very limited spaces. Coupling sufficient for the purposes of the invention is obtainable by threading a wire once through the toroidal core. Where, as in some of the matrices described herein, many wires are required to be threaded through a single core, wires as small as No. 36 or smaller may be used with cores as small as 0.050 inch inside diameter and 0.080 inch outside diameter. These cores are smaller than cores generally known as switching cores, require less power to operate, less magnetomotive force to effect a reversal of state, and in the system described herein, provide rapid operation.

In the known "half-select" method of selectively setting on one or more cores in a matrix while leaving other cores in whichever state each such core happens to be in, pulses each of half the amount required to set up a core may be passed simultaneously through two separate conductors coupled to the core in like polarity and these pulses will combine their effects to set up the core. Each such pulse is called a "half-select pulse." A core which receives only one half-select pulse over the totality of conductors coupled thereto will not be set up, and, upon cessation of the current will return to its "zero" state. By the application of half-select pulses to a group of cores, one core may be set up to the exclusion of all other cores in the group. This occurs where two conductors each carrying a half-select pulse are each coupled to a plurality of cores and one or more of the cores is coupled to both conductors.

A core is said to be "inhibited" if a conductor coupled to the core is carrying a current, of suitable magnitude, opposed in direction to the select currrent. An "uninhibited core" is one to which no inhibiting current is applied. An uninhibited core may be flipped by a conductor carrying a select current or a current of greater amplitude than a select current.

In certain portions of the illustrative system described herein, instead of using a half-select principle of operation, an arrangement is employed for applying inhibit currents of large amplitude to cores which are not to be selected, and for applying a "write" current, for flipping uninhibited cores, of correspondingly large amplitude, providing its amplitude does not exceed the amplitude of the inhibit current in the cores that are not to be flipped. The inhibit and write-in currents may be several times larger than would be necessary to write into an uninhibited core. Accordingly, very reliable and rapid action may be obtained by "over-driving" the uninhibited core. At the same time, inhibited cores will not be flipped. It is assumed that all the cores involved are initially in the same state, usually the zero state. In the case of saturable cores, the inhibiting magnetomotive force and the write-in magnetomotive force preferably exceed, as by several times, the minimum magnitude of magnetomotive force necessary to saturate an uninhibited core.

This over-drive inhibit principle is used herein for selectively setting up cores in a matrix, being used in some instances instead of the half-select principle.

To read out the information in a core, a read-out pulse of current is impressed upon a conductor coupled to the core. This current is made opposite to a select pulse in its effect upon the state of the core. It will be noted that the direction of the read-out current is the same as the direction of an inhibit current, but the amplitude of the read-out current will generally be less than the amplitude of the inhibit current, the amplitude of the read-out current being about the same as the amplitude of a select current. That is, the read-out current or read-out pulse is of a polarity and amplitude to return a set-on core to its normal or "off" state, usually the "zero" state, and to provide an output pulse from the core if and only if said core has previously been switched to its other stable state, as by either the half-select principle procedure or by the inhibit principle procedure combined with a "write" pulse. Each core in a matrix is coupled to one or more output windings known as "sense lines" which carry a pulse when the core is switched from the one state to the other. In general, there will be employed a plurality of sense lines each of which is coupled to a plurality of cores, so that when any one of the cores coupled to this sense line has a read-out pulse impressed upon a "read-out" line coupled to the core, an output pulse will appear in the associated sense line, provided the core previously has been switched to the "one" or "on" state.

In the embodiment illustrated herein, there are provided a core matrix memory unit and one or more operation performing or functional core matrix units, in particular, an arithmetic unit and one or more logic units. There are also provided a plurality of registers including a storage register, an accumulator register and a control information or operation code register. Each register has associated therewith an input gate individual thereto. A plurality of sense lines pass through all the core matrix units. Each sense line is coupled to one or more cores in each matrix in such a way that when a matrix is subjected to a read-out operation, output pulses are generated in those of the sense lines that are coupled to one or more cores which have previously been set on by a write-in operation. Since the sense lines as a group pass through a plurality of matrix units, the sense lines will be referred to as common sense lines.

The common sense lines provide a means for transferring either control information or data information from any core matrix unit to any register. For this purpose, the common sense lines are connected to all the register input gates. Each register input gate is a device of the nature of an and-circuit which is conditioned by the presence of pulses or potentials of suitable polarity on the sense lines. Any one or more of these and-circuits, when conditioned, may be actuated by means of a pulse or potential, generally referred to as an input gate pulse, which is applied to all the and-circuits comprised in the input gate associated with the register in which it is desired that the information on the sense lines shall be deposited. Each matrix unit is provided with one or more output gates or read gates by means of which information may be read out of any selected matrix or matrix unit, upon the application of an output gate pulse or read gate pulse, sometimes called a read gate sample pulse, to the matrices involved, and the information may be impressed upon the common sense lines and gated to the register for which it is intended.

In the illustrative embodiment, the common sense lines pass through the core matrix memory unit, the core matrix arithmetic unit and one or more core matrix logic units and are connected to the control information register input gate, the accumulator register input gate and the storage register input gate, and may be used on a time sharing basis by the various matrix units and registers as required.

A first set of inhibit core drivers is provided, the general purpose of which is to impress inhibit currents upon those cores in any given matrix which are to be prevented from being set on when a write-in operation is performed. Inhibit lines from the set of drivers are connected serially through the various core matrix units and are used on a time sharing basis, for which reason the set of drivers will generally be referred to as common first inhibit drivers. A set of common first inhibit drive lines are provided to convey information for setting up a first pattern of inhibit currents or pulses from one of the registers to the common first inhibit drivers and thence to transmit the required pattern of inhibit currents or pulses to one or more of the core matrix units. In the illustrative embodiment, the common first inhibit drive lines run from the storage register to the common first inhibit drivers and thence to the memory unit, the arithmetic unit and one or more logic units. The arithmetic unit will be said to have first and second input dimensions, meaning that an addend and an augend are presented to the unit over separate systems of drive lines. It will be assumed that the addend is stored in the storage register. The common first inhibit drive lines then impress information about the addend upon a first dimension of the arithmetic unit.

A second set of common drivers is provided which will be referred to as the common second inhibit drivers. A set of common second inhibit drive lines is also provided to convey information for setting up a second pattern of inhibit currents or pulses from another of the registers to the common second inhibit drivers and thence to transmit the required pattern of inhibit currents or pulses to a second dimension of the same core matrix unit to which the first pattern of inhibit currents or pulses is supplied.

In the illustrative embodiment, the common second inhibit drive lines run from the accumulator register to the common second inhibit drivers and thence to a second dimension of the arithmetic unit, to impress information about the augend upon the arithmetic unit. They are also extended to one or more other logic units.

Control lines originate in the output of a control pulse generator under control of the control information register or operation code register and connect to the respective gates, both input gates and output gates, to supply gate pulses to the gates selectively as required by the various operations to be performed.

To supply write pulses or read pulses as required, there is provided a set of matrix unit drivers, which are called common unit drivers and may be time shared by various matrix units. A set of common unit drive lines is provided which may be connected to the respective matrix unit drivers when desired. The common unit drive lines are divided into a plurality of parallel branches which connect respectively to the various core matrix units. In each core matrix unit, the unit drive lines connect to the respective matrix unit output gate so that when an output gate pulse is applied to a matrix unit output gate a circuit is completed for the common unit drivers through the selected matrix unit and its associated output gate to supply a read pulse to the matrix unit. In general, each matrix unit is provided with two gates, a read gate which may be regarded as the output gate, and a write gate or input gate whereby a circuit is completed for the common unit drivers to supply a write pulse to the matrix unit.

The control pulse generator is provided with means for selectively energizing the control lines to effect the transfer of either control information or data information over the common sense lines to any one or more of the registers under the joint control of the control lines and of the unit drive lines. In particular, in an addition operation, the selective means incorporated in the control pulse generator is operative to effect the transfer of control or data information from the storage register over the common first inhibit drive lines to the first dimension of the core matrix arithmetic unit and also to effect the transfer of control or data information from the accumulator register over the common second inhibit drive lines to the second dimension of the core matrix arithmetic unit. With information thus having been supplied to two dimensions of the arithmetic unit, the information items may be combined in the arithmetic unit and the result may be put onto the common sense lines for further disposition as desired.

Other features of the invention include, in connection with a memory addressing system, a combination of a core driver and a current gate for selecting a particular address, the use of unidirectional current devices to block certain multiple paths in the addressing system, a common core driver for writing or reading with selection of function by means of a write gate and a read gate, and alternative control of the addressing function by an instruction counter or by one of a plurality of address registers.

Still further features involve reducing a $2n$-digit number to an $n$-digit number by means of column shifting, and building up a $2n$-digit number from two $n$-digit numbers; and a system of storage for operation code information in terms of the presence or absence of a storage element at each of a plurality of locations in a storage device.

In several of the figures, certain components are shown in block diagram form with letter identifications, for example, triggers T, trigger gates TG, and-circuits A, or-circuits O, core drivers CD, current gates CG, inverters I, emitter followers E, and sense amplifiers SA. Illustrative examples of circuits for such components are shown in FIGS. 31 through 39. There follows a brief description of each such component.

A trigger, an illustrative form of which is shown in FIG. 31, functions as a storage device, memory element, control device, counter, etc. It is bistable in that it remains in either one of two stable states until it is forced or triggered by an input signal of a predetermined polarity to assume the other state. As used herein, one state of the trigger is called the "off" or "reset" state and the other is called the "on" or "set" state. When the trigger is on, it produces one or more output potentials which may be used to condition or to operate other circuits, or as an input signal for a second trigger, etc.

A trigger may have as many as five input terminals and two output terminals as shown in FIG. 31, of which any or all may be used in a given application. The binary input is used to turn the trigger on if it is off or to turn it off if it is on, each subsequent input signal of the proper polarity being effective to change the state of the trigger. The "on input" is effective to turn the trigger on if it is off but has no effect if the trigger is already on. Similarly, the "off input" is effective to turn the trigger off if it is on but has no effect if the trigger is already off. By means of the "set off" input the trigger may be reset to the "off" state whenever desired and by means of the "set on" input the trigger may be set on. A positive or relatively high potential output is available at the "on output" when the trigger is on and a negative or relatively low or more negative output potential is available when the trigger is off. At the "off output" a relatively negative output potential is available when the trigger is on and a relatively positive output potential is available when the trigger is off.

The gate circuit shown in FIG. 32 may be termed a trigger gate or a negative diode gate. The circuit comprises a diode, the cathode of which is connected to the input terminal B while the anode is connected via a capacitor to the output terminal and via a resistor to a supply terminal A. The terminals A and B are normally biased so that the diode is cut off and the output terminal is at a potential determined by the circuit to which it is connected. If a positive pulse is applied to the terminal B, the potential at the cathode is driven more positive, thereby maintaining the diode in a cut off condition. If a positive signal is applied to the terminal A, the potential at the anode is raised to a more positive value causing the diode to conduct and the gate is said to be conditioned. Now, if a positive pulse is applied to the input terminal B, the positive shift of potential at the leading edge of the pulse raises the potential at the cathode to a more positive potential than that existing at the anode and the diode is cut off. The potential at the anode then rises exponentially to approximately that value existing at the terminal B, whereupon the diode again conducts and the potential at the anode stops rising and is maintained at the value existing at terminal B. When the negative shift of potential at the trailing edge of the positive input pulse appears at the terminal B, it instantaneously appears at the anode of the diode, as the resistance across a conducting diode is negligible. Further, since the potential across a capacitor cannot change instantaneously, the potential at the output terminal follows the same instantaneous negative shift of potential and then rises rapidly to its quiescent state in a time that is a function of the load it drives. Thus, it is apparent that if the diode gate is properly conditioned, it will generate a sharp negative pulse or spike in response to a negative shift in potential at the terminal B.

The and-circuit shown in FIG. 33 functions to produce an output signal of positive or relatively high potential if and only if there is a coincidence of positive or relatively high potential signals at all of the input terminals of the device. The input signals do not necessarily start simultaneously but must all be present at one time in order that an output signal may be produced. Hence, in instances where a signal is present on all but one of the input terminals, the circuit is conditioned so that when an input signal is applied to the remaining input terminal there is then a coincidence of input signals, causing the production of an output signal. Unlike the trigger gate circuit described above, the order of application of the input signals is not important. The device may have two, three, or more, input terminals.

The or-circuit shown in FIG. 34 functions to produce a positive or relatively high potential output signal in response to a positive or relatively high input signal on any one or more of the input terminals of the device. The or-circuit may also be used as a negative and-circuit utilizing the property that it will produce a relatively negative output potential if and only if all the input signals applied thereto are simultaneously negative. The or-circuit may also serve to isolate two or more input signal circuits from each other.

The core driver and the current gate, shown together in FIG. 35 in conjunction with a winding through a plurality of cores, are transistor devices of the current amplifier type. The two devices are similar in circuit arrangement and in principle of operation, the core driver controlling one end of the core winding and the current gate controlling the other end. As indicated in the figure, a core driver may be connected in parallel to a plurality of lines each threading through a plurality of cores. The circuit for any desired core winding may be completed by operating the current gate that is individual to the core winding. To operate either a core driver or a current gate a negative input potential is applied to the base electrode of the PNP-transistor. The core driver and the current gate may have relatively large power outputs suitable for jointly driving a large number of cores in an array.

The inverter shown in FIG. 36 is a transistor device which gives a negative or relatively lower output potential in response to a positive or relatively higher input signal and a relatively higher output potential in response to a relatively lower input signal.

The emitter follower shown in FIG. 37 is a transistor circuit of the common-collector type. It has the property that the output current in the emitter-collector circuit is substantially a replica of the input current in the base-emitter circuit, with current and power gain. The emitter follower is the dual or analogue of the cathode follower type of electron tube circuit.

A sampling circuit shown in FIG. 38 comprises a combination of the inverter of FIG. 36 and the emitter follower of FIG. 37. This combination will be explained below in connection with its use in FIG. 12.

The sense amplifier shown in FIG. 39 is a device for amplifying pulses such as the pulses produced in the sense wires in a core matrix, or other pulses employed in a computer. It is a transistor device of the current amplifier type.

Further details concerning components of the types shown in FIGS. 31 through 39 may be found by reference to the following copending applications assigned to the assignee of the present application:

Serial No. 592,545, filed June 20, 1956 on Data Coordinator by R. A. Gregory et al., now Pat. No. 2,960,-683.

Serial No. 631,765, filed December 31, 1956 on Character Recognition Machine by Gerald L. Shultz, now Pat. No. 3,074,050.

Further reference material regarding circuit components known in the art may be found in "Scientific Encyclopedia," third edition, published in 1958 by D. Van Nostrand Co., Princeton, N.J., and in "Reference Data for Radio Engineers," fourth edition, published in 1956 by International Telephone and Telegraph Corporation, New York, N.Y., particularly pages 467, 886 and 887.

Other objects, features and advantages will appear from the following more detailed description of illustrative embodiments of the invention, which will now be given in conjunction with the accompanying drawings.

In the drawings,

FIG. 1 is a general block diagram of an embodiment of the invention;

FIGS. 2A, 2B, 2C, arranged as shown in FIG. 2 comprise a combination block diagram and flow sheet of an embodiment similar to that shown in FIG. 1;

FIG. 3 is a chart showing an alpha-numeric code suitable for use in a system embodying the invention;

FIGS. 4A through 4F are graphical representations of word formats useful in explaining the invention;

Figure 23:
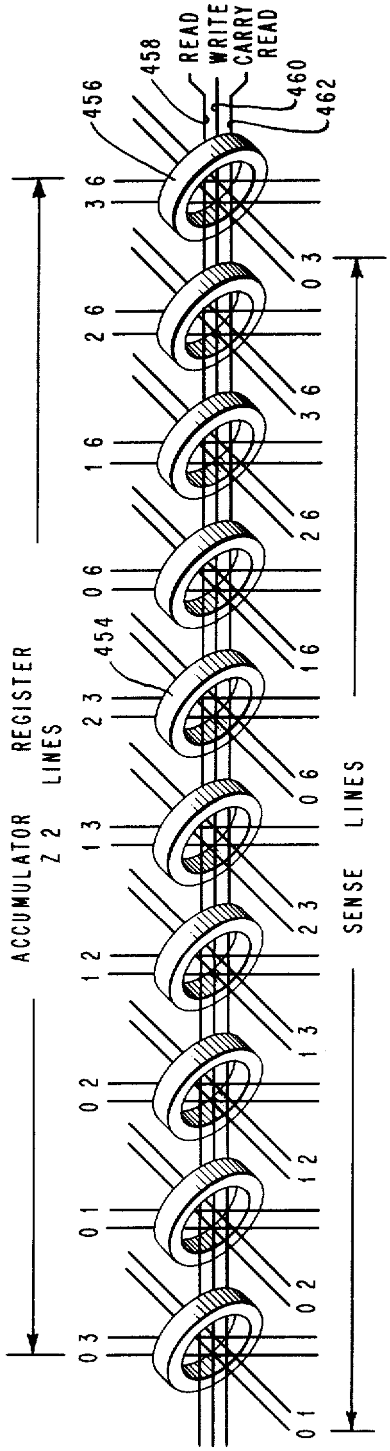
Figure 6A:
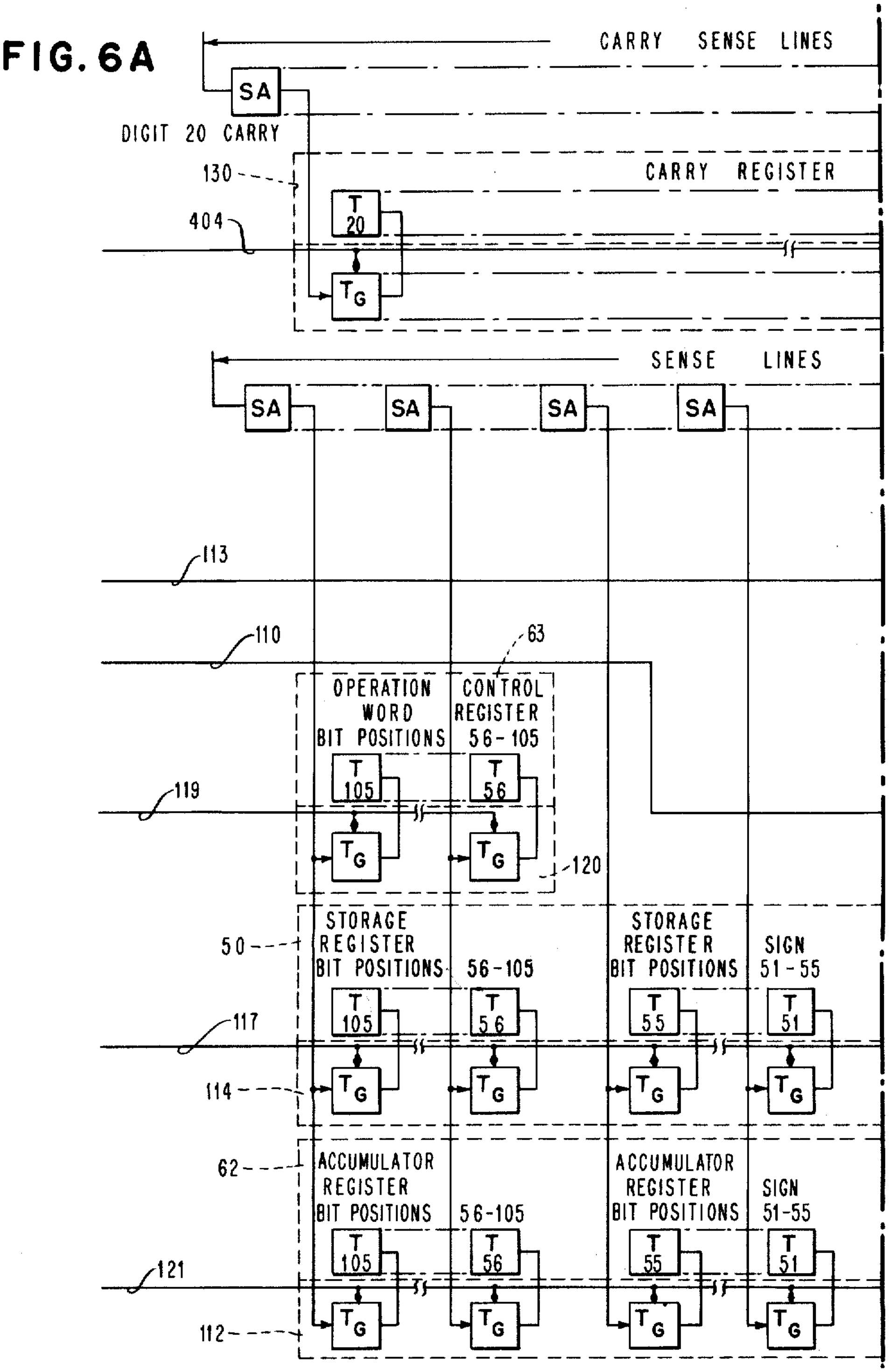
Figure 6B:
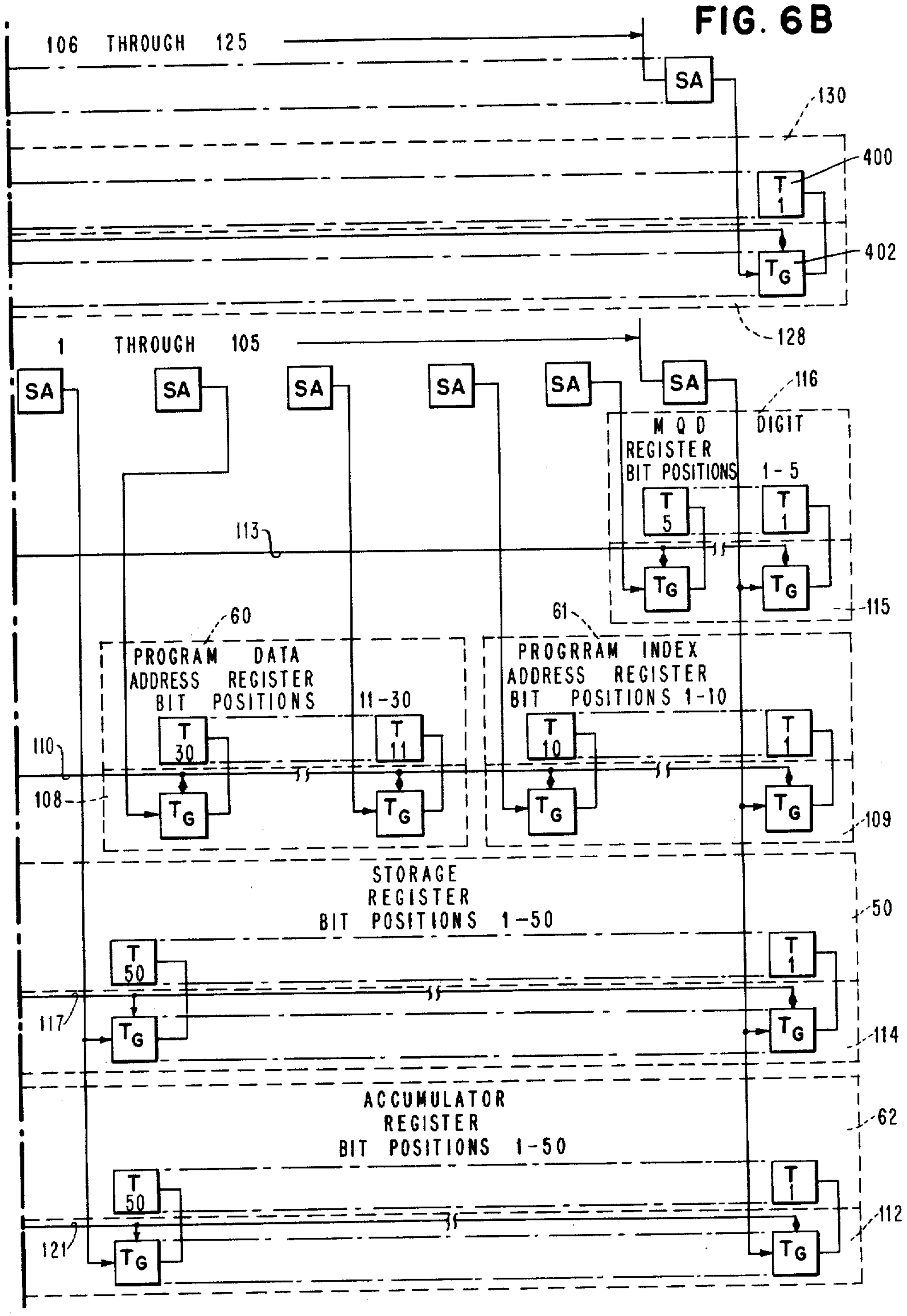
Figure 7:
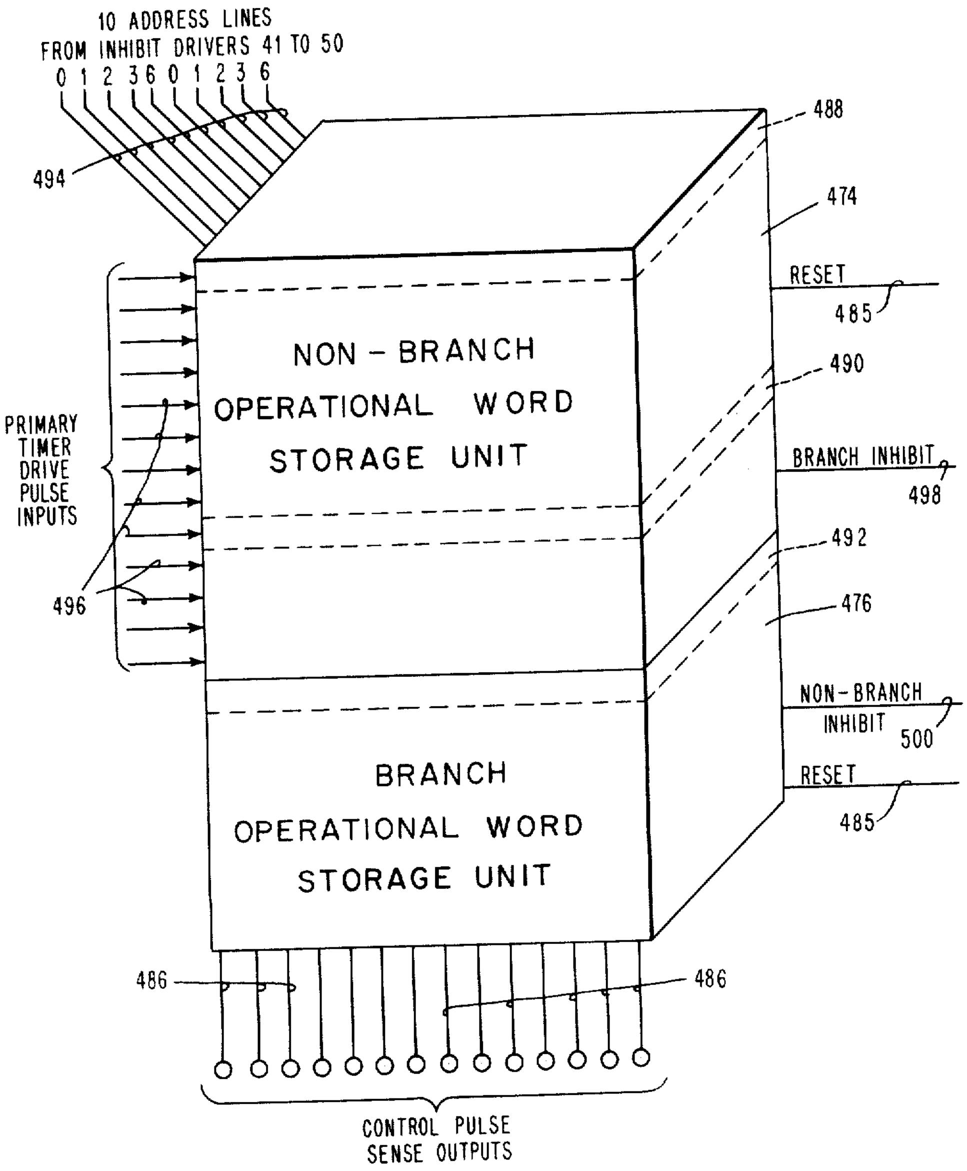
Figure 8:
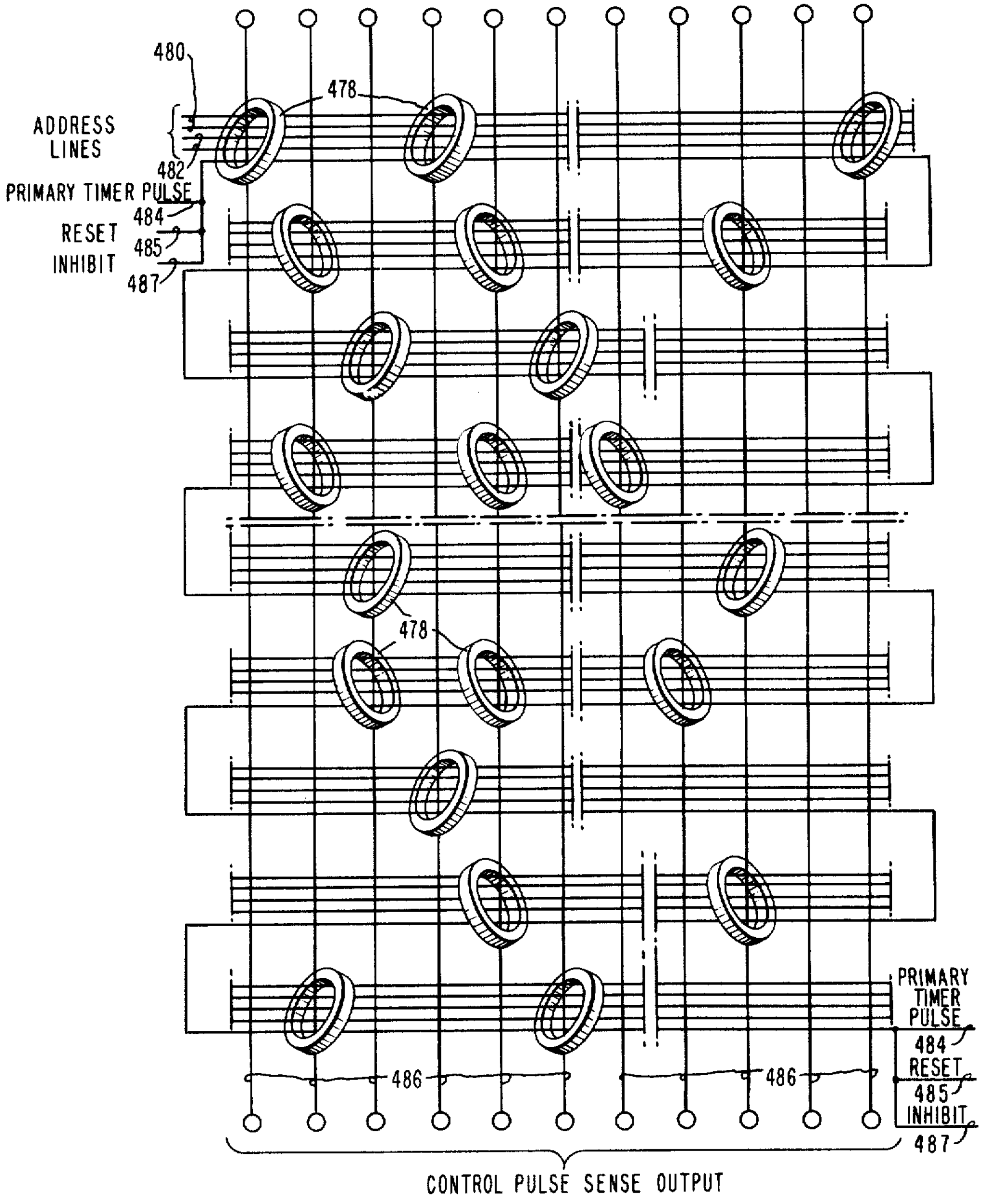
Figure 9:
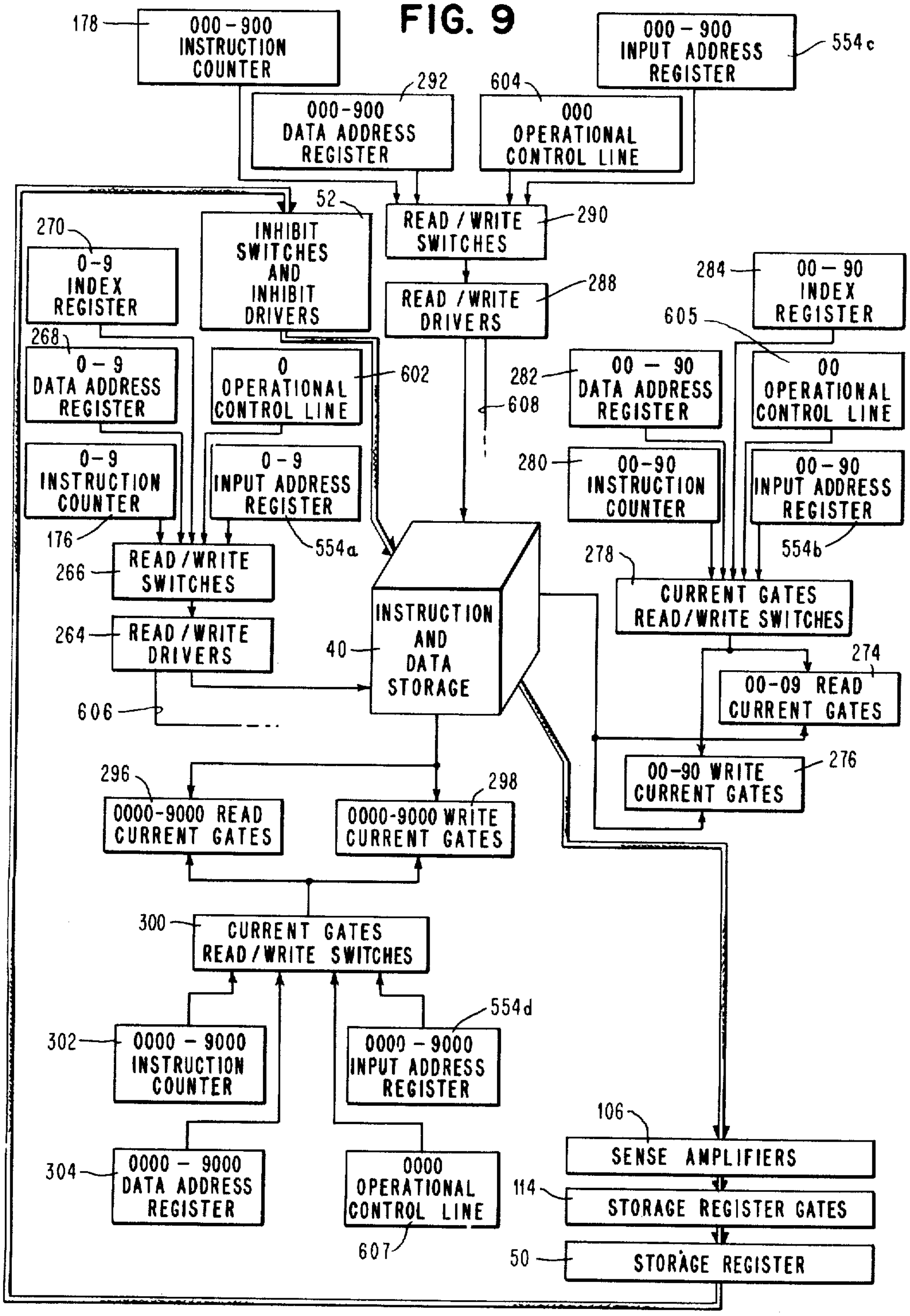
Figure 17A:
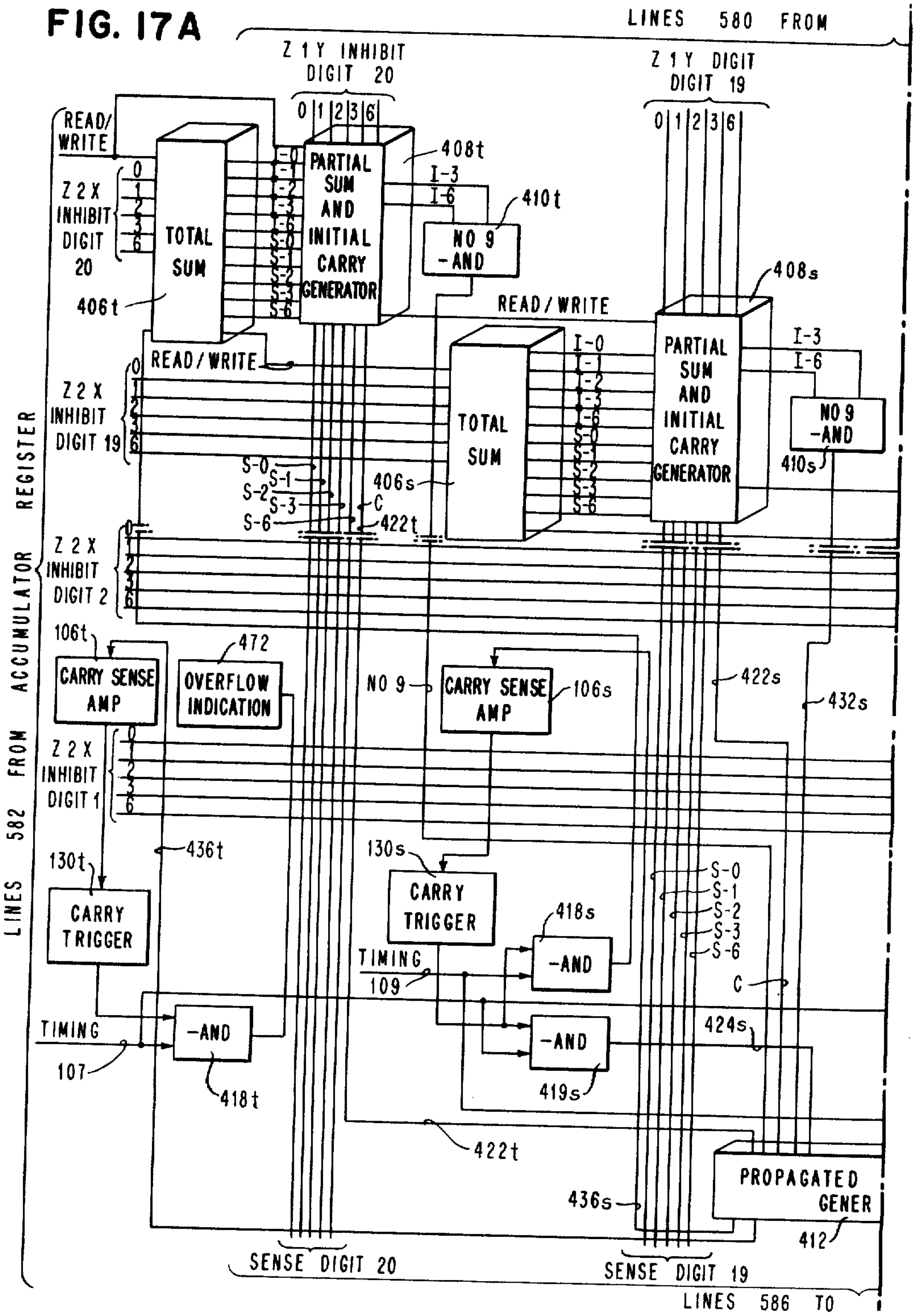
Figure 17B:
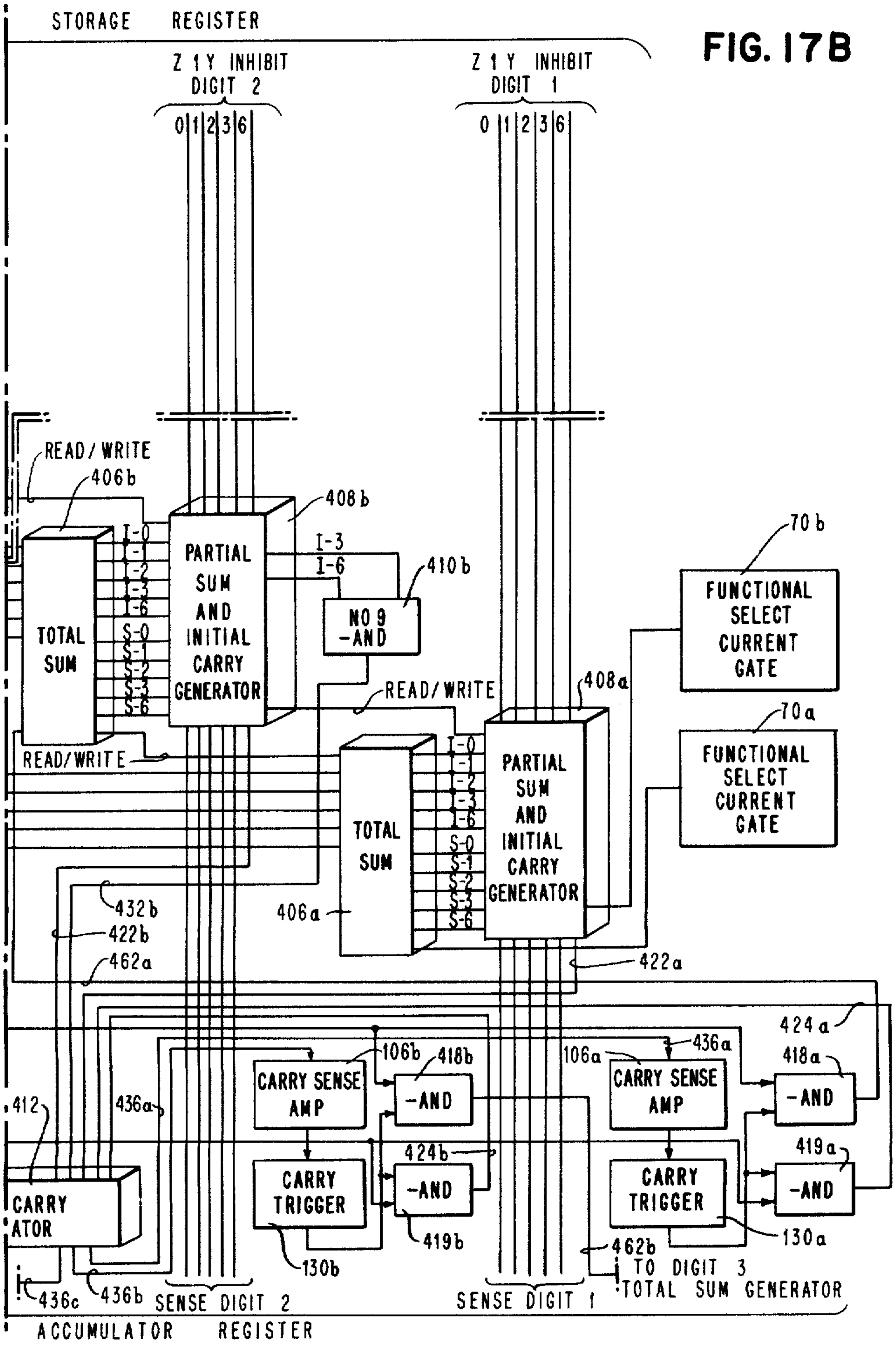
Figure 18:
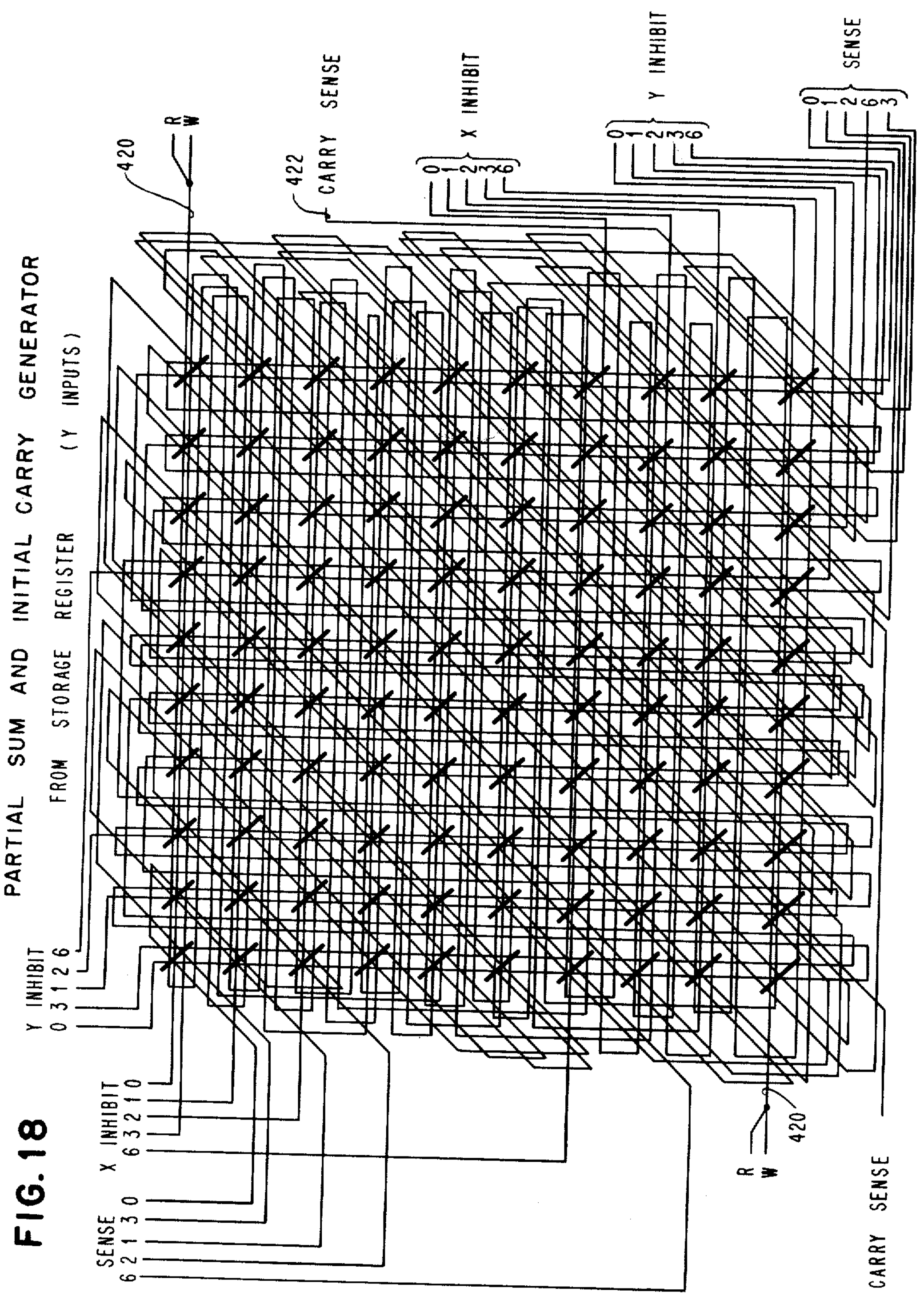
Figure 20A:
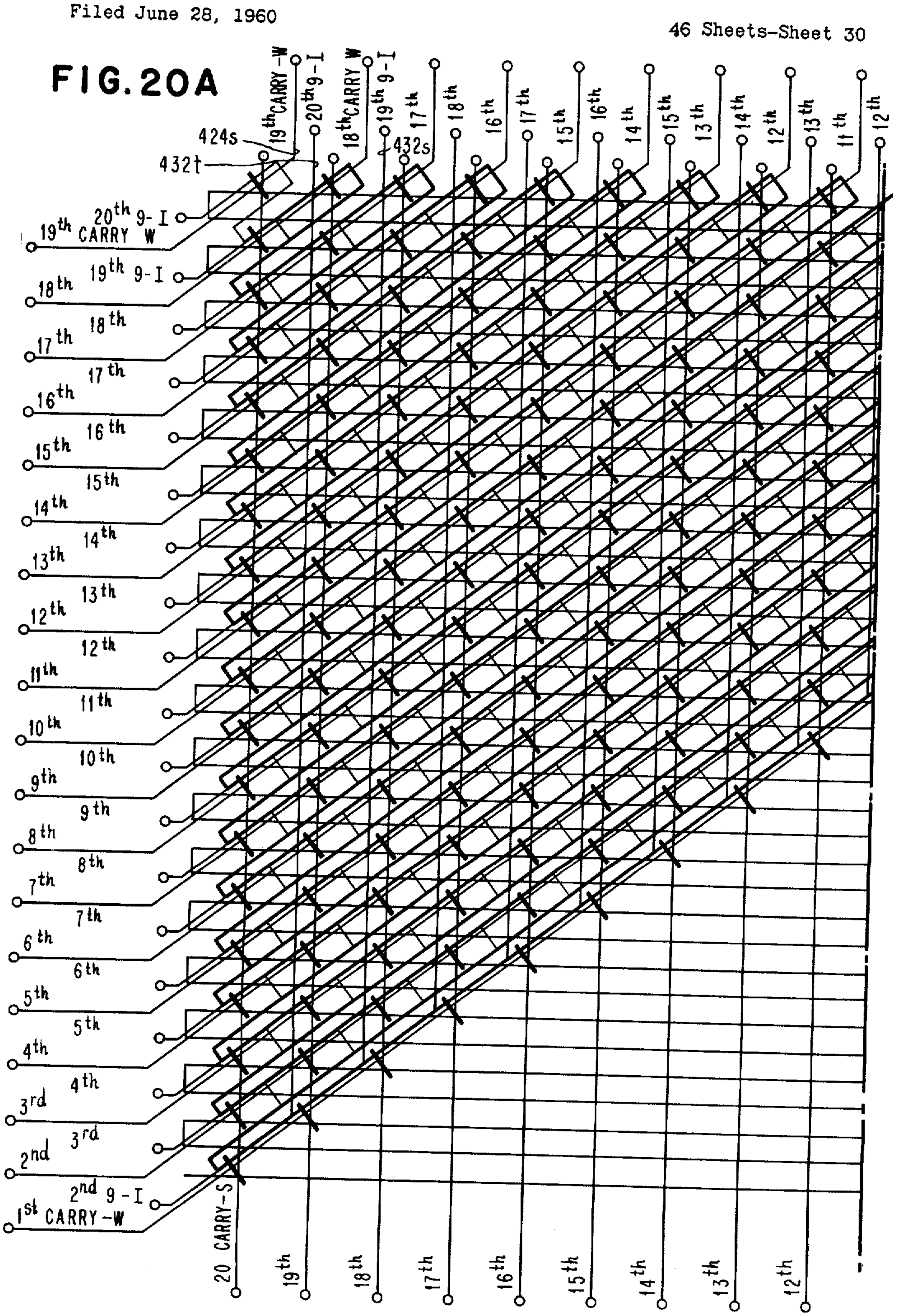
Figure 20B:
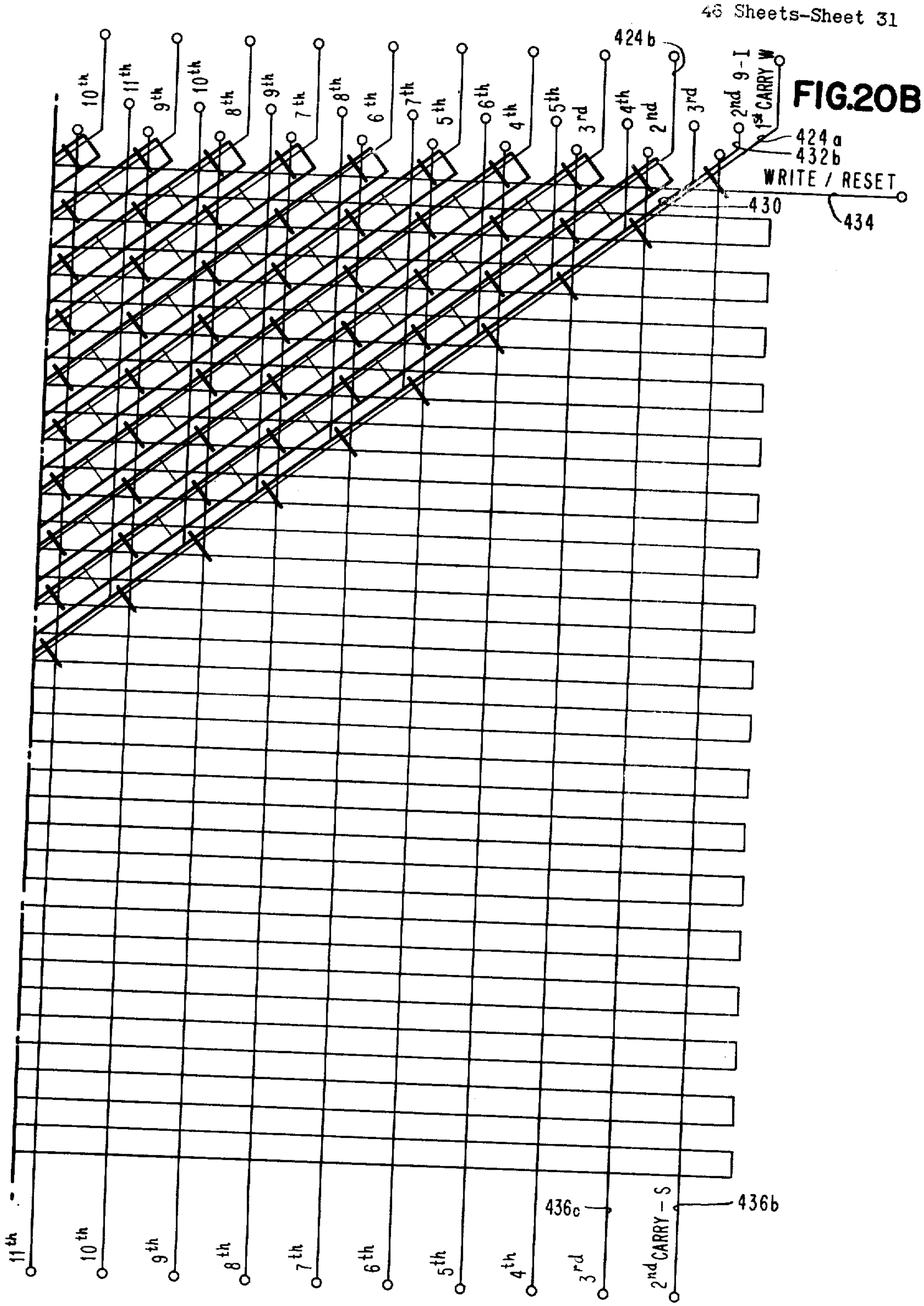
Figure 21:
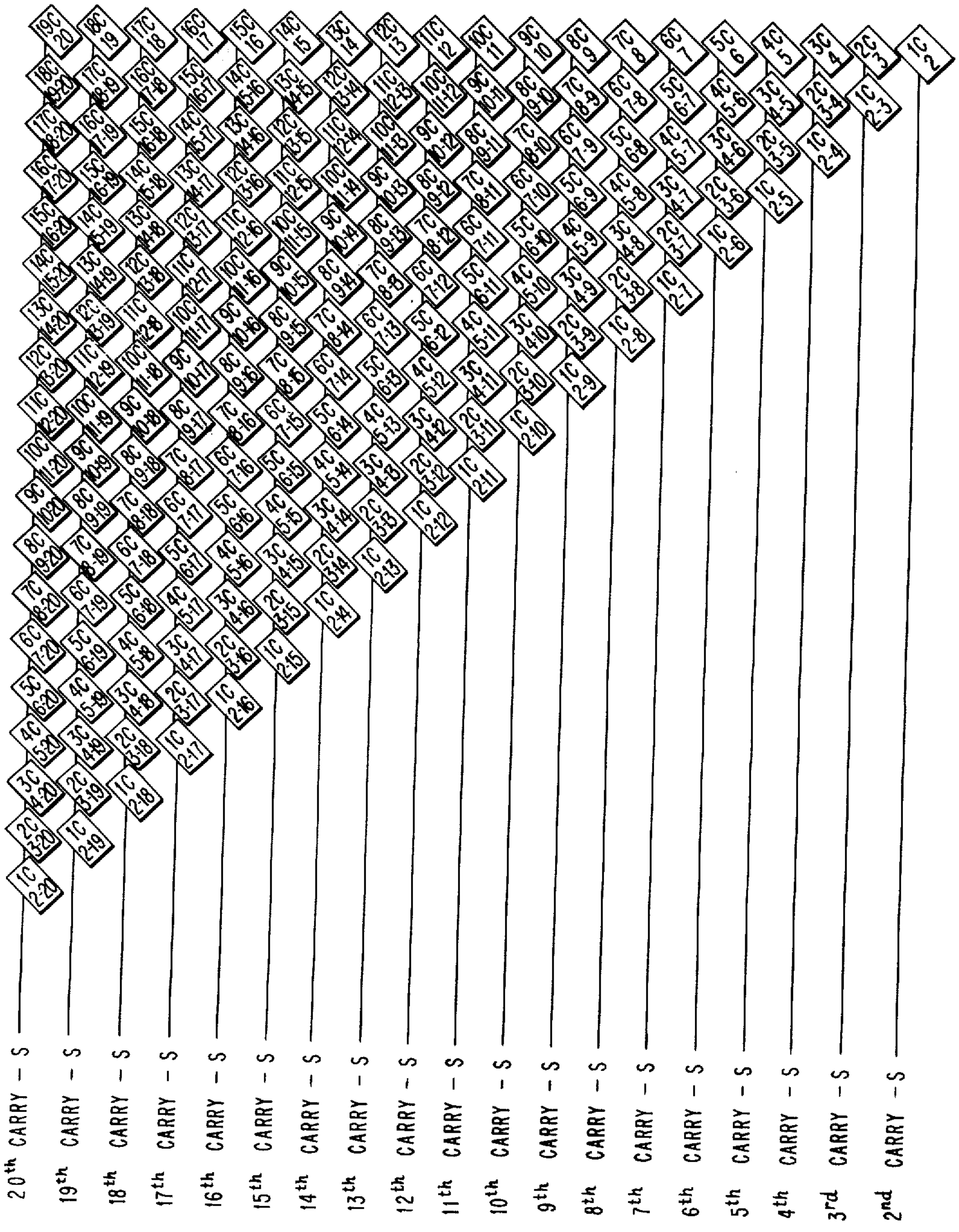
Figure 22A:
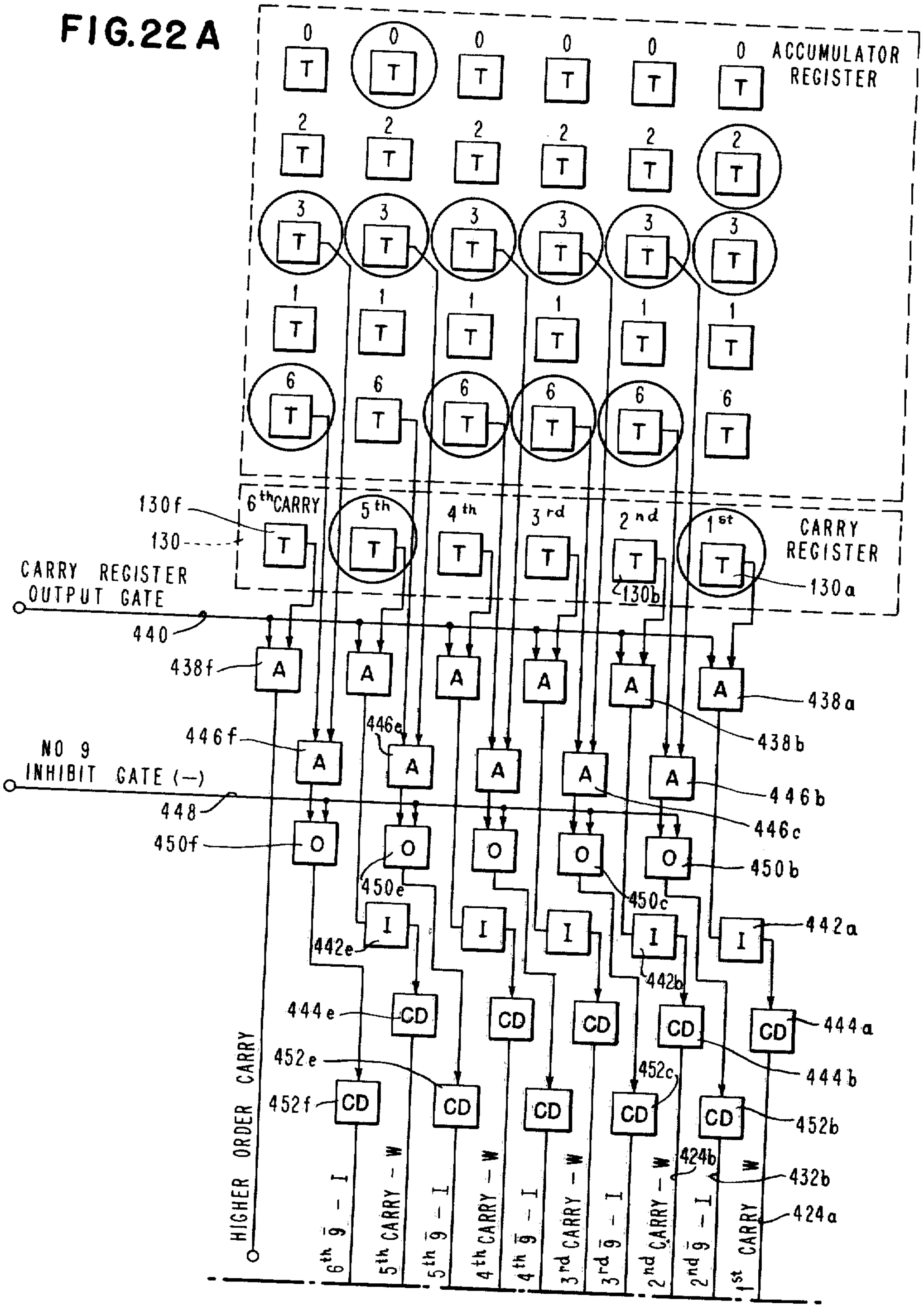
Figure 22B:
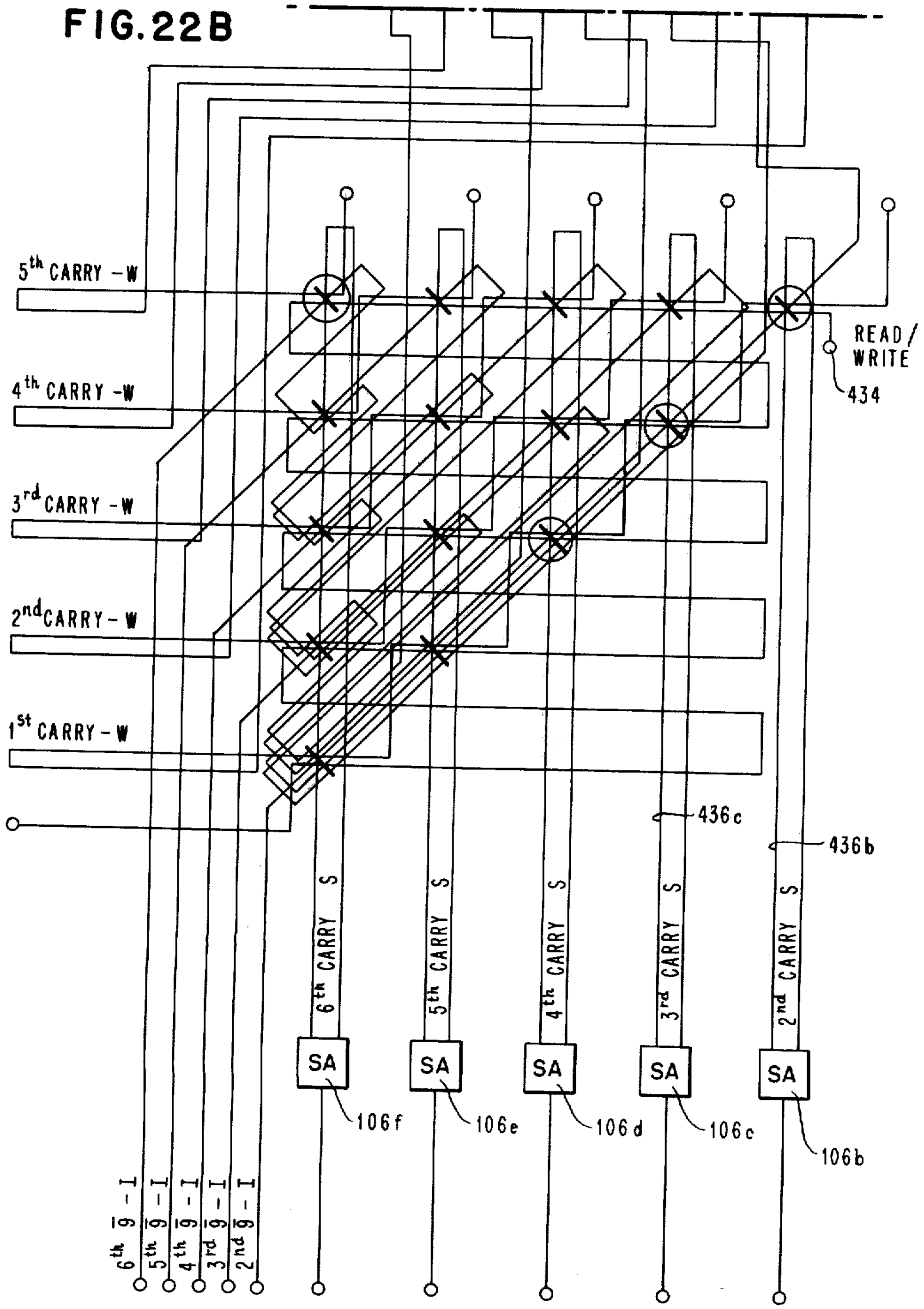
Figure 24A:
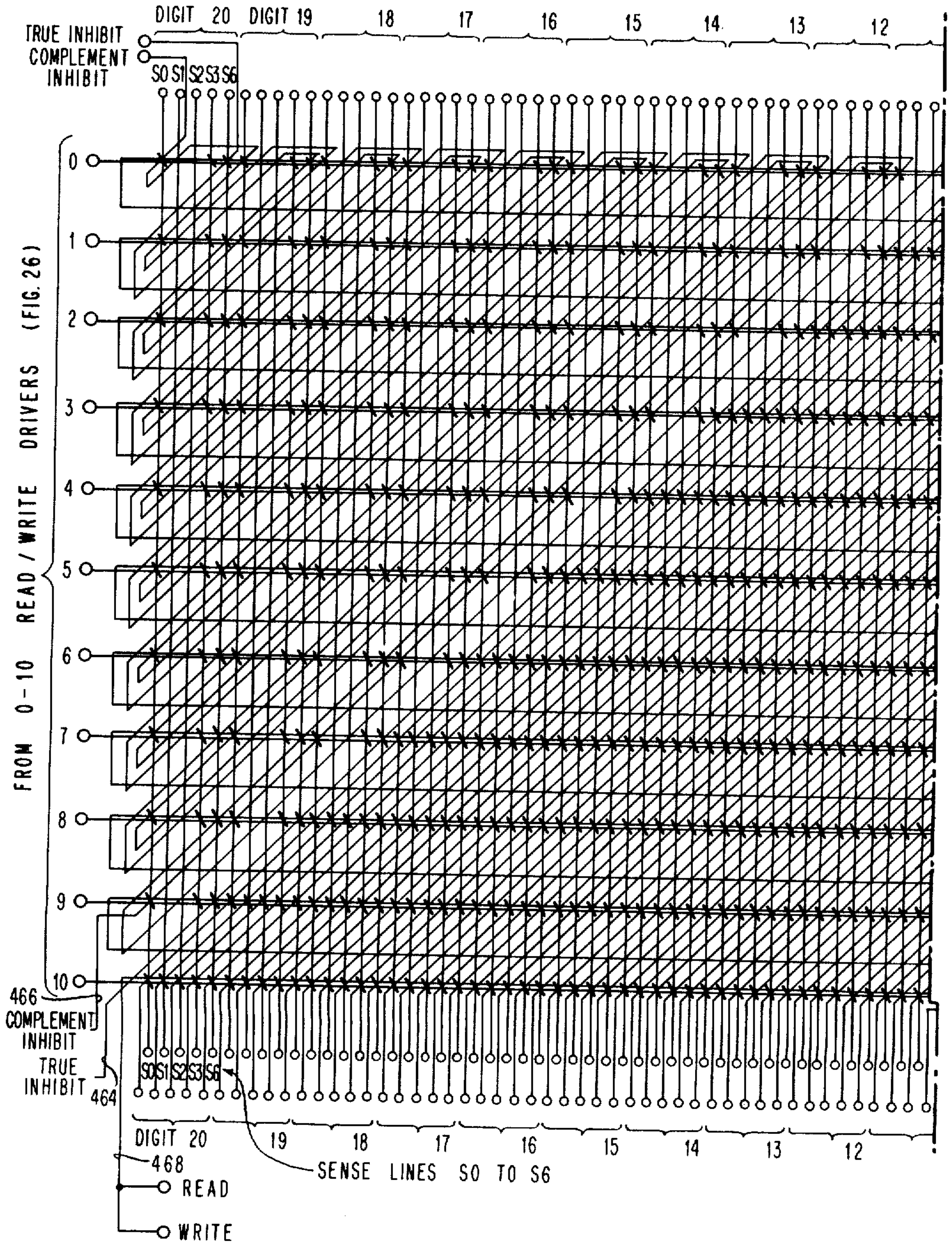
Figure 24B:
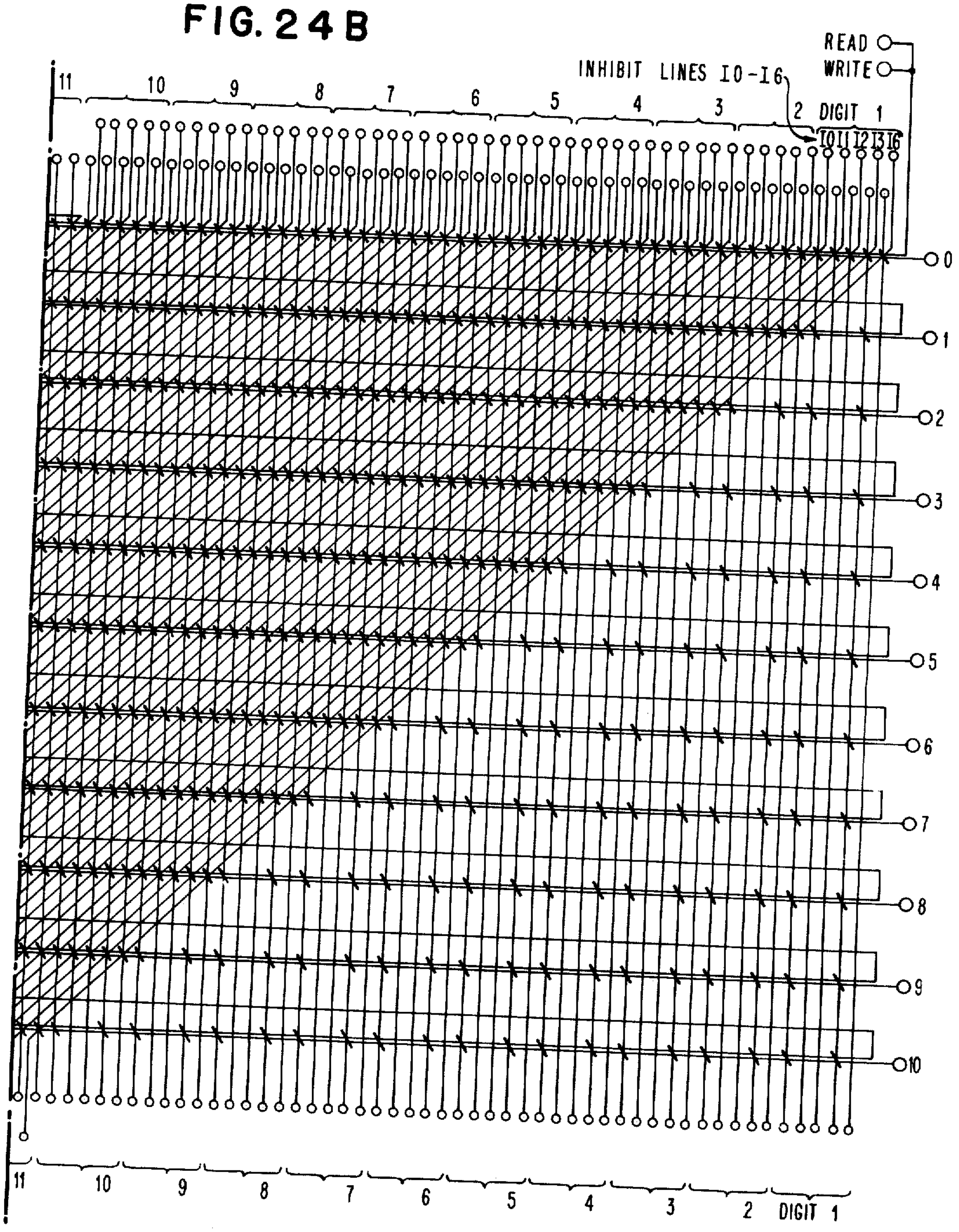
Figure 25A:
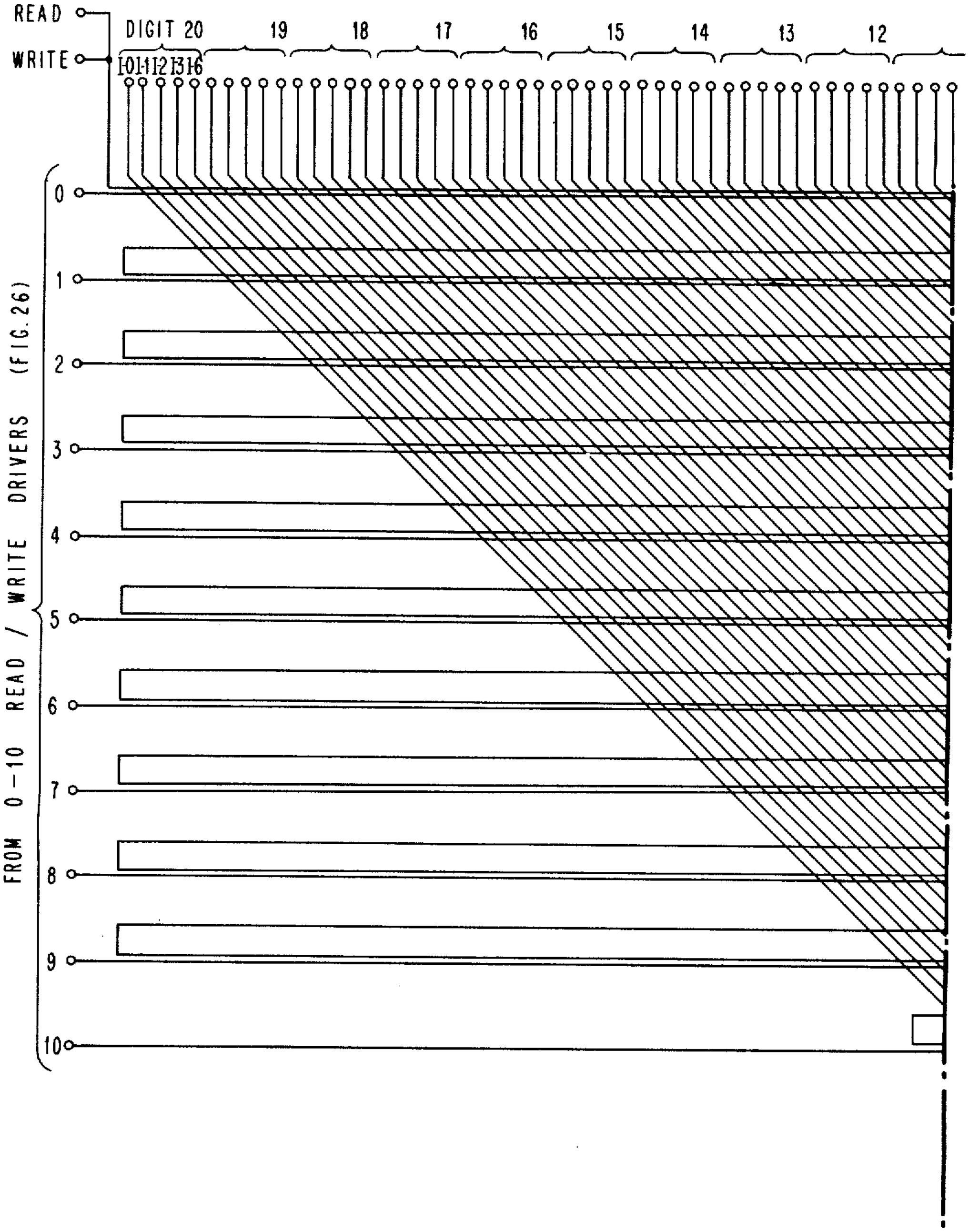
Figure 25B:
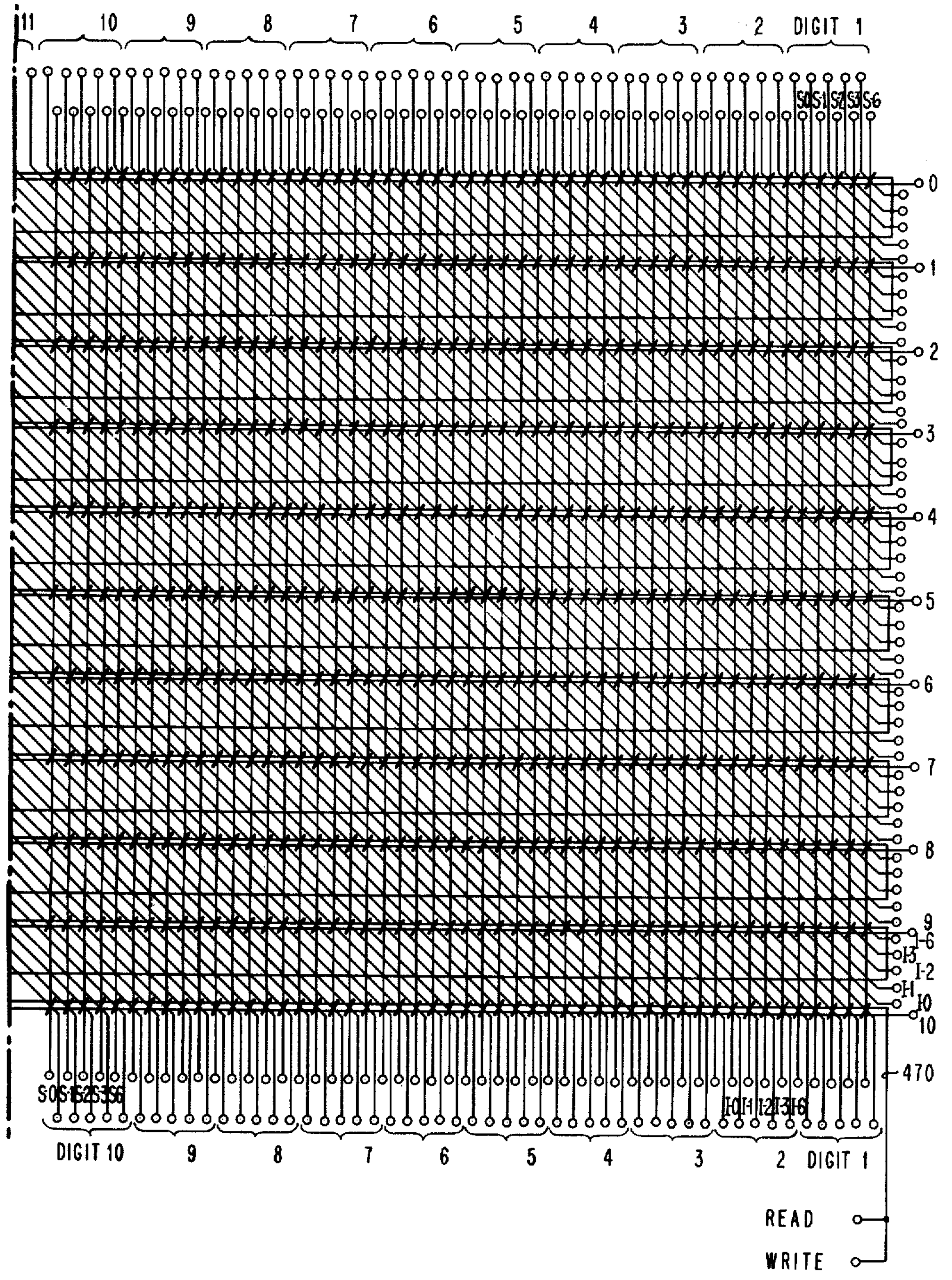
Figures 26, 31A:
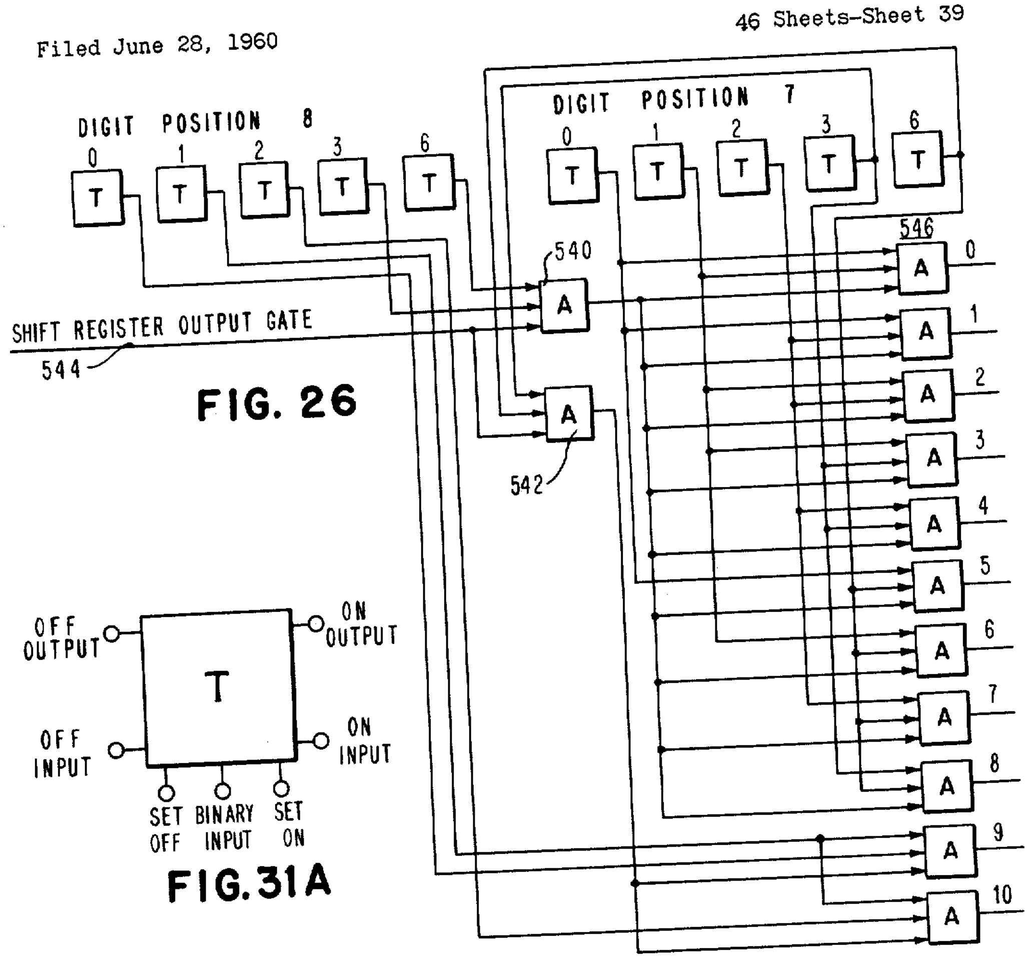
Figure 31:
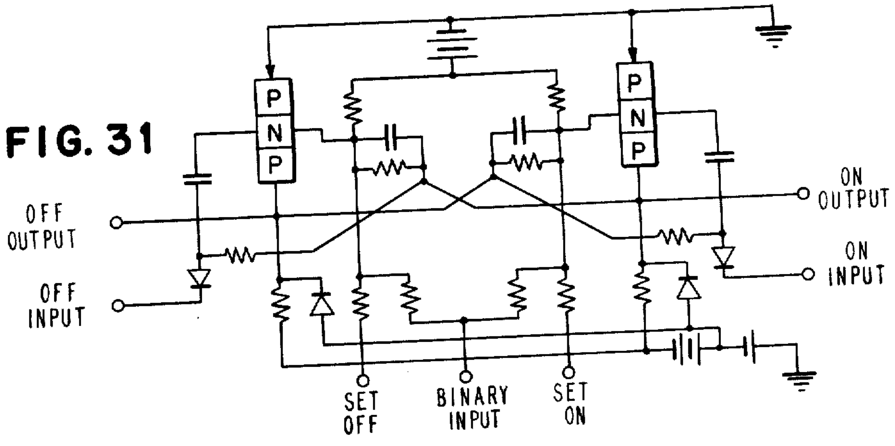
Figures 27, 27A:
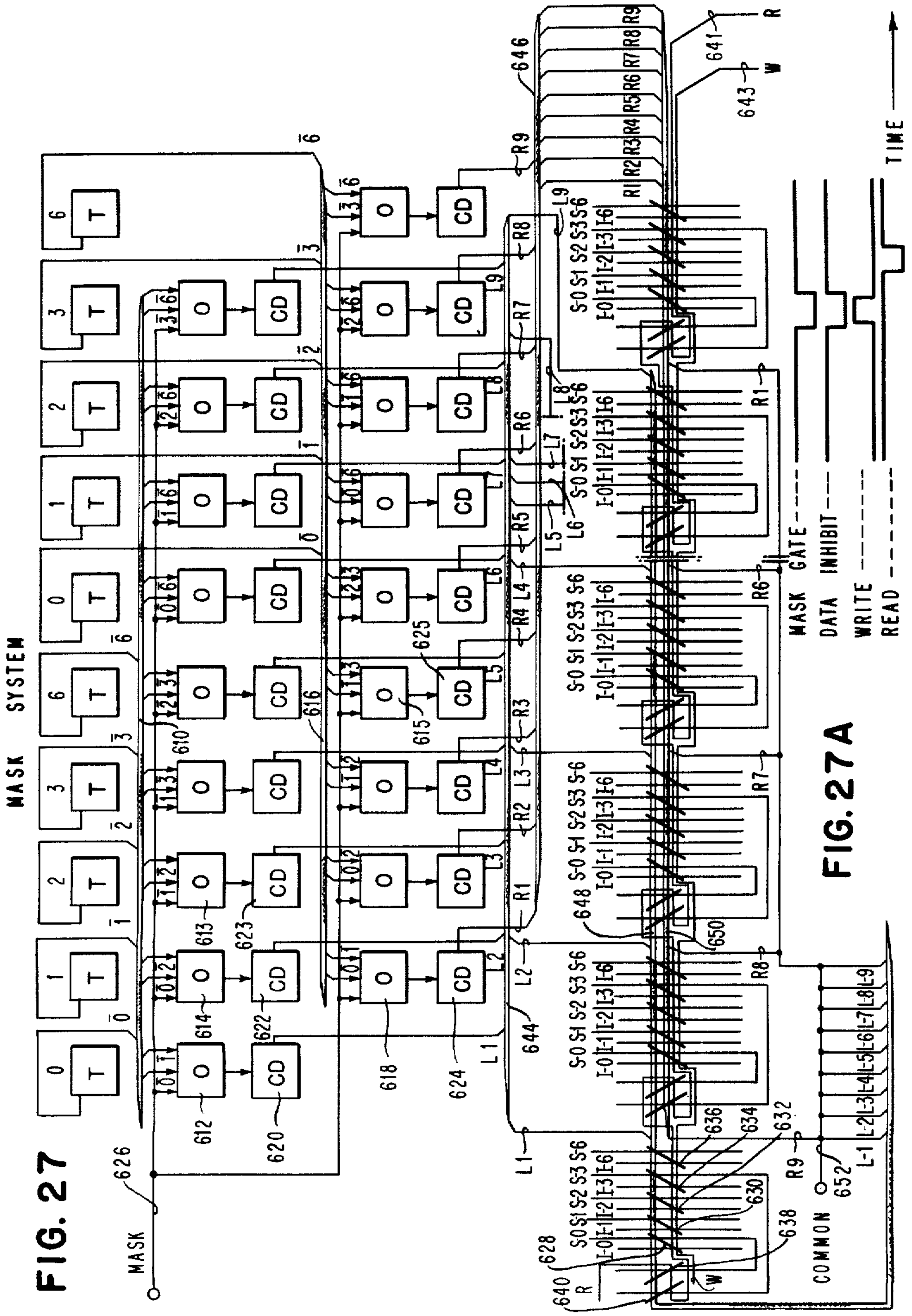
Figure 28:
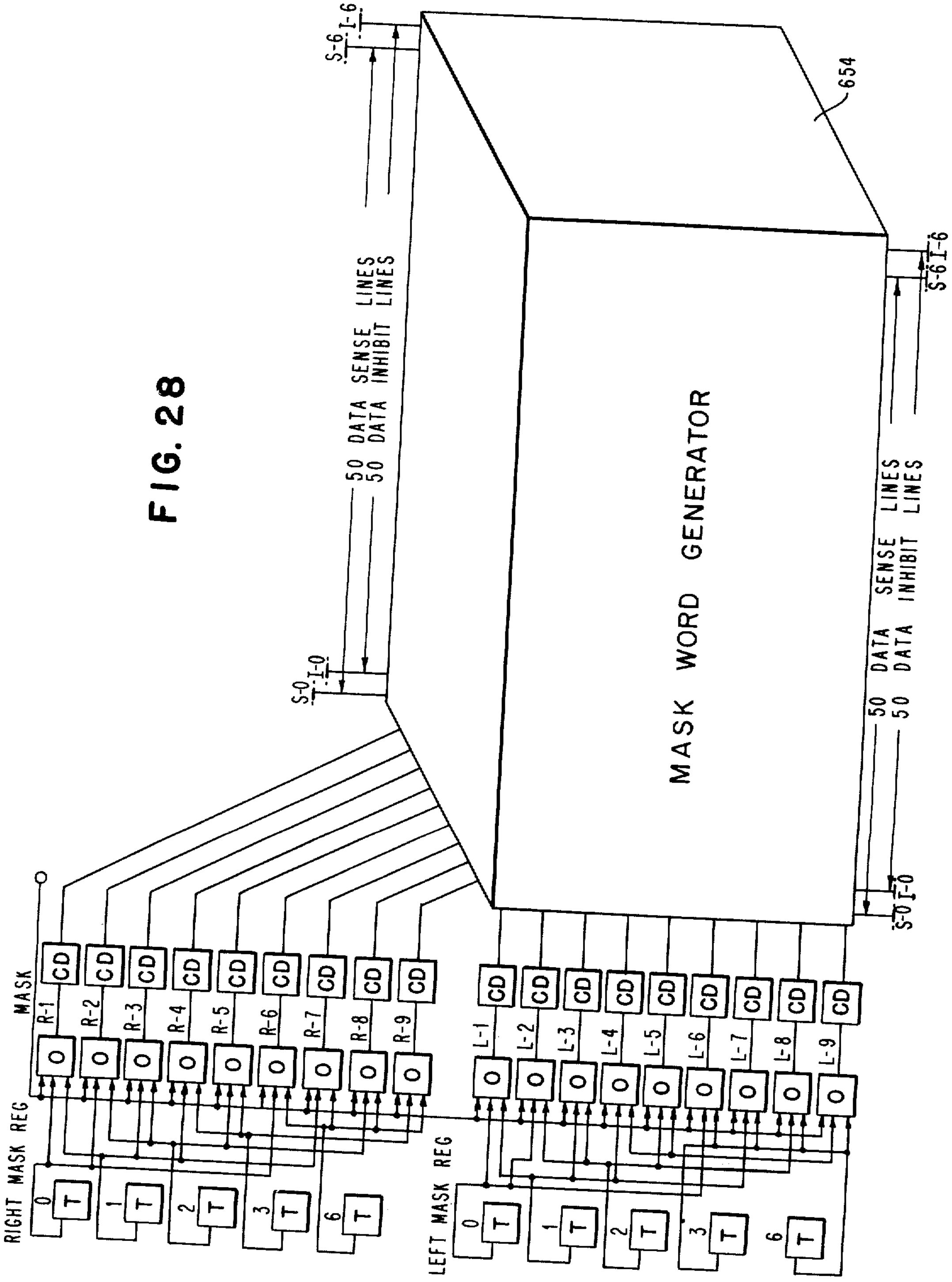
Figure 29A:
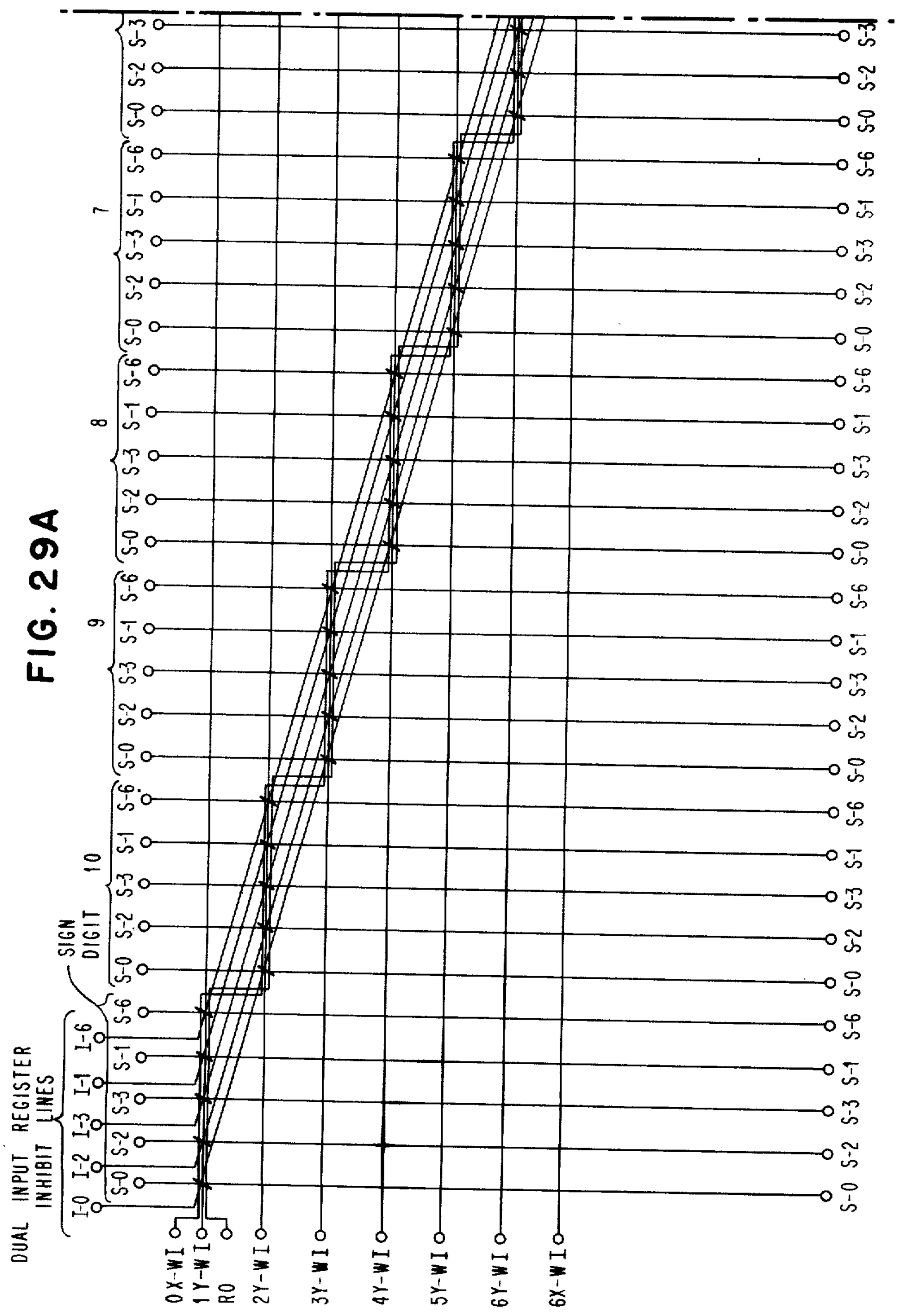
Figure 29B:
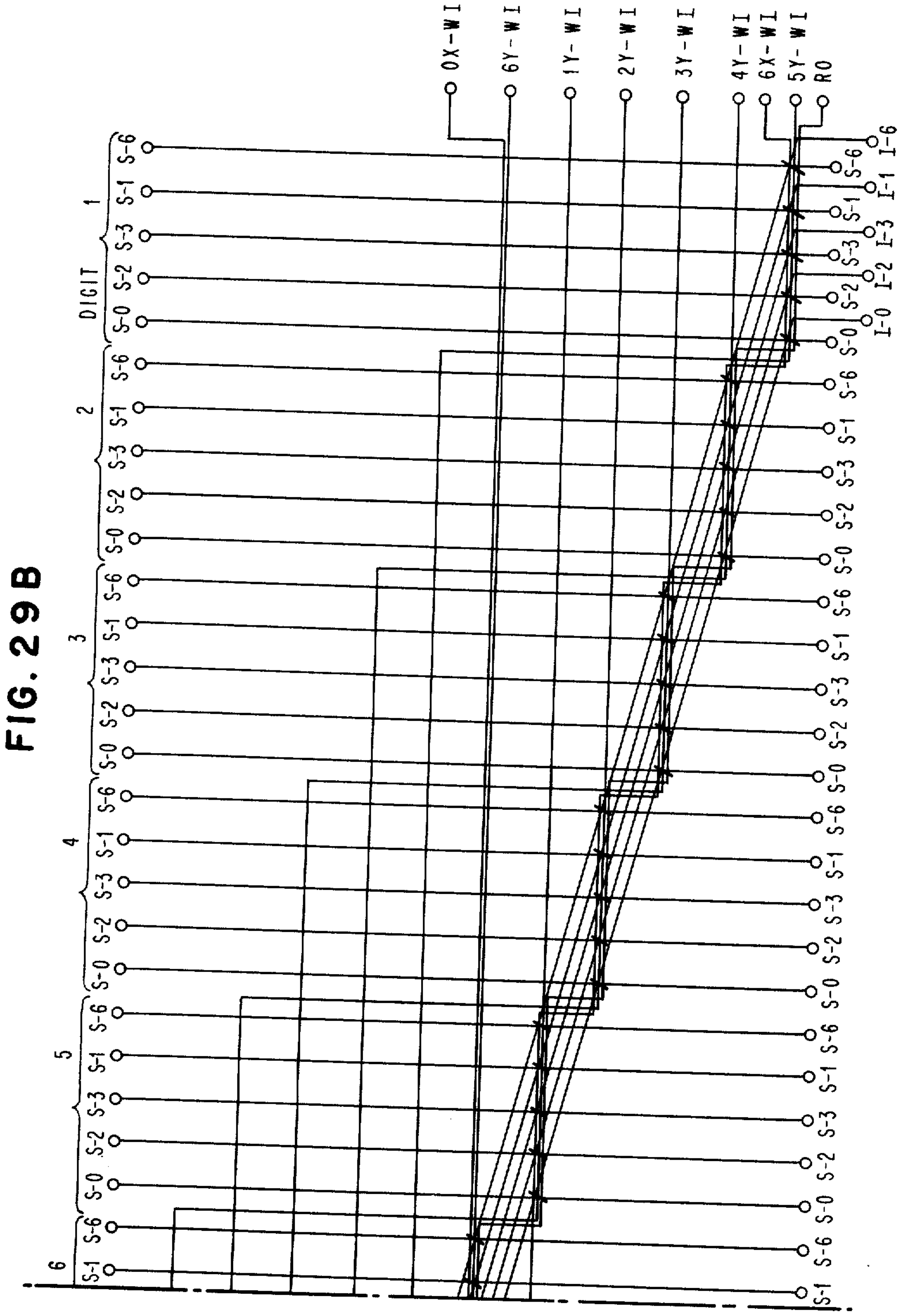
Figure 30A:
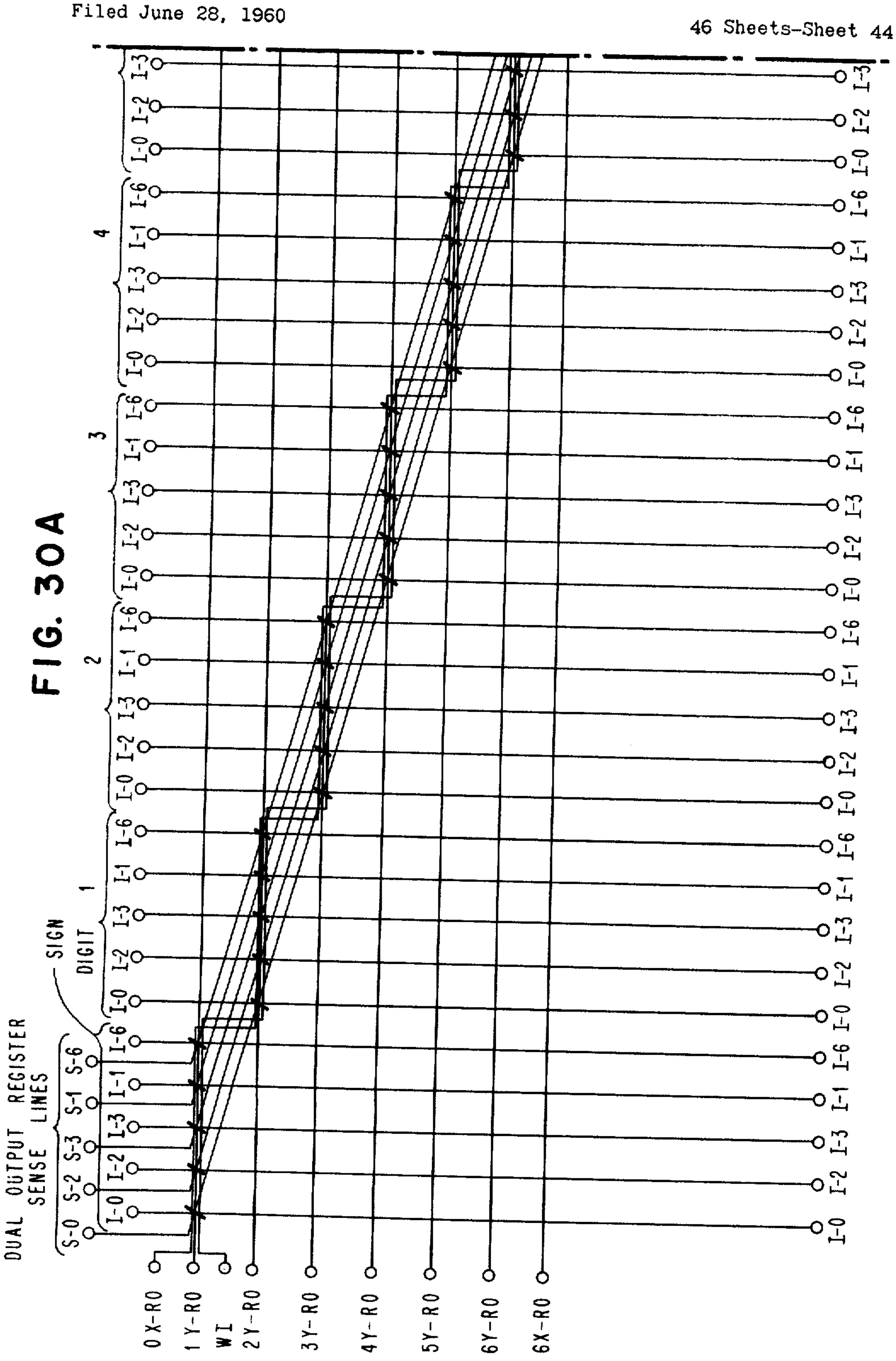
Figure 30B:
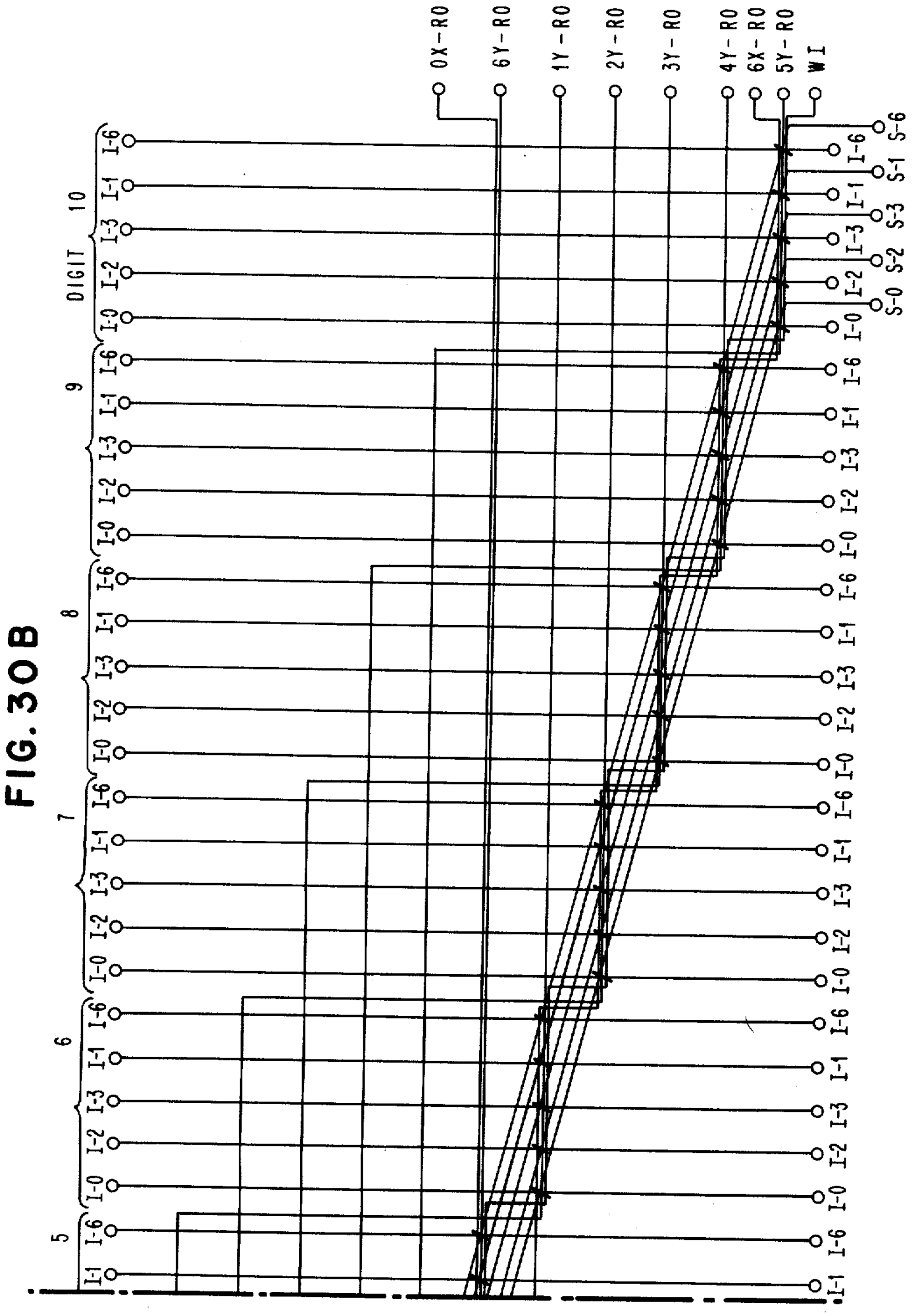

FIGS. 6A and 6B arranged side by side comprise a set of schematic diagrams showing systems of time shared sense lines together with block representations of input gating arrangements for a plurality of registers which may be connected to receive signals from the sense lines on a time sharing basis;

FIG. 7 is a block diagram of a pair of operation word storage devices;

FIG. 8 is a wiring diagram of a portion of an operation word storage device;

FIG. 9 is a block diagram of an instruction and data storage unit together with means for writing in and reading out information at a selected address in the storage unit;

FIGS. 10A, 10B, 10C and 11 are wiring diagrams useful in explaining the operation of the storage device shown in block form in FIG. 9;

FIGS. 12, 13, 14 and 15 each comprising parts A and B arranged one above the other are schematic diagrams of portions of the addressing and switching devices and registers shown in block form in FIG. 9;

FIG. 16 is a combination block diagram and flow chart of an adder which may be a component of a system embodying the invention, FIG. 16A showing the significance of various lines of flow shown in FIG. 16;

FIGS. 17A and 17B arranged side by side comprise a detailed schematic diagram of an adder of the type shown more generally in FIG. 16;

FIG. 18 is a wiring diagram of a partial sum and initial carry generator which may form part of the adder shown in FIGS. 16 and 17;

FIG. 19 is a table of addition useful in explaining the operation of the partial sum and initial carry generator;

FIGS. 20A and 20B arranged side by side comprise a schematic diagram of a propagated carry generator which may form part of the adder shown in FIGS. 16 and 17;

FIG. 21 is a simplified schematic representation of the wiring scheme of the propagated carry generator shown in the diagram of FIG. 20;

FIGS. 22A and 22B arranged one above the other comprise a schematic diagram of a fragment of an adder of the type shown in FIGS. 16 and 17;

FIG. 23 is a wiring diagram of a total sum generator which may form part of the adder shown in FIGS. 16 and 17;

FIGS. 24A and 24B arranged side by side comprise a wiring diagram of a left shift matrix;

FIGS. 25A and 25B arranged side by side comprise a wiring diagram of a right shift matrix;

FIG. 26 is a schematic diagram of a column shift register;

FIG. 27 is a schematic diagram of a mask register and associated mask matrix, FIG. 27A being a timing diagram for the device shown in FIG. 27;

FIG. 28 is a schematic diagram of a mask word generator with associated addressing circuits;

FIGS. 29A and 29B arranged side by side comprise a wiring diagram of an input buffer matrix;

FIGS. 30A and 30B arranged side by side comprise a wiring diagram of an output buffer matrix; and FIGS. 31, 31A and 32 through 39 are schematic diagrams of certain components useful in practicing the invention.

TIME SHARING AND INTERNAL ROUTING

Figure 1:
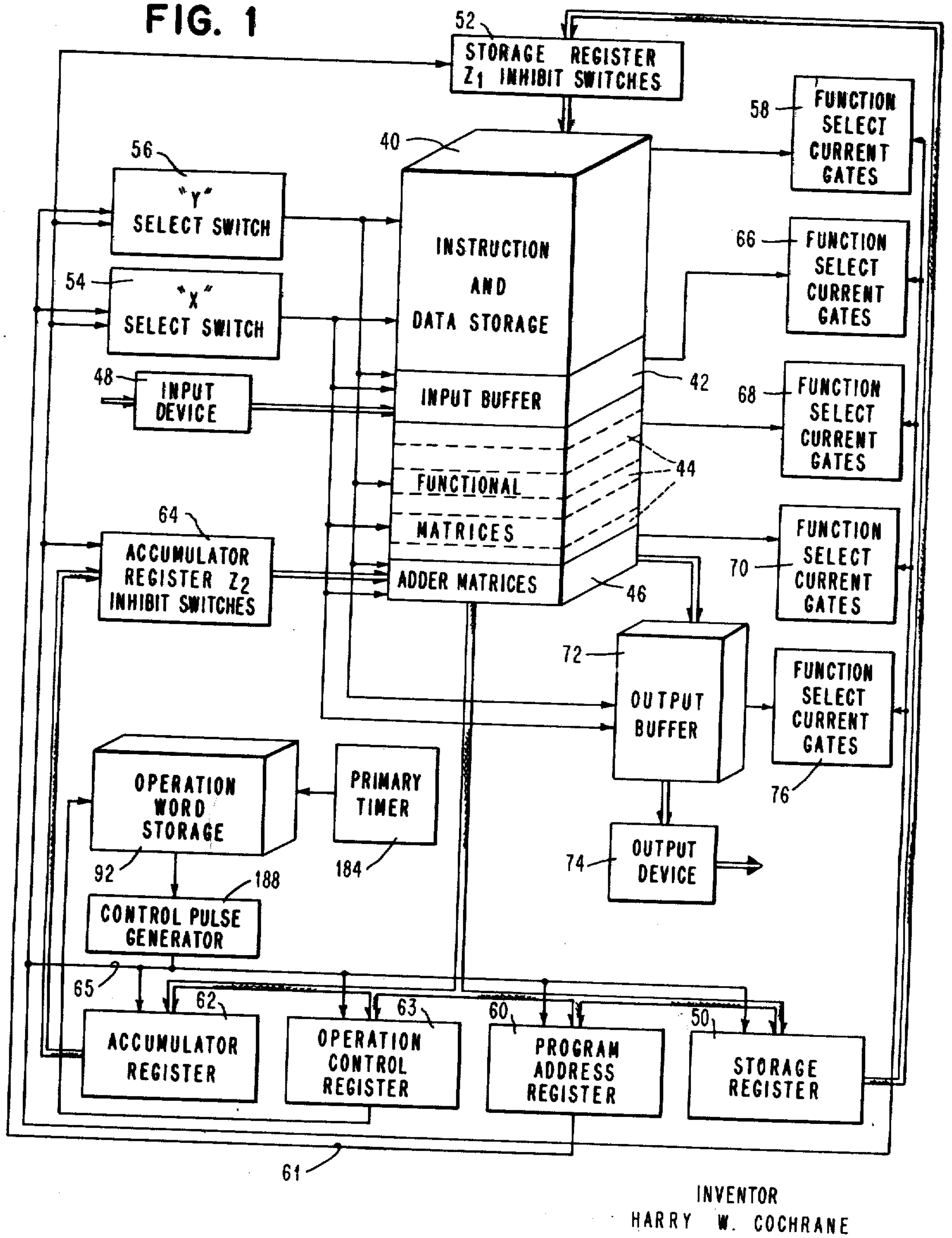

Referring to FIG. 1, an assemblage of core matrices is indicated in block form, comprising an instruction and data storage or memory section 40, an input buffer 42, a plurality of miscellaneous functional matrices 44 and a group 46 of functional matrices specific to addition and subtraction, including carry generation and carry propagation. Instructions and data may be put into the instruction and data storage section 40 by way of the input buffer 42 by means of an input device 48. Information so introduced preferably does not go directly into the storage section 40 from the buffer but is first routed to a storage register 50 over a system of time shared sense lines. These lines pass through the matrix units 40, 42, 44, 46 to the storage register 50, and to a program address register 60, an accumulator register 62 and an operational control register 63, in each of which information may be temporarily stored as by means of triggers. At a suitable time the triggers in the storage register 50 selectively actuate a set of $Z_1$ inhibit switches comprised in block 52, thereby energizing a first set of inhibit drive lines which thread through the assemblage of matrices where they may be made available for use in any matrix by means of input gates individual to the various matrices. Instructions or data may be written into or read out of any selected address in the instruction and data section 40 under the control of an X select switch 54, a Y select switch 56 and a set of function select current gates 58.

An instruction read out of the memory section 40 may be transferred over the comon sense lines to the program address register 60 and the operation control register 63 where information contained in the instruction may be stored temporarily and used in the register 60 to control the movement of data or instructions into or out of memory and in the register 63 to control the performance of functional operations upon either data or instructions through an operation word storage unit 92 and a control pulse generator 188 actuated by a primary timer 184. Some of the main control paths are indicated by a cable 61 originating in the register 60 and a cable 65 originating in the control pulse generator 188.

Information on data or instructions may be moved from memory or from any functional matrix to the accumulator register 62 where it may be stored temporarily and used to control a set of $Z_2$ inhibit switches comprised in block 64 to impress the information over a second set of inhibit drive lines upon the adder matrix section 46.

Functional operation of the input device 48 and buffer 42 is controlled by function select current gates comprised in a block 66. Functional operation of the matrices 44 is controlled by a set of function select current gates 68 and functional operation of the adder is controlled by function select current gates 70.

Information may be read out of the computer from any matrix level by way of an output buffer 72 into an output device 74 but preferably does not go directly to the output buffer from the matrices, being routed over the common sense lines to the storage register, from which it goes over inhibit lines to the output buffer.

By routing the bulk of all information transfer always through either the storage register or the accumulator register, error checking may be concentrated in two places, one associated with each said register, thereby facilitating the detection of errors.

Figures 2, 2A:
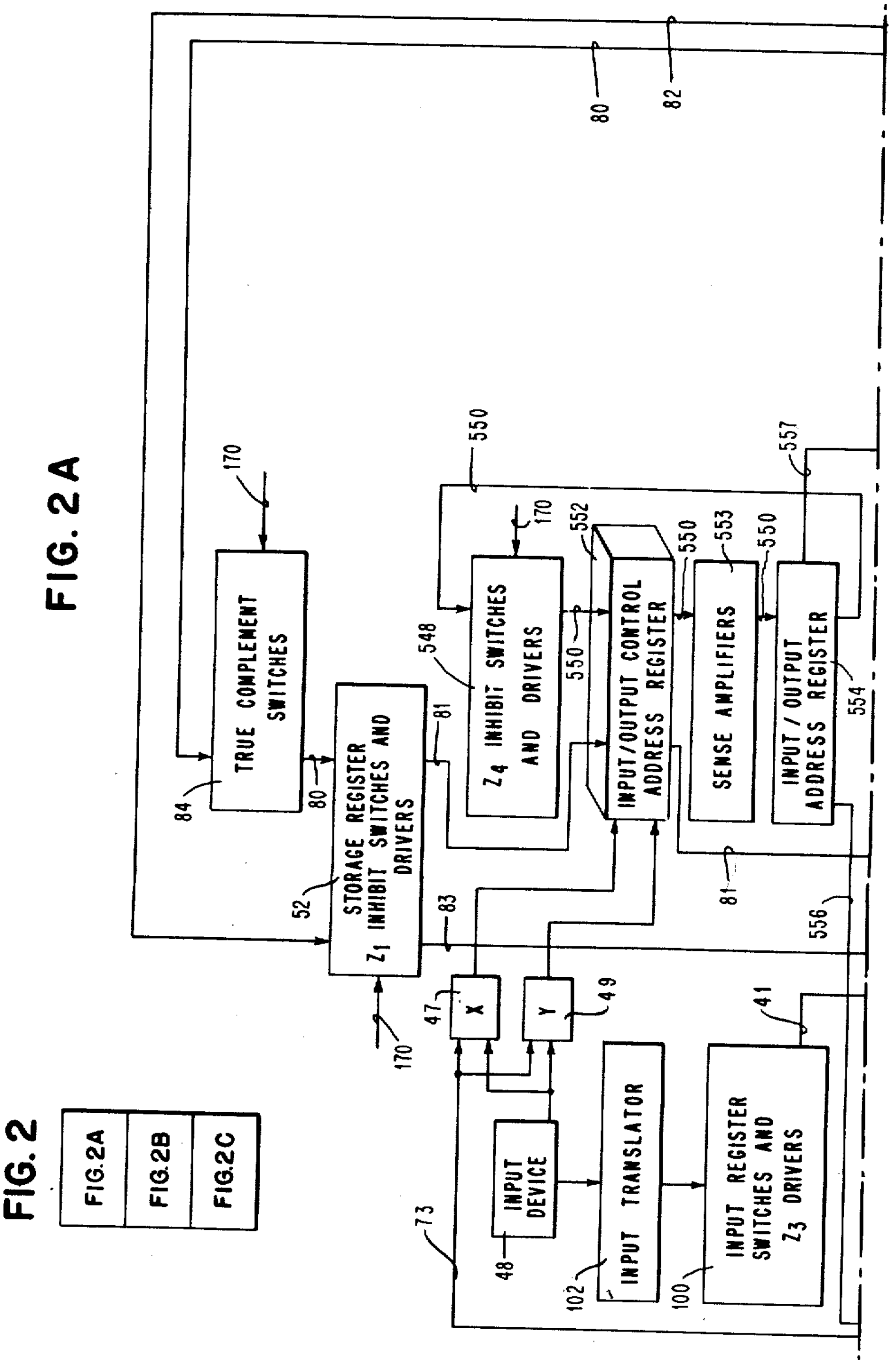
Figure 2B:
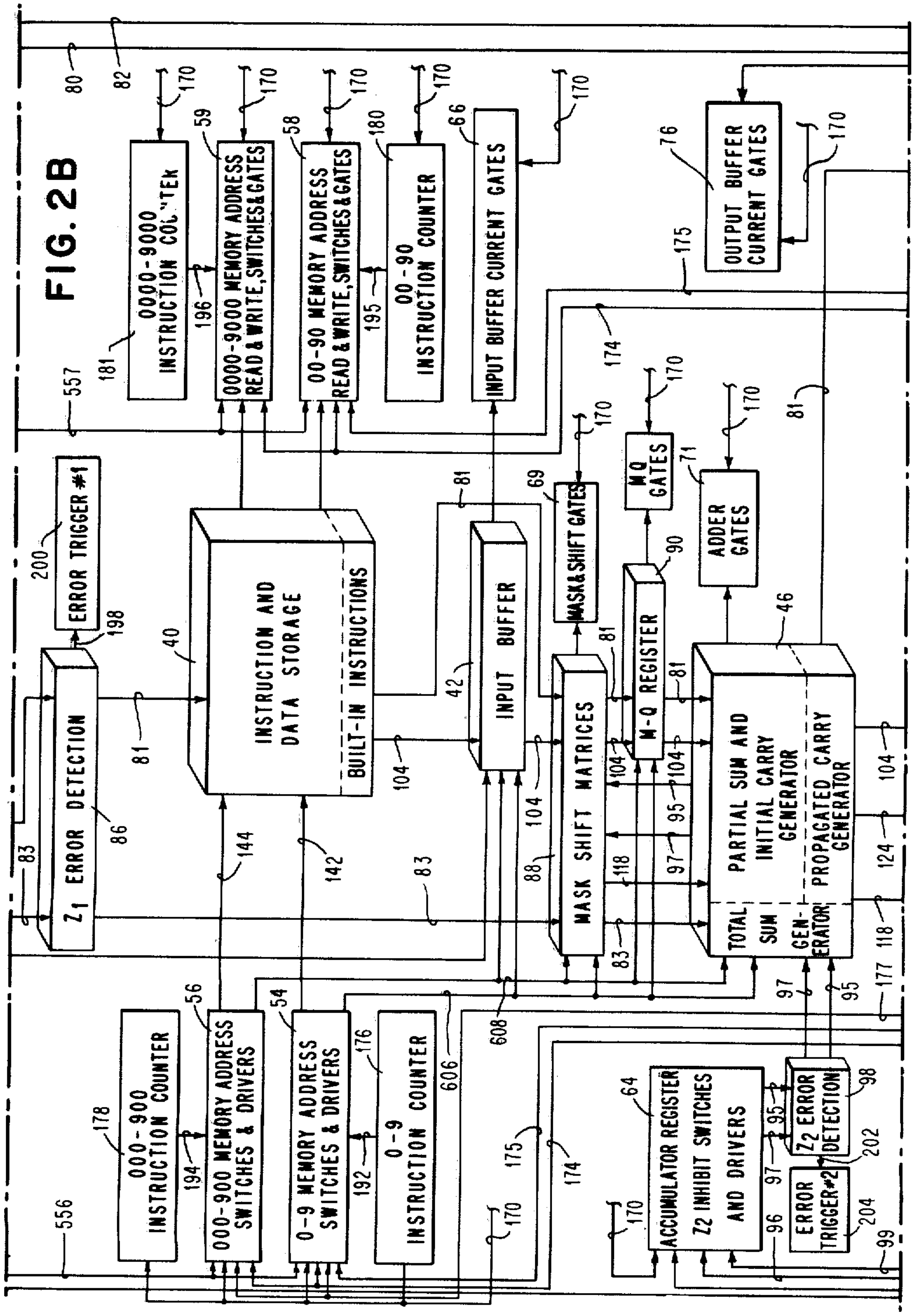

In FIG. 2, the system components shown in FIG. 1 are supplemented by additional components and developed in the form of a flow chart for the flow of instructions and data over the various time shared sets of interconnecting lines, more particularly the sense lines, inhibit lines and control lines. The apparatus components in FIG. 2 will be described in groups associated with the various sets of lines.

A first system of time shared lines comprises the output lines of the storage register 50 and a set of $Z_1$ inhibit lines controlled by the contents of the storage register. Cables 80 and 82 are shown emerging from the storage register, of which cable 80 carries information regarding the lower order digits and cable 82 regarding the higher order digits. As part of the same general system, inhibit cables 81, 83 emerge from the switch block 52.

The cable 80 passes through a set of true-complement switches in block 84, to provide for either addition or subtraction, and thence to the storage register $Z_1$ inhibit switch and driver block 52. Thence cable 81 passes through an input-output address register 552 to be described below, a $Z_1$ error detection block 86, the instruction and data storage 40, a mask-shift functional matrix block 88, a multiplier-quotient (MQ) register 90, the adder 46, and thence to the output buffer 72.

The cable 82 passes directly to the storage register $Z_1$ inhibit switch and driver block 52. Thence cable 83 passes through the $Z_1$ error detection block 86, and the mask-shift functional matrix block 88 to the adder 46.

A second system of time shared lines comprises the output of the accumulator register 62 and a set of $Z_2$ inhibit lines controlled by the contents of the accumulator register. Cables 94 and 96 are shown emerging from the accumulator register and running to the $Z_2$ inhibit switch and driver block 64, which cables relate to the lower order and higher order digits respectively. Cables 95 and 97 emerge from the accumulator register $Z_2$ inhibit switch and driver block 64 and pass through a $Z_2$ error detection block 98 to the adder 46 and thence to the mask-shift matrix block 88.

A cable 99 is provided to transmit the data address digits from the program address register 60 to the $Z_2$ inhibit switch and driver block 64, for use when a program address is to be operated upon in the adder.

A third set of inhibit lines comprising five $Z_3$ lines in a cable 41 runs from an input register switch and driver block 100 to the input buffer 42. The block 100 receives an input from the input device 48 through an input translator 102.

A set of time shared word sense lines for the lower order digits, represented by a cable 104 originates in the instruction and data storage 40 and passes through the input buffer 42, the mask-shift matrix 88, the MQ register 90, the adder 46 and thence to a set of sense amplifiers 106. At the output of the sense amplifier block 106, the cable 104 branches. A branch goes to the program address register 60 through a program address register gate block 108. Another branch goes to a program index address register 61 through a program index address register gate block 109. Other branches go respectively to a mask-shift register 57 through a mask-shift register gate block 107; to an operation code register 63 through an operation code register gate block 120, to the accumulator register 62 through an accumulator register gate block 112, to the storage register 50 through a storage register gate block 114, and to an MQ digit register 116 through an MQ digit register gate block 115. An addressing control cable 123 runs from the operation code register 63 to an operation word storage block 92 and the output of the block 92 is connected by a cable 93 to a control pulse generator 188.

A set of time shared word sense lines for the higher order digits, represented by a cable 118 originates in one of the functional matrices, here the mask-shift matrix 88, and passes through the adder 46 and the sense amplifier block 106 and then branches, one branch going through the accumulator register gate block 112 to the accumulator register 62 and another branch going through the storage register gate block 114 to the storage register 50.

A set of carry sense lines represented by a cable 124 originates in the adder 46 and passes through the sense amplifier block 106 and thence through a carry register gate block 128 to a carry register 130.

A single digit sense cable 132 originates in the output buffer 72 and passes through a sense amplifier gate block 134 and a sense amplifier block 136 to an output register and switch block 138 and thence to the output device 74 by way of an output translator 140.

A cable 142 of X driver lines originates in the X selected switch block 54 which in FIG. 2 is called the 0–9 memory address switch and driver block. The cable 142 runs to the instruction and data storage 40. A cable 144 of Y driver lines originates in the Y select switch block 56 which in FIG. 2 is called the 000–900 memory address switch and driver block and runs to the block 40.

A plurality of additional control lines are shown in FIG. 2. One set of control lines represented by a cable 170 originates in the control pulse generator block 188 and distributes lines to switches, gates, etc., wherever control pulses are needed in various parts of the system. Some of the connections from cable 170 are indicated in the figure.

Another set of control lines represented by a cable 174 originates in the program address register 60 and distributes control lines to the switch blocks 54 and 56, and the 00–90 and 0000–9000 switch and gate blocks 58, 59. Still another set represented by a cable 175 runs from the program index address register 61 to the blocks 54, 58. A control cable 177 runs from the mask-shift register 57 to 0–9 and 000—900 memory address switch and driver blocks 54 and 56, for control of the mask-shift matrix block 88.

A primary cycle timing system is shown which is controlled by an oscillator or clock 182 which in turn energizes a primary timer 184. Pulses from the timer 184 are supplied over a cable 186 to the operation word storage block 92.

Other control lines include a line 192 connecting the 0–9 instruction counter 176 to the 0–9 switch block 54, a line 194 connecting the 000–900 instruction counter 178 to the 000–900 switch block 56, and cables 195 and 196 connecting the 00–90 and 0000–9000 instruction counters 180 and 181 respectively to the respective gates in the blocks 58 and 59. A line 198 connects the $Z_1$ error detector 86 with an error trigger 200, and a line 202 connects the $Z_2$ error detector 98 with an error trigger 204.

A write pulse line for carry digits is shown at 208 running from the carry register 130 to cable 80. A single digit cable 212 runs from the MQ digit register 116 to the cable 80.

The input-output address register 552 mentioned above as being inserted in the cable 81 is controlled by the $Z_1$ inhibit switch and driver block 52 and also by a $Z_4$ inhibit switch and driver block 548. A regenerative cable 550 connects the block 548 to the input-output address register 552, and thence via a sense amplifier block 553 and an input-output address register block 554 back to the input of the $Z_4$ inhibit block 548. An address cable 556 runs from the input-output address register 554 to the memory address units 54, 56, and an address cable 557 runs from the register 554 to the switch and gate blocks 58, 59.

Address switch and driver blocks 47 for the X coordinate and 49 for the Y coordinate may be provided for addressing the input-output control address register 552 under the control of the input device 48. Output buffer 72 may be addressed by the X and Y blocks 54, 56, although for clarity in the drawing separate X and Y blocks 69 and 71 respectively are shown.

Components which may comprise three-dimensional arrays of elements, such as the memory unit 40, input buffer 42, adder 46, mask-shift matrix unit 88, etc., are shown as three-dimensional boxes or blocks, whereas other components are shown as rectangles.

FIG. 3 shows a preferred form of alpha-numeric code for use with a computer of the type described herein. The code uses combinations of five bits designated the 0, 1, 2, 3 and 6 bits respectively, to represent the decimal digits 0 through 9 and to represent alphabetic characters. The code is a 2-out-of-5-bit code, in that each coded digit is represented by a combination of exactly two of the five bits. As there are exactly ten ways of combining five objects two at a time without regard for the order in which the objects appear, a 2-out-of-5 code is well suited to representing the ten decimal digits. The code shown in FIG. 3 has the convenient property that the sum of the numbers by which the two bits are designated is equal to the decimal digit which the combination represents. For example, 3 is represented by bits 1 and 2, 6 is represented by bits 0 and 6, 9 is represented by bits 3 and 6, etc. It will be noted that with the single exception of the decimal digit 3 there is one and only one way of forming each decimal digit with this property. The decimal digit 3 may be formed either by bits 1 and 2 or by bits 0 and 3. It will also be noted that there is no combination of two of the five bits that sums up to zero. The problem may be resolved by using one of the 3-combinations to represent zero. A mnemonic choice is made in FIG. 3 wherein 0 and 3 represents zero and 1 and 2 represents 3. Alphabetic characters are represented by combinations of two coded decimal digits.

An advantage of a code of the form in which every digit is represented by the same number of bits, two bits in this case, is that error checking is facilitated. The bits received may be counted, for example in the error detectors 86 and 98, and if either more or less than two bits are received an error is indicated. Codes other than that shown in FIG. 3 may be used if desired, to suit special requirements of a particular situation.

In the illustrative computer disclosed herein, it will be assumed that all data, instructions, algebraic signs, operations, etc. are expressed in terms of coded decimal digits. It will be noted that alphabetic characters may be used if desired. Alphabetic characters are handled exactly like decimal digits except that two coded decimal digits are required to represent each alphabetic character. The sign position in a word format may be employed to indicate whether alphabetic characters or numeric characters are to be interpreted, and to specifiy the algebraic sign in the case of a number. For example, a digit 0 in the sign position may indicate a positive number, a digit 5 a negative number, and a digit 6, alphabetic matter.

A group of digits may be used variously to represent a number, a word, an instruction, an operation, etc. In general, a group of digits so used will be called a word, regardless of the nature of its informational content.

There are six basic types of words which have prime significance in the operation of the computer described herein. These are the instruction word, the index word, the data word, the operation code word, the accumulator register word and the storage register word. Illustrative formats for each of these types of words are shown in FIG. 4. Of these types, the instruction word is the most dominant in the operation of the computer because it determines what type of operation will be performed and the storage address of information required in performing the operation. These words and how they affect the operation of the computer are described in the following paragraphs.

FIG. 4A shows a format for the instruction word. This word is stored in the instruction and data storage unit 40. The word comprises 55 bits representing a total of 11 digits in digit positions 1–11 that are numbered from right to left. Digit positions 1 and 2 are reserved for an index word address, digit positions 3 through 6 for a data word address, 7 and 8 for masking and shifting instructions as desired, 9 and 10 for an operation code word address, and digit position 11 for an algebraic sign or a prefix to be interpreted in conjunction with the instruction.

Each digit position is represented by five bits of which any two may be binary "ones" while the other three bits are binary "zeros," in accordance with a 2-out-of-5-bit code such, for example, as shown in FIG. 3. The index word address tells where to find an index word which may be used to modify the meaning of the instruction, as by modifying the data address. The data address tells where to find the data word upon which an operation is to be performed in accordance with the instruction. The masking or shifting instruction is used for column shifting as in multiplication and division and to disregard certain specified digits which constitute the data word, as when, for example, a ten digit number is to be modified by leaving off one or more digits at the left or at the right or both to obtain a number with fewer digits, and for other purposes. The operation code word address gives the address of a particular operation code word contained in the operation word storage block 92. The sign digit position may be used as part of the operation code in order to increase the number of operation words which may be addressed in the block 92. A core matrix in the block 92 may accommodate 100 operation words while by using the sign digit position and 10 matrices, 1000 operation words may be stored.

FIG. 4B shows a format for the index word. As shown, only the digit positions 3 through 6, and 11, are used. Positions 3 through 6 represent an index word which is to be used to modify the data address contained in digit positions 3 through 6 of an instruction word. The position 11 is the sign position, which may be used to tell whether the index word is to be added to or subtracted from the data address. The index word is useful, for example, where a given operation is to be repeated upon a succession of different items of data, each at a different data address.

FIG. 4C shows a format for a data word. The data word may utilize ten digit positions and the sign position. It will generally represent a given number upon which an operation is to be performed. The sign position is used to indicate the algebraic sign of the number represented. Zeros may be inserted into the higher order positions whenever the data word does not completely fill the format.

Figures 4D, 4E, 4F:
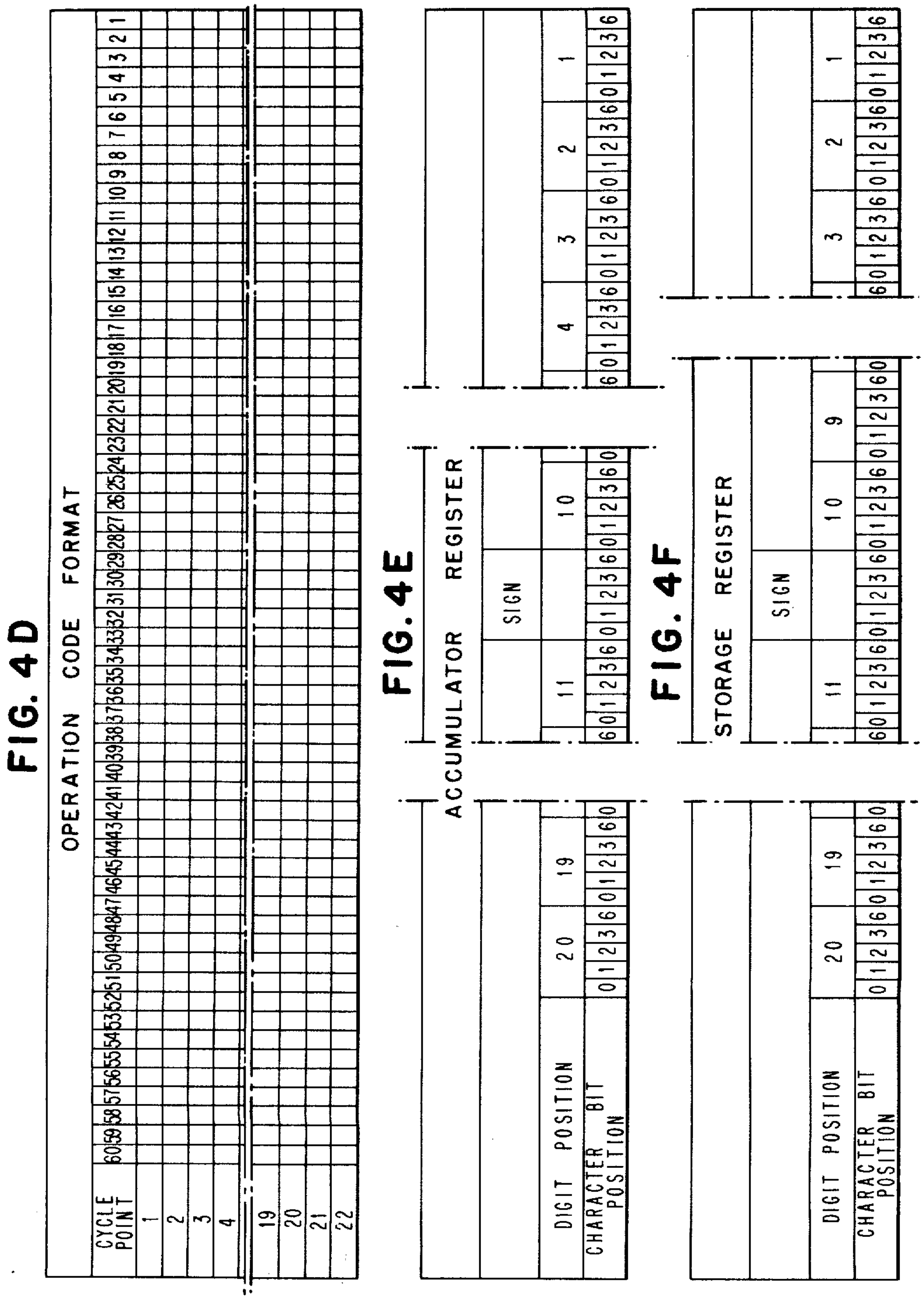

FIG. 4D shows a format for an operation code word. This format may actually represent a group of code words, one for each interval, called a cycle point, of the timing cycle of the primary timer 184. The format as shown provides for 60 binary bits in each cycle point, which may be used to indicate the settings of as many as 60 switches required to set up the computer to perform a particular series of operations represented by the operation code word. Here, coded decimals are not used, the code being a simple binary code. The number of switches provided may be either more or less than 60, as desired.

FIG. 4E shows a format for an accumulator register word. Since two ten-digit numbers may be multiplied together in the computer to produce a twenty-digit product, the accumulator should accommodate twenty-digit numbers. Accordingly, the accumulator register word comprises twenty digits plus sign and represents a word which may appear in the accumulator register. In order to conform with the formats shown in FIGS. 4A, B and C, the sign may be placed in a position between the tenth and eleventh digit positions.

FIG. 4F shows a format for a storage register word. This is similar in form to the accumulator word format shown in FIG. 4E.

Figure 5:
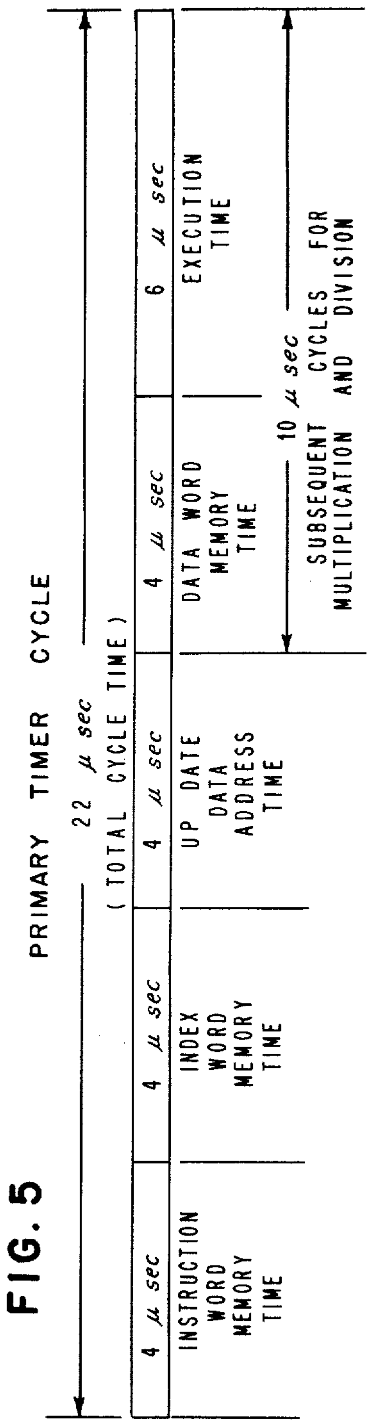
FIG. 5 is a time chart of a typical primary timer cycle that may be used in practicing the invention.

FIG. 5 shows an analysis of an illustrative primary timer cycle of a computer as described herein. In the embodiment in FIG. 2, the primary timer 184 is controlled by the clock 182, which may be, for example, an oscillator operating at 500 kilocycles per second. In FIG. 5, the timer is illustrated as having a total cycle time of 22 microseconds. The figure indicates that during the first 4 microseconds of the timer cycle the computer reads an instruction word and puts the information therein contained into one or more temporary registers and then regenerates the instruction word back into memory. During the next 4 microseconds it reads and registers the information from an index word and regenerates the index word back into memory. During the following 4 microseconds it modifies the data address obtained from the instruction word in accordance with the information supplied by the index word, to bring the instruction information up to date. During the next 4 microseconds the computer reads and registers the proper data word and regenerates it back into memory. During the last 6 microseconds of the timer cycle the computer normally executes the instruction, and is then ready to start the cycle over again using the next instruction. Certain operations, such as multiplication and division may require longer than 6 microseconds, in which case the computer may be programmed to extend its primary timer cycle, as for example, in additional periods of 10 microseconds each until the desired operation is completed. It will be understood that the time intervals stated are illustrative and will depend to a certain extent upon the number of cores which an individual core driver is required to drive. In any case where excessive delay time occurs due to driving a large number of cores, as for example in the memory unit 40, multiple core drivers may be provided under the control of a single switch, each core driver driving a group of cores. In this way the delay time may be reduced.

FIGS. 6A and 6B illustrate how the sense lines such as those coming out of the sense amplifier block 106 may be time shared by a plurality of registers.

In these figures, carry digits for each of 20 decimal places as well as the bits for a sign and a ten-digit word are shown as being accommodated in sense amplifiers numbered from 1 through 125. Pulses representing the carry digits may be received from the sense amplifiers 106 through 125 in the block 106 and may be gated into the register 130 by means of the carry register gate 128 as shown in FIG. 6. This gating is accomplished by providing each trigger such as trigger 400 with a trigger gate circuit such as 402 of the type shown in FIG. 32. A lead 404 is provided which is connected to the conditioning inputs of all the gate circuits of which 402 is an example. When it is desired to register carry digits in the carry register 130, a carry register gate pulse may be impressed upon the lead 404 to condition all the gate circuits so that when pulses are sent over the sense lines these pulses will actuate the triggers in the carry register 130.

By means of associated gates, as shown in FIG. 6, other registers may be served, for example, the MQ digit register 116 may be conditioned by means of the MQ digit register gate 115, the program index address register 61 by the index address register gate 109, the program data address register 60 by the program register gate 108, the operation code word register 63 by the operation code word register gate 120. The storage register 50 may be conditioned by means of the storage register gate 114, and the accumulator register 62 may be conditioned by means of the accumulator register gate 112. Input gate pulses for operating gates 115, 109, 120, 114, 112, may be applied over lines 113, 110, 119, 117, 121, respectively.

By means of the various input gates, information sent over the sense lines may be registered in any one or more of the various registers as needed in the course of computations and in the handling of data and instructions.

OPERATION CODE WORD STORAGE

FIG. 7 is a block diagram of a core matrix for storing operation code words, showing how the addressing lines, timing lines and output lines may be time shared by two or more such matrices.

FIG. 8 shows a wiring scheme of a portion of one such core matrix for operation code word storage and control pulse generation.

Referring to FIG. 7, two operation code word storage units 474 and 476 are shown in three-dimensional block form. The generator 474 may be used when no branch control is in effect, the generator 476 being used to carry out a branch control operation. In the illustrative embodiment, a 100-address storage capacity for operational control words is assumed to be provided. At each address, a plurality of 60 bit operational control words may be stored. A plurality of primary timer pulses are employed, 22 pulses in the illustrative embodiment, the words stored at a given address being assigned one to each primary timer pulse. All the pulses will preferably be of the same duration, for example, one micro-second each. The period of a given pulse will be termed a "cycle point," the cycle points being numbered from 1 to 22, inclusive. During each cycle point a plurality of control operations may be carried out, resulting in the setting of the necessary switches and gates to perform one or more steps in the particular functional operation specified by a given instruction. Some steps in a given functional operation may require two or more cycle points to complete.

An operation code word storage block as used herein is essentially a memory device with built-in information from which the contained information may be repeatedly read out as needed. In an example of a core matrix type of embodiment, each operation code word stored is represented by 60 locations in the matrix, at each of which locations either a core is provided or no core is provided, according to a 60 bit binary code. Accordingly, the possible core positions in the matrix of either of the generators 474 and 476 are arranged in a 100 by 60 by 22 array.

FIG. 8 shows illustrative wiring for one plane of core positions such as may be provided in an operation code word storage block for one cycle point. In the figure, a plurality of cores 478 are represented by rings. For the sake of clarity in the drawing, only nine rows of core positions are shown and eleven columns of core positions whereas the complete plane may comprise, for example, 100 rows and 60 columns. Each row of core positions is traversed by two pairs of address lines, for example, pairs 480 and 482 in the top row. The lines in the pair 480 represent one digit, for example, the tens digit, of a two-digit address, the lines in the pair 482 representing the units digit, as in the numeric code of FIG. 3. A primary timer pulse line 484, a reset line 485 and an inhibit line 487 traverse all the six thousand possible core positions in the plane represented in FIG. 8. Each column of core positions is traversed by a different one of a plurality of control pulse sense output lines 486. Each of the output lines 486 controls the operation in control pulse generator 188 of a different one of a possible 60 sources of pulses of various time durations, phases and wave forms as required in various parts of the computer. In each row, a core is placed at each core position that corresponds to a particular output line in cable 170 which it is desired to pulse in the cycle point to which the given matrix plane is assigned. No core is provided at any position corresponding to an output line which it is desired shall not be pulsed. Each core that is provided is threaded by the four address lines and by the sense output line individual to the core position occupied by the core in question, and every core in a given plane is threaded by the primary timer pulse line which is individual to the given plane.

The core plane illustrated in FIG. 8 may, for example, be the top plane 488 of FIG. 7. For the sake of clarity in FIG. 7, only thirteen planes are shown in the generator 474, of which the ninth plane, for example, is indicated at 490. In the generator 476, the top plane is designated 492. It will be noted that in general the arrangement of cores and blank core positions will be different in all the planes 488, 490, 492, etc.

FIG. 7 shows the application of common lines to one or more operational control pulse generators. Ten address lines 494 serve both storage units 474 and 476 in common. Each of the lines 494 is threaded with various combinations of three other lines through forty of the rows of cores in each layer or plane in each storage unit in accordance with the two-out-of-five-bit code. The plurality of primary timer pulse input lines 496 each thread through all the cores in one plane of the unit 474 and one plane of the unit 476. The same set of output lines 486 shown in FIG. 7 thread through the respective columns of cores in every plane of both units. A branch inhibit line 498 threads through every core in the unit 474 and a non-branch inhibit line 500 threads through every core in the unit 476. The reset line 485 may thread through all the cores of all the operational control pulse generators of which the generators 474 and 476 are representative.

In the operation of the arrangement of FIGS. 7 and 8, information is received over the address lines 494 (FIG. 7) from the inhibit drivers number 41 through 50, giving an address selected from the 100 addresses comprised in the operation word storage units 474 and 476. In accordance with the code of FIG. 3, three of the five units address lines carry inhibit current and three of the five tens address lines carry inhibit current. As a result, one row of sixty cores in each corresponding plane of the non-branch and the branch control pulse generators, the row of the same address in every plane, is left uninhibited by the currents in the address lines. A non-branch inhibit pulse over the lead 500 inhibits all the cores in the branch control unit 476 in the case of an ordinary operation that does not involve branching. The primary timer pulse lines may now be pulsed sequentially. As each timer pulse is applied it flips all the uninhibited cores in the single row of cores that have been selected in the plane to which the timer pulse is applied. The flipping of a core generates a control pulse on the control pulse sense output line to which the core is coupled. The resultant control pulses actuate selected pulse sources in the control pulse generator 188 to send the required pulses over the control lines 170 to the various gates and switches. In case a branch operation is called for, a branch inhibit pulse is applied to the line 498 to inhibit the unit 474 and the line 500 is left uninhibited. After the last timer pulse, a reset pulse is sent over the line 485 threading all the cores to clear the generators for the next instruction.

For the purpose of branch programming, a plurality of operation word storage units may be provided, one for a non-branching use and one or more alternative units for branch operation. All such units may share a common set of primary timing drivers and a common set of address lines on a time sharing basis. At all times, all but one of the units will be inhibited. A branch inhibit gate pulse may be provided to inhibit the ordinary unit while a branch instruction is being carried out, and a non-branch inhibit gate pulse may be provided to inhibit each branch operation unit while an ordinary instruction that does not involve branching is being carried out. All the operation word storage units may share a common set of control pulse sense output lines and the common control pulse generator 188.

It will be noted that the above illustrates a general principle under which core arrays each individual to a different function to be performed may be provided, together with an inhibit winding individual to each array, and means to select a desired array by withholding inhibit current from the array to be selected.

Figure 2C:
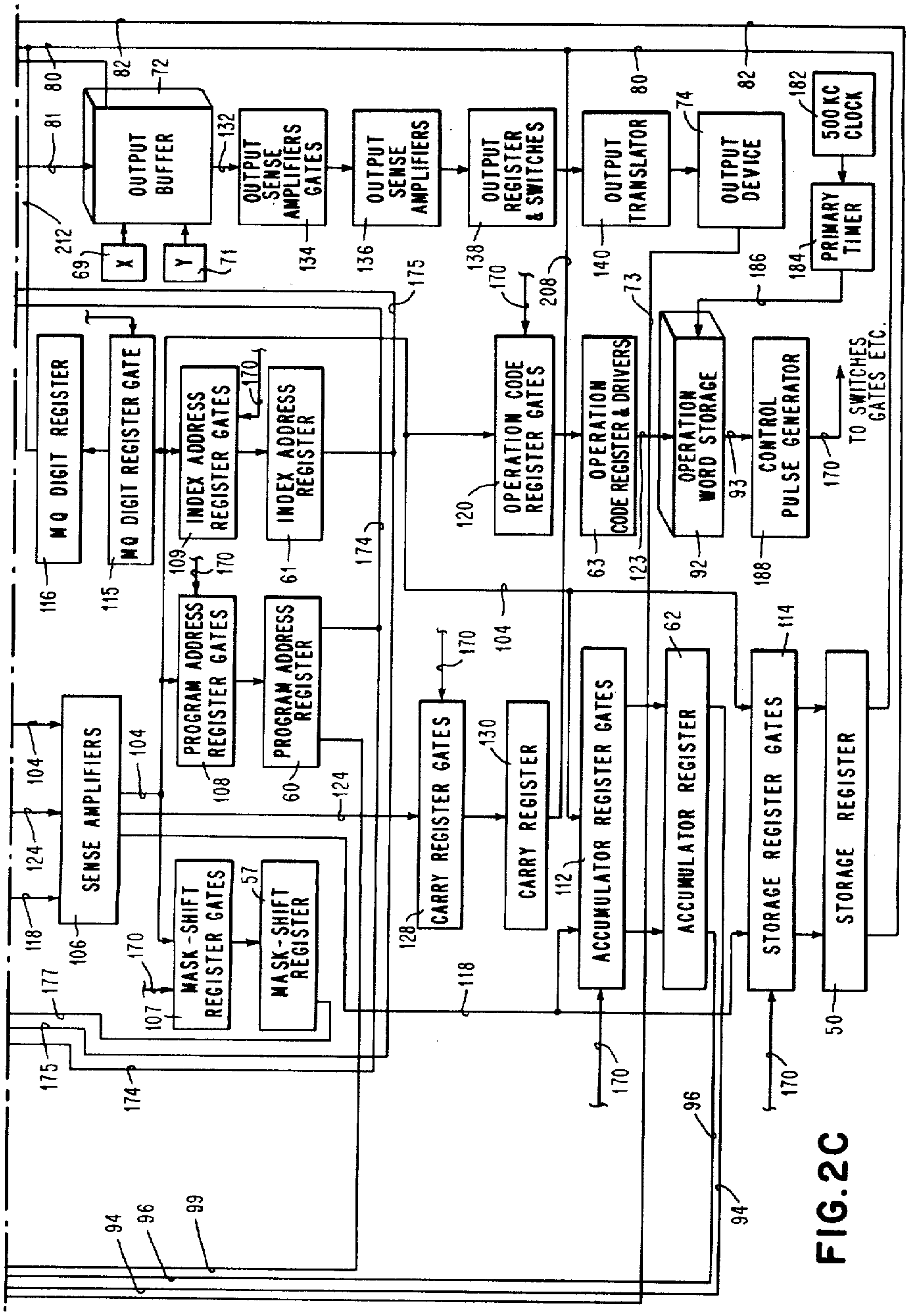

In the arrangement shown in FIG. 7, an address for the operation code word storage unit is applied from the inhibit drivers 41 to 50. In this situation, the unit will be addressed during the time when an instruction word containing the operation code word address is being regenerated into memory. While this system effects a certain savings in components (no operation code address register and drivers are required) it does so at the expense of time. If an operation code word address register and associated drivers are provided for the operation code storage array (as shown at 63 in FIG. 2C) then the operation code word address may be read into the register 63 upon readout of the instruction word and his address may be used immediately to read out the operation code word without waiting to regenerate the instruction word in memory. In this last described system, the operation code word set is available at an earlier time than in the system first described. In the remainder of the specification, it will be assumed that the system shown in FIG. 2C is employed. The details of the storage unit of FIG. 7 are, of course, the same in this system as in the system which employs the inhibit drivers to address the operation code word storage unit. The only difference is that the lines 494 of FIG. 7 are driven from the drivers of unit 63 via cable 123. The drivers of unit 63 are, then, essentially duplicates of inhibit drivers 41–50.

MEMORY ADDRESS SELECTION

FIG. 9 shows in block diagram form a memory address selection system whereby an instruction word or a data word may be written into memory at any selected memory address or may be read out from any selected memory address under a variety of independent controls. The components shown in FIG. 9 will be referred to more particularly below in conjunction with this figure and the related FIGS. 10A, 10B, 10C and 11.

A preferred principle of operation of the computer described herein is that whenever a word is to be written into the instruction and data storage 40 the word is first sent to the storage register 50. Due to the fact that the memory 40 is of the destructive type, when a word is read out of storage and the word is to be saved for future use, the word must be written back into storage in each instance. The writing back also is done through the storage register 50. In general, when a word is read out of memory the word or a portion thereof may be sent to one or more registers, for example (see FIGS. 2A, B, C), the storage register 50 for writing back into memory, the accumulator register 62 for use in the adder 46, the program address register 60, the index address register 61, the mask-shift register 57, and the operation code register 63 for use in setting up the computer to perform a particular operation as called for by an instruction word. FIG. 9 relates mainly to a system for reading a word out of a specified address in memory and transmitting the word to the storage register 50 and for writing into memory a word which is contained in the storage register.

Figure 10A:
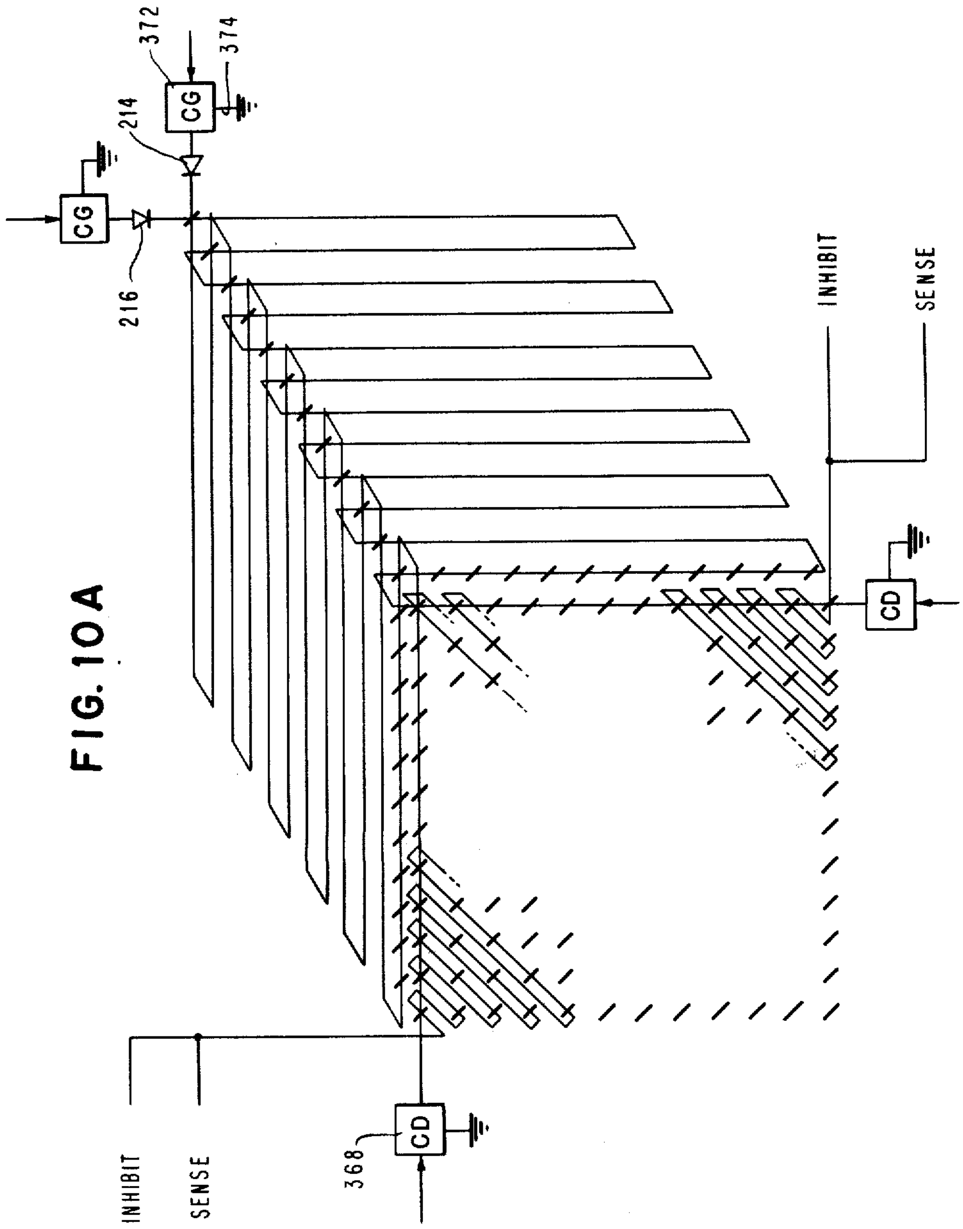
Figure 10B:
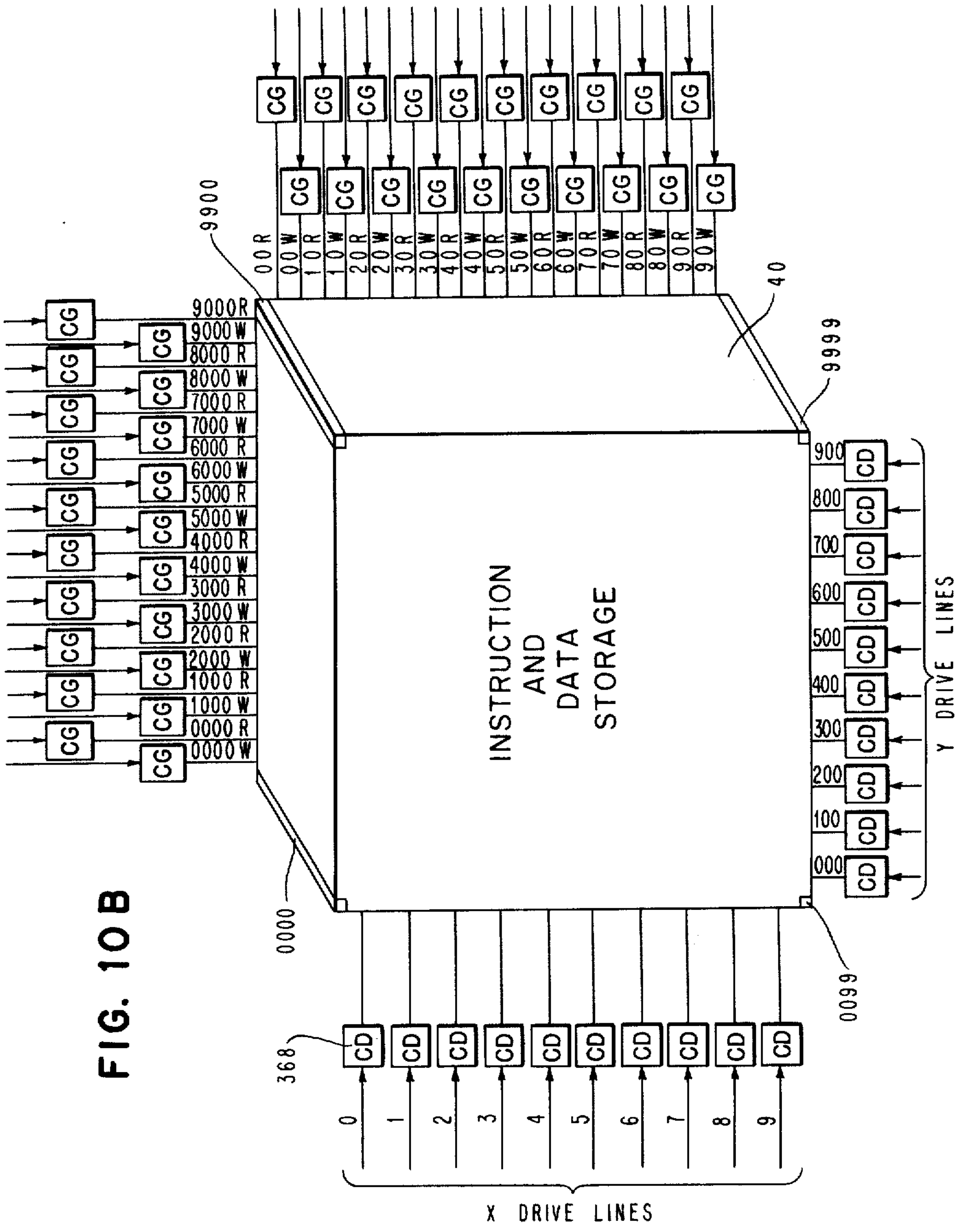
Figure 10C:
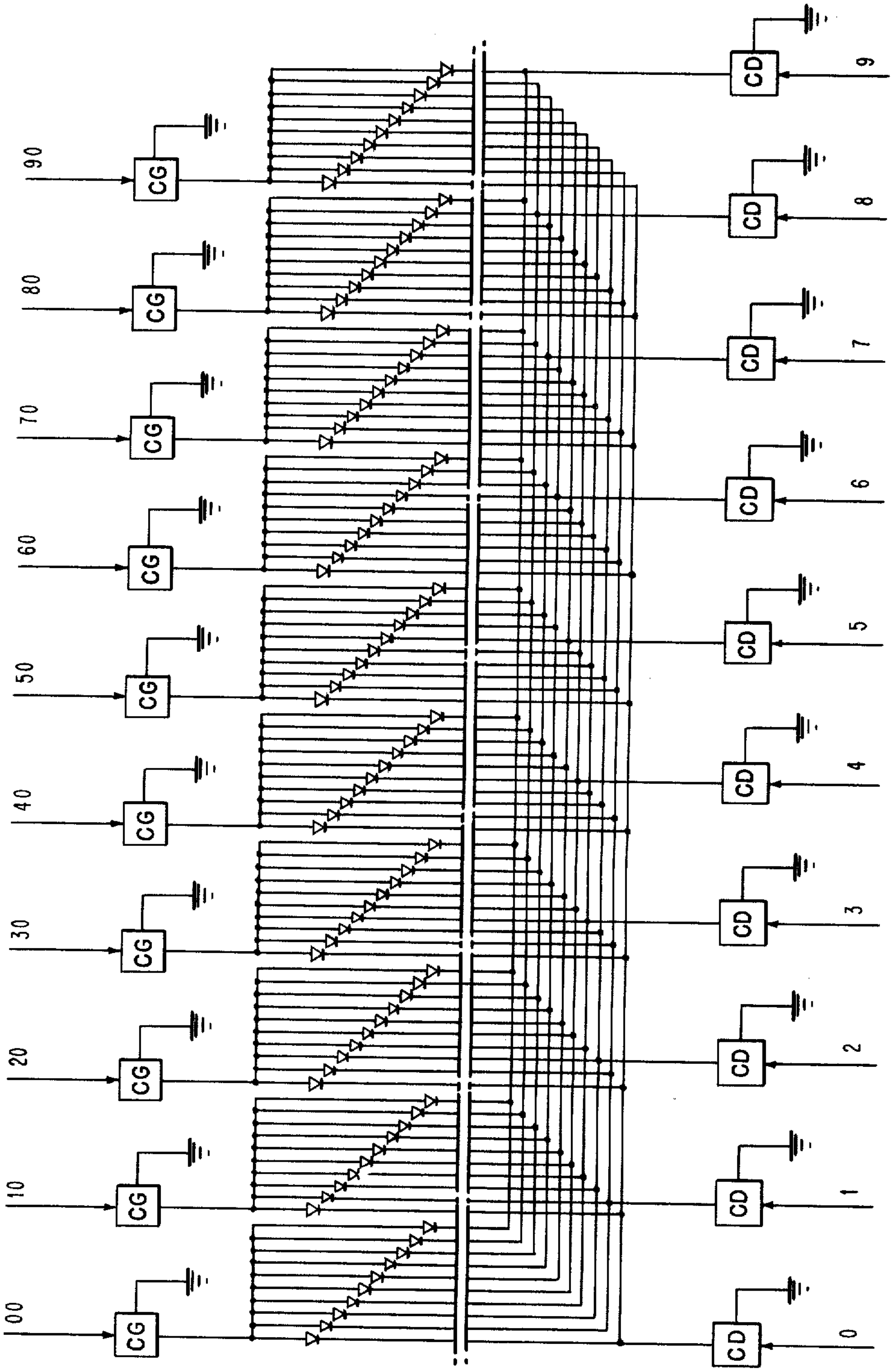
Figure 11:
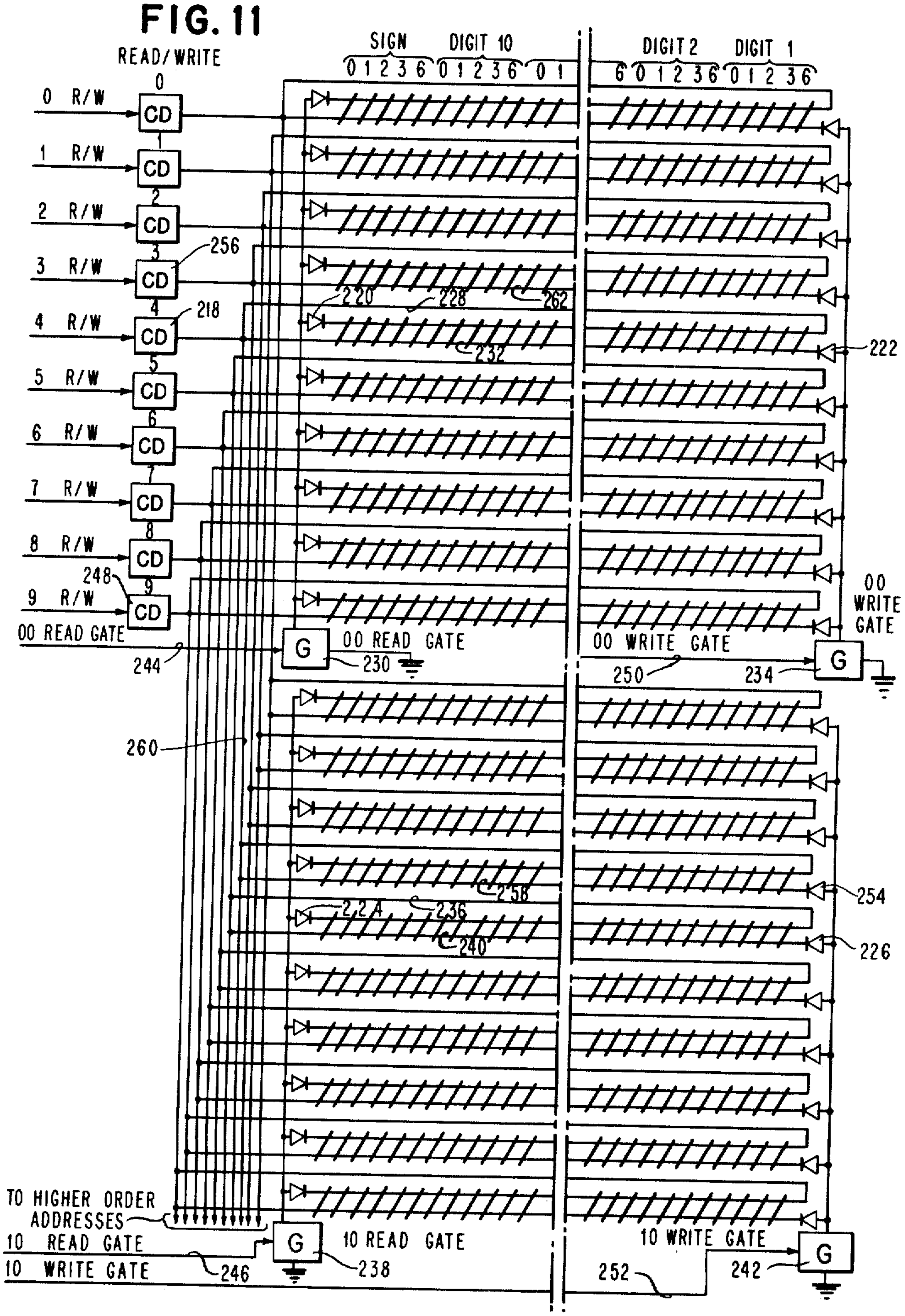

FIGS. 10A, 10B and 10C show in simplified form certain general principles of the wiring plan of core matrices which may make up the instruction and data storage 40 together with illustrative core drivers, diodes and gates which are utilized to select a specified address in memory. FIG. 11 is a more detailed schematic diagram of a portion of the addressing system for the memory.

Referring now to FIGS. 9, 10A, 10B, 10C and 11, the storage unit 40 may have a capacity of 10,000 words. Each word comprises 10 decimal digits and an algebraic sign. Each digit and the sign comprises five bits, making a total of 55 bits per word, the full complement of cores for such a unit being 550,000 cores. The cores may be arranged in 55 planes with 100 rows and 100 columns of cores in each plane. To assist in visualizing the memory unit, a smaller array is shown in FIG. 10A having 12 rows and 12 colums of cores in each of 13 planes. As viewed in FIG. 10A, these planes of cores are parallel to the plane of the paper. The words in the larger storage 40 may be identified by addresses from 0000 to 9999, inclusive. Each address refers to a line of 55 cores extending in the direction perpendicular to the plane of the paper, corresponding to a line of 13 cores as shown in the smaller array of FIG. 10A. This line of cores may be regarded as the intersection of two core planes each of which extends in the direction perpendicular to the plane of the paper. These latter planes each comprise a 55 by 100 array of cores in the larger unit, and are either horizontal or vertical as may be visualized by reference to FIG. 10A. The vertical planes will be designated the Y planes and the horizontal planes the X planes.

As indicated in FIG. 10B, the addressing begins with address 0000 in the upper lefthand corner and runs down the first column to address 0099 in the lower lefthand corner of the larger unit. Thence the addresses run from 0100 to 0199 down the second column. Finally, in the 100th column the addresses run from 9900 in the upper righthand corner to 9999 in the lower righthand corner.

An X drive line labeled 0 in FIG. 10B has 20 parallel branches interior to block 40, two of which thread through all the cores in the top X plane. Another pair of branches of the 0 drive line thread through all the cores in the eleventh X plane; another pair thread all the cores in the twenty-first X plane, etc. The X drive lines labeled 0 extend to all addresses for which the units digit is a 0, there being ten pairs of such lines. Ten pairs of branches of the X drive line labeled 1 extend to all addresses for which the units digit is 1. Each of the X drive lines 0, 1, 2, etc., through 9 extends branches to all addresses for which the units digit is respectively 0, 1, 2, etc. through 9, and every core in the entire unit 40 is threaded by one and only one pair of X drive lines. In each pair, one wire is for write and the other for read, for use in a writing-in operation and a reading-out operation respectively, as shown more particularly in FIG. 11. For clarity in FIGS. 10A, 10B and 10C, only one wire of the pair is shown.

All the X drive lines are shown starting at the left front vertical edge of the array as viewed in FIG. 10B and after threading through all the cores in its designated X plane each X drive line as shown comes out of the array at the right rear vertical edge thereof. As shown in FIG. 10C, the drive lines are gathered together in groups of ten before emerging from the array, the write lines (FIG. 10B) from the top ten X planes being connected together in parallel and labeled 00W, the write lines from the next ten X planes being connected together in parallel and labeled 10W, etc., there being ten such groups labeled respectively 00W, 10W, 20W, etc., through 90W. A lead from each group goes to an individual gate in a group of gates, the 00–90 write gates which are included in block 58 (FIG. 2). Each of these gates 00W, 10W, 20W, etc., through 90W, thus controls a group of X write drive lines extending to all addresses for which the tens digit is respectively 0, 1, 2, etc., through 9. The X read drive lines are similarly gathered in groups of ten for control by the 00–90 read gates.

Each X drive line 0, 1, 2, etc., through 9 is provided with a core driver individual thereto, which can be selectively energized. Each write gate or read gate designated 00, 10, 20, etc., through 90 may be selectively made conductive. When one of the core drivers is energized and one of the gates is made conductive a half-select write pulse or read pulse may be sent through all the cores in a selected X plane. All the addresses associated with the selected X plane have the same units digit and the same tens digit. The group of addresses so selected may have any combination of two right-hand digits from 00 to 99 inclusive.

Selection of the two lefthand digits of an address may be effected in a similar manner by means of the Y drive lines, core drivers and the 0000–9000 write gates and 0000–9000 read gates.

For this purpose, a Y drive line labeled 000 is provided having twenty parallel branches two of which thread through all the cores in the first or lefthandmost Y plane. Another pair of branches of the 000 drive line thread through all the cores in the eleventh Y plane, etc. The Y drive lines labeled 000 extend to all addresses for which the hundreds digit is a 0, there being ten pairs of such lines. As a group, the Y drive lines 000, 100, 200, etc., through 900, extend branches to all addresses for which the hundreds digit is respectively 0, 1, 2, etc., through 9, and every core in the entire unit 40 is threaded by one and only one pair of Y drive lines.

All the Y drive lines are shown starting at the bottom front horizontal edge of the array as viewed in FIG. 10B and after threading through all the cores in its designated Y plane each Y drive line comes out of the array at the upper rear horizontal edge thereof. The Y drive lines are gathered together in groups of ten before emerging from the array at the top rear edge, the write lines from the ten leftmost Y planes being connected together in parallel and labeled 0000W, the write lines from the next ten Y planes being connected together in parallel and labeled 1000W, etc., there being ten such groups labeled respectively 0000W, 1000W, 2000W, etc., through 9000W. A lead from each group goes to an individual gate in the group of 0000–9000 write gates which are included in block 59 (FIG. 2). Each of these gates 0000W, 1000W, 2000W, etc., through 9000W thus controls a group of Y drive lines extending to all addresses for which the thousands digit is respectively 0, 1, 2, etc., through 9. The Y read drive lines are similarly gathered in groups of ten for control by the 0000–9000 read gates.

Each Y drive line 000, 100, 200, etc., through 900 is provided with a core driver individual thereto, which can be selectively energized. Each write gate or read gate designated 0000, 1000, 2000, etc., through 9000 may be selectively made conductive. When one of the Y core drivers is energized and one of the gates is made conductive a half-select write pulse or read pulse may be sent through all the cores in a selected Y plane. All the addresses associated with the selected Y plane have the same hundreds digit and the same thousands digit. The group of addresses so selected may have any combination of two lefthand digits from 00 to 99 inclusive.

By selecting an X plane and a Y plane and simultaneously sending half-select pulses through all the cores in each selected plane, the effect of a full select pulse is produced in a selected set of 55 cores associated with a selected one of the 10,000 addresses.

Each of the 200 X drive lines and each of the 200 Y drive lines is provided with a unidirectionally conductive element shown in FIG. 11 as a diode to prevent current from any driver from sending current through cores in more than one plane through multiple paths.

If excessive time delay is encountered due to the large number of cores to be driven by means of a single drive line, additional drive lines may be provided under the control of a single read-write switch, each drive line driving a smaller number of cores with decreased time delay.

The manner in which a single driver supplies a pair of drive lines, one for write and the other for read, is illustrated in relatively simple form in FIG. 11, for memory addresses 0 through 19. For example, the number 4 driver 218 is shown feeding four lines 228, 232, 236, 240. A diode 220 is included in the line 228 which threads from right to left through the 55 cores at address 04 and is connected, together with other lines, to a 00 read gate 230. A diode 222 is included in the line 232 which threads from left to right through the 55 cores at address 04 and is connected, together with other lines, to a 00 write gate 234. A diode 224 is included in the line 236 which threads from right to left through the 55 cores at address 14 and is connected, together with other lines, to a 10 read gate 238. A diode 226 is included in the line 240 which threads from left to right through the 55 cores at address 14 and is connected, together with other lines, to a 10 write gate 242.

The 00 read gate may be actuated by means of a pulse over a 00 read gate line 244 to close a circuit to ground from the number 4 driver 218 over the line 228 to read out information stored in the 55 cores at address 04. To read out information stored at address 14, on the other hand, the 10 read gate 238 may be actuated by means of a pulse over a 10 read gate line 246 to close a circuit to ground from the number 4 driver 218 over the line 236. Information may be read out in similar manner from other memory addresses, for example, from address 19 by energizing the number 9 driver 248 and actuating the 10 read gate 238.

For writing information into memory in the arrangement of FIG. 11, a lead 250 may be used to actuate the 00 write gate 234 and a lead 252 to actuate the 10 write gate 242. Without change of polarity at the drivers the read and write pulses are sent through the cores in opposite directions as needed inasmuch as the write lines pass through the cores from left to right whereas the read lines pass through from right to left. Each plane of cores associated with a given bit has an individual inhibit winding passing through every core in the plane, whereby writing into each such plane may be selectively controlled.

In the 10,000 address memory shown, the 00 read gate controls all memory addresses having 0 for the tens digit and the 10 read gate controls all memory addresses having 1 for the tens digit. Each of the 0 to 9 drivers controls all memory addresses with the same respective units digit. Each plane of cores associated with a given bit has an individual sense winding passing through every core in the plane, whereby an output pulse in any plane may be individually detected.

To illustrate how the diodes prevent writing into two different addresses simultaneously, support driver 218 is energized and write gate 234 is actuated in order to write information in at address 04, and consider the effect of a diode 254 which is in one of the paths leading from the number 3 driver 256. If it were not for the presence of the diode 254, a negative pulse from driver 218 could pass through line 240 and diode 226 and thence over lines 258, 260 and 262 to gate 234, thereby writing at address 03 as well as at the desired address 04. All such multiple paths are blocked by providing a similarly directed diode in each drive line.

Referring now more particularly to FIG. 9, it will be shown how the memory address selection arrangement may be controlled by various independent means to select a desired address in memory.

The read-write drivers 0 through 9, otherwise referred to as the X drivers, are indicated in FIG. 9 by the box 264. The X drivers are under the control of a set of read-write switches 266, which may in turn be controlled by different means according to the needs of the operations to be performed. When the computer is engaged in a program of taking up one instruction after another sequentially from memory addresses which follow each other in numerical order, the 0–9 instruction counter 176 may control the setting of the read-write switches 266 to set up the required read-write drivers in unit 264. The instruction counter keeps track of the current instruction address number while the instruction is being carried out and is advanced to the next address number at the proper point in the program. While a given instruction is being carried out, a data word will ordinarily need to be read out from a memory address in a part of memory not occupied by instructions and therefore not to be found by means of the instruction counter. The units digit of the data address wanted will be registered in a 0–9 data address register 268 which may control the switches 266 and drivers 264 on a time sharing basis when required. While a given instruction is being carried out, an index word may also have to be read out of memory. In the embodiment shown, the index words are stored only in the block of memory addresses 0000 to 0099, and the units digit of the index address wanted will be registered in a 0–9 index register 270 which may control the switches 266 and drivers 264 when required.

It may be desirable at times to interrupt the routine operation of the computer to store a succession of words in a block of addresses in memory. It will generally be convenient to use such addresses in numerical order. The beginning address and the ending address may be recorded in the input control address register 552 (FIG. 2) which may be programmed to feed the addresses automatically one after another into the input address register 554. The computer may then feed into memory from one or more input buffers a succession of words, until the ending address is reached, at which point the storing may automatically cease. A plurality of input address control units may be provided which may be set up ready for use when machine time becomes available. When this equipment is used it may actuate switches in address switch blocks 266, 278, 290, 300. The 0–9 input address register 554a is shown connected to the switch block 266.

The registers 176, 268, 270 and 554a are used only one at a time and so they may be connected through an or-circuit to the switches 266 and drivers 264 to use these facilities on a time-sharing basis.

Figure 12A:
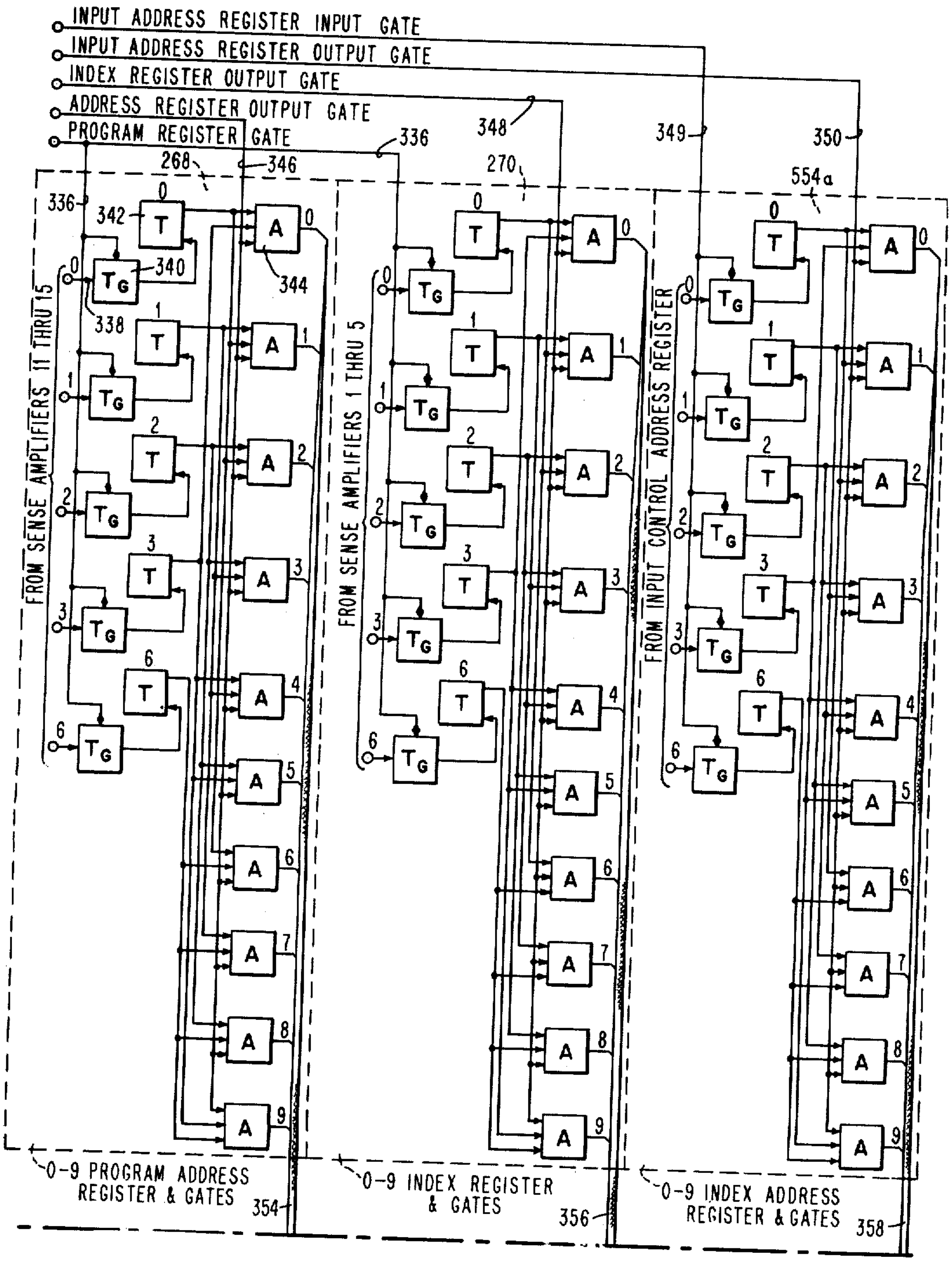
Figure 12B:
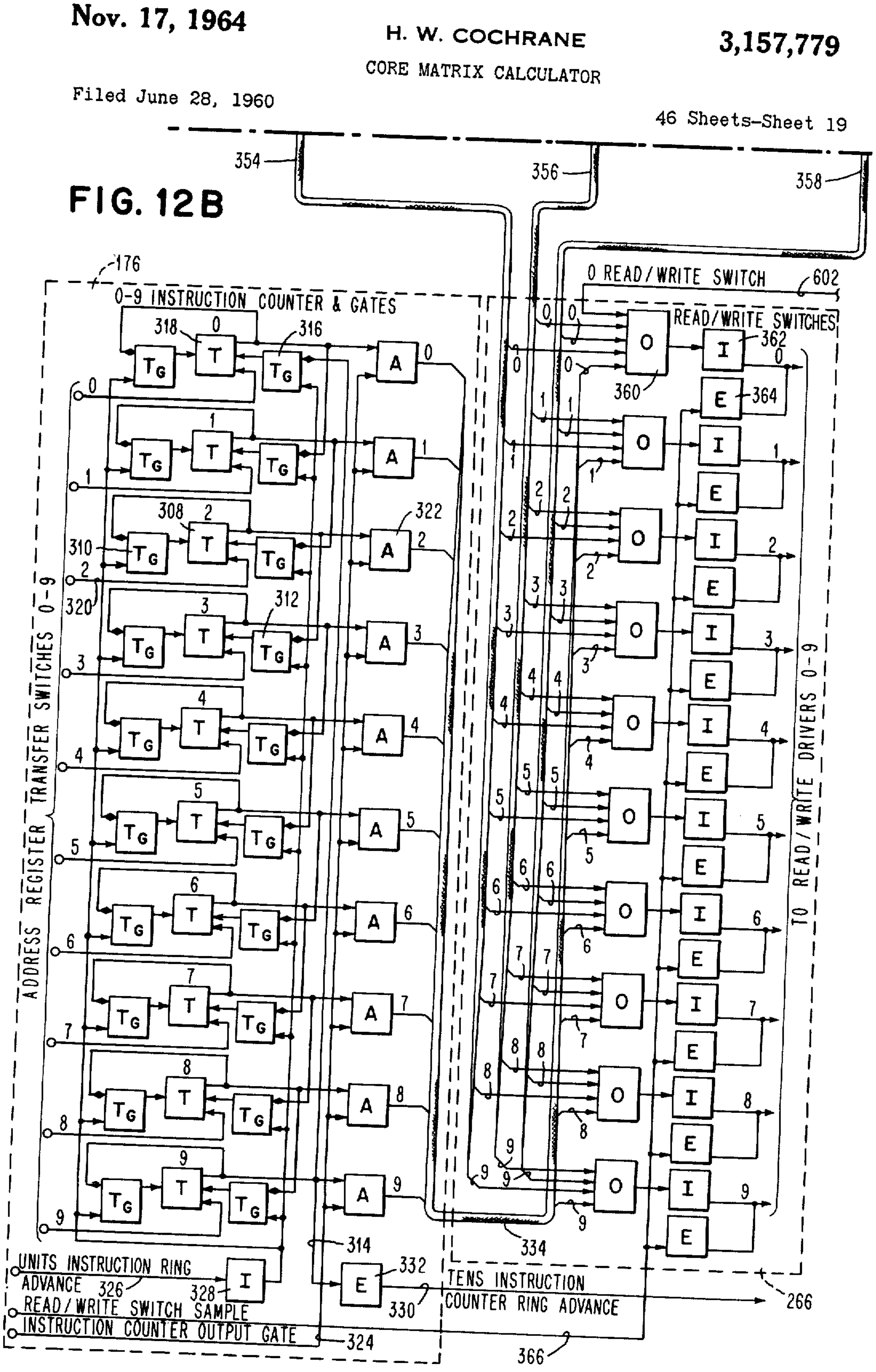

The single 0 read-write switch in block 266 may be operated independently of the registers by means of a 0 operational control pulse from the control pulse generator 188, over a 0 read-write switch line 602 (FIG. 12). The 0 read-write switch may be connected over a line 606 (FIG. 2) to one or more logic matrices such as the mask-shift matrix block 88 and the adder 46.

Reading out from a memory address for which the tens digit of the address is specified is controlled by ten 00–90 read current gates indicated by block 274 in FIG. 9. Writing into memory at an address with a specified tens digit in the address is controlled by ten 00–90 write current gates in block 276. The blocks 274 and 276 form parts of block 58 (FIG. 2). Whether a read operation or a write operation is to be performed is determined in a current gate read-write switch block 278 which contains twenty switches, ten for reading and ten for writing. The switch block 278 may be controlled in various ways to correspond with the particular register from which the X drivers are concurrently being controlled. For this purpose a 00–90 instruction counter 280, a 00–90 data address register 282 and a 00–90 index register 284 are provided, which may control the switch block 278 one at a time by way of an or-circuit on a time sharing basis. The switch block 278 may also be controlled by a 00 operational control pulse from the control pulse generator 188 (FIG. 2) over a 00 read-write switch line 605 or by means of 00–90 gates in the input address register block 554b.

The Y drivers are indicated by a block 288 which is under the control of a switch block 290, which may in turn be controlled by the 000–900 instruction counter 178, or a 000–900 data address register 292. Because the index addresses have been limited to the block 0000 to 0099, no 000–900 index register nor 0000–9000 index register is required. The switch block 290 may also be controlled by a 000 operational control pulse over line 604 from the control pulse generator 188 or by means of 000–900 gates in the input address register block 554c. The 000 operational control pulse is used, for example, to supply the hundreds digit 0 drive for all index word addresses.

Reading out from a memory address for which the thousands digit of the address is specified, is controlled by the 0000–9000 read current gates indicated by block 296, and writing into such an address is controlled by the 0000–9000 write current gates indicated by block 298. The blocks 296 and 298 form parts of block 59 (FIG. 2). Whether a read operation or a write operation is to be performed is determined in a current gate read-write switch block 300 which contains twenty switches, ten for reading and ten for writing. The switch block 300 may be controlled either by a 0000–9000 instruction counter 302, by a 0000–9000 data address register 304, or by a 0000 operational control pulse from the control pulse generator 188 over line 607 or by means of 0000–9000 gates in the input address register block 554d.

While a basic memory core array with a capacity of 10,000 words has been described, it will be understood that a larger or smaller capacity may be provided if desired. The memory capacity is conveniently expanded in increments of 10,000. An expansion from 10,000 to 100,000 requires no additional core drivers. An initial 20 core drivers may serve two or more memory units of 10,000 words each on a time sharing basis, provided reading and writing gates are added for each additional block of 10,000 word capacity. Each added block requires 20 reading gates and 20 writing gates. A five-digit address is also required when the number of memory locations is more than 10,000 and not over 100,000.

FIG. 12 shows illustrative detailed circuits for the 0–9 instruction counter 176, the 0–9 data address register 268, the 0–9 index register 270, the 0–9 input address register portion 554a and the read-write switches 266 which are shown in block form in FIG. 9.

The 0–9 instruction counter 176 comprises a trigger ring of ten triggers, each trigger representing one of the decimal digits 0 through 9. Normally, one trigger in the ring is in the opposite state from all the other triggers in the ring. In general, the trigger in the unique state is on and the others are off. Counting is accomplished by making the trigger that is in the unique state pulse itself and also pulse the next trigger in the ring with the result that the trigger that was on goes off and the next trigger in the ring comes on. The output of each trigger is fed back to its input through a gate circuit so that a trigger coming on will not pulse itself immediately but will condition the gate circuit and the gate circuit may thereafter be actuated to pulse the trigger. The output of each trigger is coupled to the input of the next trigger in the ring through another gate circuit so that a trigger coming on will not directly pulse the next trigger in the ring but will condition the gate circuit so that the gate circuit may thereafter be actuated to pulse the next trigger. When the counter is to be advanced by one digit, an external pulse is impressed upon all the gate circuits of all the triggers, actuating those gate circuits that have been conditioned and thereby turning off the trigger that is on and turning on the next trigger in the ring. When the number 9 trigger is on, the next instruction ring advance pulse turns off the number 9 trigger, turns on the number 0 trigger and passes a pulse to the instruction counter of next higher order, in this case the 00–90 instruction counter.

Figure 32:
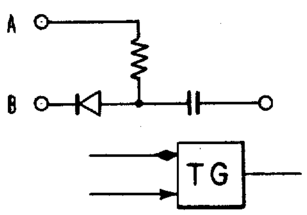
Figure 33:
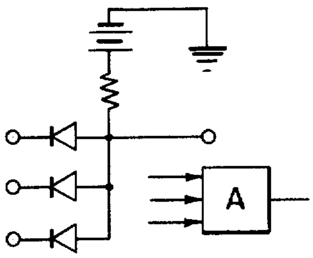
Figure 34:
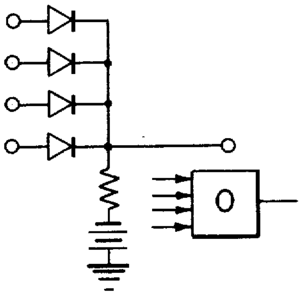
Figure 35:
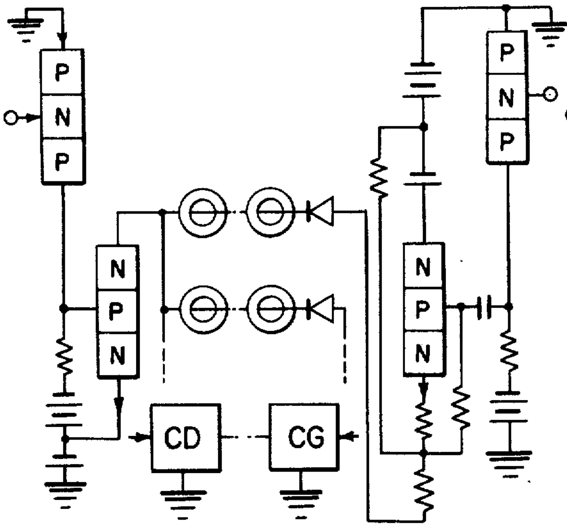
Figures 36, 37:
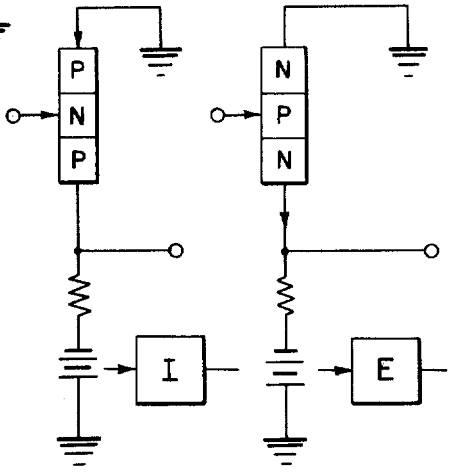

The type of gate circuit referred to here and shown in FIG. 32 and called a trigger gate, is one in which a certain one of the inputs must be conditioned first or the application of a second input will not actuate the circuit. This type of gate circuit is needed in a trigger ring counter to limit the counter to an advance of one count for each external pulse received.

The number 2 trigger, for example, is shown at 308. It is coupled back from its output to its own input by way of a gate circuit 310 and from its output to the input of the number 3 trigger by way of a gate circuit 312. The other triggers are similarly coupled, the output of the number 9 trigger, for example, being coupled over a lead 314 to a gate circuit 316 in the input of the number 0 trigger 318. The number of the trigger that is on will generally be regarded as one of the digits of the current memory address. This digit may be changed by programming, in which case all the triggers may be reset to the off condition and then one trigger may be selectively turned on by means of a pulse from an address transfer switch (see FIGS. 12–15). Thereafter, the instruction counter will automatically count on from the number to which it has arbitrarily been set. By way of example, a lead 320 is shown coming from address transfer switch 2 for turning on the number 2 trigger 308.

A set of and-circuits is provided such as and-circuit 322 for digit 2, there being one such and-circuit for each digit 0 through 9. The output from any trigger that is on may be gated out by applying an instruction counter output gate pulse over a lead 324 as shown. The units instruction ring advance pulse may be impressed over a lead 326 through an inverter 328 to all the trigger gate circuits in the positions exemplified by the gate circuits 310, 312 and 316. The tens instruction counter ring advance pulse may be sent to the 00–90 instruction counter 280 over a lead 330 which may include an emitter follower transistor unit 332. The outputs of the and-circuits in the position exemplified by and-circuit 322 are connected over a cable 334 to the read-write switch block 266.

The several gates and registers that make up the program address register gate blocks 108, 109, and the program registers 60, 61 of FIG. 2, appear in detail in the group of FIGS. 12, 13, 14, 15. The various gates are connected respectively to thirty of the sense amplifiers comprised in the sense amplifier block 106 of FIG. 2. In the embodiment shown, there are 125 amplifiers included in the block 106, one amplifier for each of the 105 bits comprised in either the accumulator register format of FIG. 4E or the storage register format of FIG. 4F, and 20 additional amplifiers for carry bits used in the adder unit 46 (FIG. 2). For reference herein the amplifiers will be numbered 1 to 125 inclusive, from right to left. Instruction words as indicated by the format shown in FIG. 4A, contain 55 bits each. When an instruction is read out of memory and passed through the block 106 of sense amplifiers, the information is carried by sense amplifiers 1 through 55. Amplifiers 1 through 5 carry the units digit of an index word address and amplifiers 6 through 10 carry the tens digit. Amplifiers 11 through 15 carry the units digit of a data address, amplifiers 16 through 20 carry the tens digit of the address, amplifiers 21 through 25 carry the hundreds digit, and amplifiers 26 through 30 carry the thousands digit.

The 0–9, or units, data address gate and register block 268 is shown in detail in FIG. 12. Sense amplifiers 11 through 15 are connected respectively to the bit inputs 6, 3, 2, 1 and 0 in the block 268. Each input is connected to an individual trigger gate circuit arranged so that all the trigger gates may be conditioned simultaneously by means of a program register gate pulse supplied over a lead 336. The trigger gates constitute input gates. Each input gate controls a trigger, the set of triggers constituting the 0–9 data address register. The connections are exemplified by the case of the 0 input which has an input lead 338 connected to the input of a trigger gate 340, the supply terminal of which is connected to the gate pulse lead 336. The output of the gate circuit 340 is connected to the input of a trigger 342. The output of the trigger 342 is connected to the input of an and-circuit 344.

The and-circuit 344 together with nine other such and-circuits comprise a means for decoding from the two-out-of-five coded decimal notation of the address register to decimal notation. These and-circuits are labeled 0 to 9 inclusive, the circuit 344 being the 0 circuit. In accordance with the code shown in FIG. 3, the outputs of the triggers 0 and 3 are connected to the input of the 0 and-circuit 344. The outputs of the triggers 0 and 1 are connected to the input of the number 1 and-circuit, etc. These and-circuits comprise output gates and may be conditioned simultaneously by means of an address register output gate pulse applied to the inputs of the and-circuits over a lead 346.

The 0–9 index register and gate block 270 as shown in FIG. 12 is substantially identical to the 0–9 address register and gate block 268 but has its input leads connected to sense amplifiers 1 to 5 inclusive, respectively. The decimal and-circuits in this block may be conditioned by means of an index register output gate pulse on a lead 348. The trigger gates are conditioned by the program register gate pulse on the lead 336.

The 0–9 input address register block **554*a* as shown in FIG. 12 is substantially identical to the 0–9 address register and gate block 268 but gets its input from the input control address register 552 by way of sense amplifier block 553. The trigger gates in block 554*a* may be conditioned by means of an input address register gate pulse on a lead 349 and the decimal and-circuits may be conditioned by means of an input address register output gate pulse on a lead 350**.

Cables 334, 354, 356, 358, respectively, connect the output circuits of the blocks **176, 268, 270, 554*a* to a group of or-circuits in the read-write switch block 266 shown in FIG. 12. The output of each or-circuit is connected to the input of an individual inverter. In parallel with the output of each inverter is the output of an individual emitter follower transistor circuit. The inputs of all the emitter followers are connected to a lead for supplying a read-write pulse. By way of example in FIG. 12, the or-circuit for the 0 decimal digit is designated 360, the associated inverter 362 and the associated emitter follower 364. The read-write switch sample lead is designated 366. The outputs 0–9 from the block 266 go to the read-write drivers 0–9 one of which, for example, is designated 368** in FIG. 10B.

Figure 38:
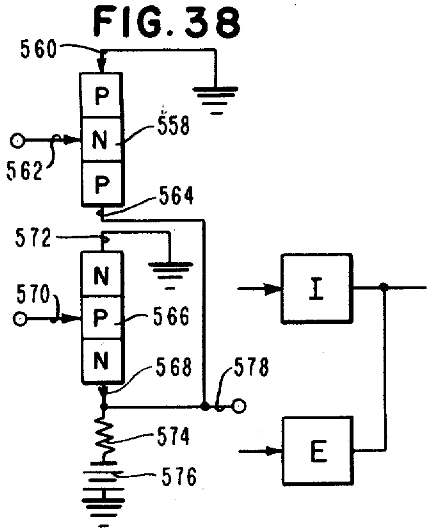
Figure 39:
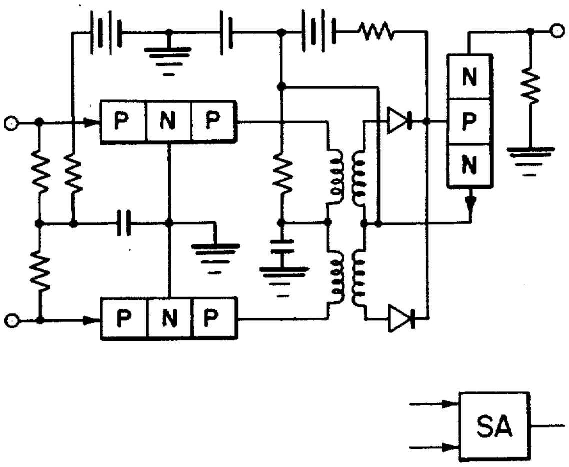

An illustrative inverter-emitter follower combination is shown in detail in FIG. 38. The inverter is shown as a PNP transistor 558 in a grounded emitter circuit configuration and having emitter, base and collector electrodes 560, 562 and 564, respectively. The emitter follower is shown as an NPN transistor 566 in a grounded collector circuit configuration and having emitter, base and collector electrodes 568, 570 and 572, respectively. A common load resistor 574 is provided for the two transistors and a common current source shown as a battery 576, the positive terminal of which is grounded. A common output line 578 is provided which is connected to the collector of the transistor 558 and to the emitter of the transistor 566. The base electrode 562 of the inverter transistor is connected to the output of the associated or-circuit. The base electrode 570 of the emitter follower is connected to the read-write pulse line 366.

In the operation of the inverter-emitter follower combination, a relatively positive input pulse from the or-circuit applied to the base electrode 562 of the inverter renders the inverter substantially nonconductive so that in this state the inverter has no appreciable effect upon the action of the emitter follower or upon the output on the line 578. Therefore, if a pulse is now applied to the base electrode 570 of the emitter follower, the emitter follower functions normally, a negative input pulse rendering the transistor less conductive so that a negative output pulse is generated, and a positive input pulse rendering the transistor more conductive so that a positive output pulse is generated. At no time will more than one of the or-circuits have a positive output, so that when a negative read-write pulse is applied to all the emitter followers in the block 266, only the one inverter that receives the positive pulse from its associated or-circuit will become less conductive. All the other inverters will have negative inputs which will make each of them conductive and each inverter will hold the common output line at ground potential so that the associated emitter follower has no effect upon the output of the combination. Only the line with the negative output is enabled to actuate its associated core driver.

Figure 13A:
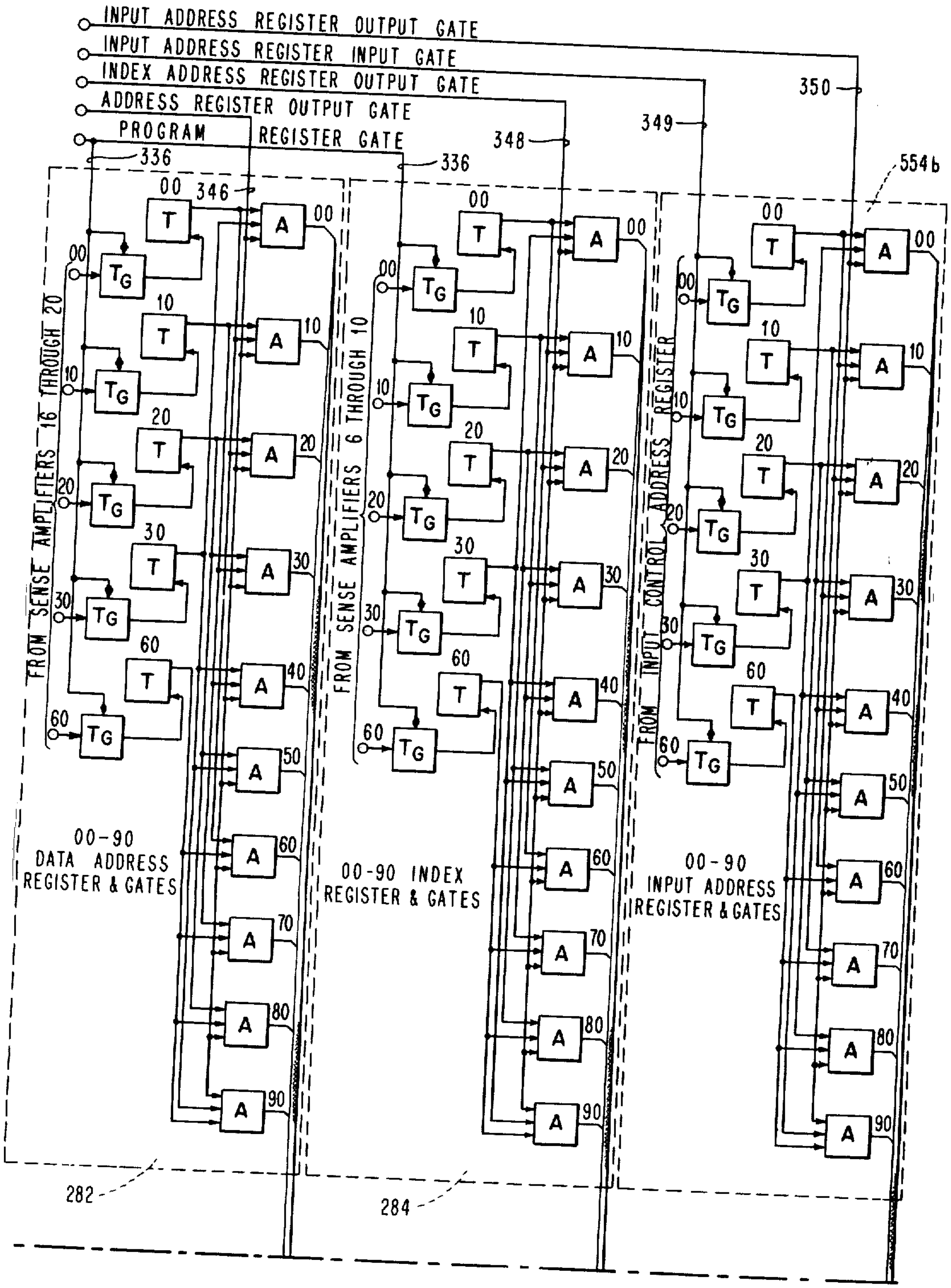
Figure 13B:
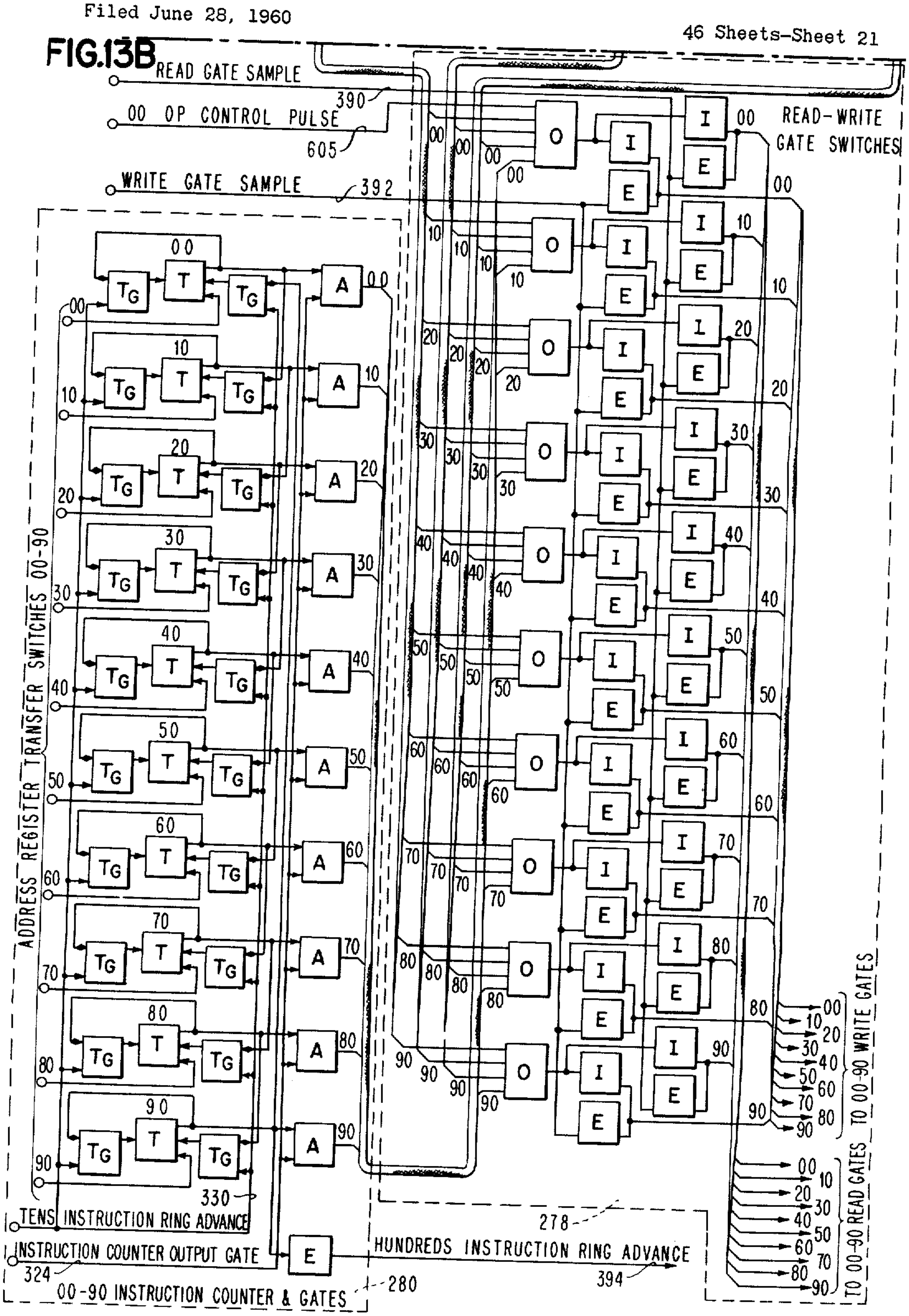

FIG. 13 shows details of the 00–90 selection registers and switches comprising the 00–90 instruction counter 280, the 00–90 data address register 282, the 00–90 index register 284, the 00–90 input address register **554*b* and the read-write gate switch block 278**.

The 00–90 instruction counter 280 is identical with the 0–9 instruction counter 176 except that the counter 280 receives its instruction ring advance pulse from the 0–9 instruction counter over the lead 330. The 00–90 data address block 282 is identical with the 0–9 data address block 268 except that the inputs to the block 282 come from the sense amplifiers 16 through 20. The 00–90 index register block 284 is identical with the 0–9 index register block except that the inputs to the block 284 come from the sense amplifiers 6 through 10. The 00–90 input address register **554*b* is identical with the 0–9 input address register 554*a***, except for different input connections.

The read-write gate switch block 278 is similar to the read-write switch block 266 except that there are two complete sets of switches in block 278, one to control the 00–90 read gates and the other to control the 00–90 write gates. Each of these sets of switches may be controlled by any one of the gate blocks 280, 282, 284, **554*b*, through a set of or-circuits. The 00–90 read gates and write gates are shown in FIG. 10B, each gate controlling a ground connection for a group of X drive lines in the memory block 40. For clarity in the drawing, ground leads for only a few of the gates are shown, the gate 372 in FIG. 10A, for example, being shown with a grounding lead 374**.

The read gate switches in the block 278 may be controlled by means of a read gate sample pulse impressed upon a lead 390 and the write gate switches by means of a write gate sample pulse impressed upon a lead 392. A hundreds instruction ring advance pulse may be transmitted from the 00–90 instruction counter to the 000–900 instruction counter over a lead 394.

Figure 14A:
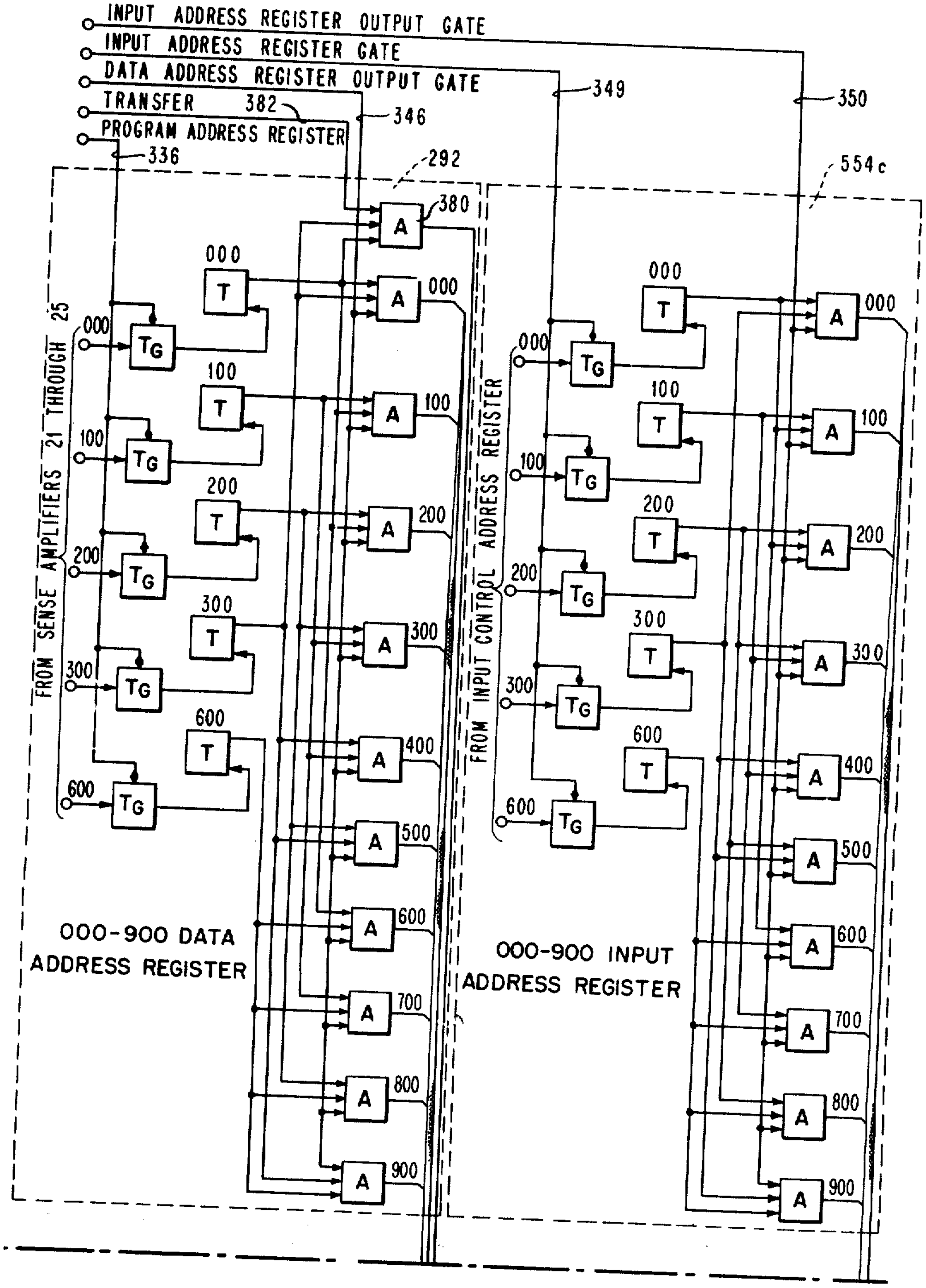
Figure 14B:
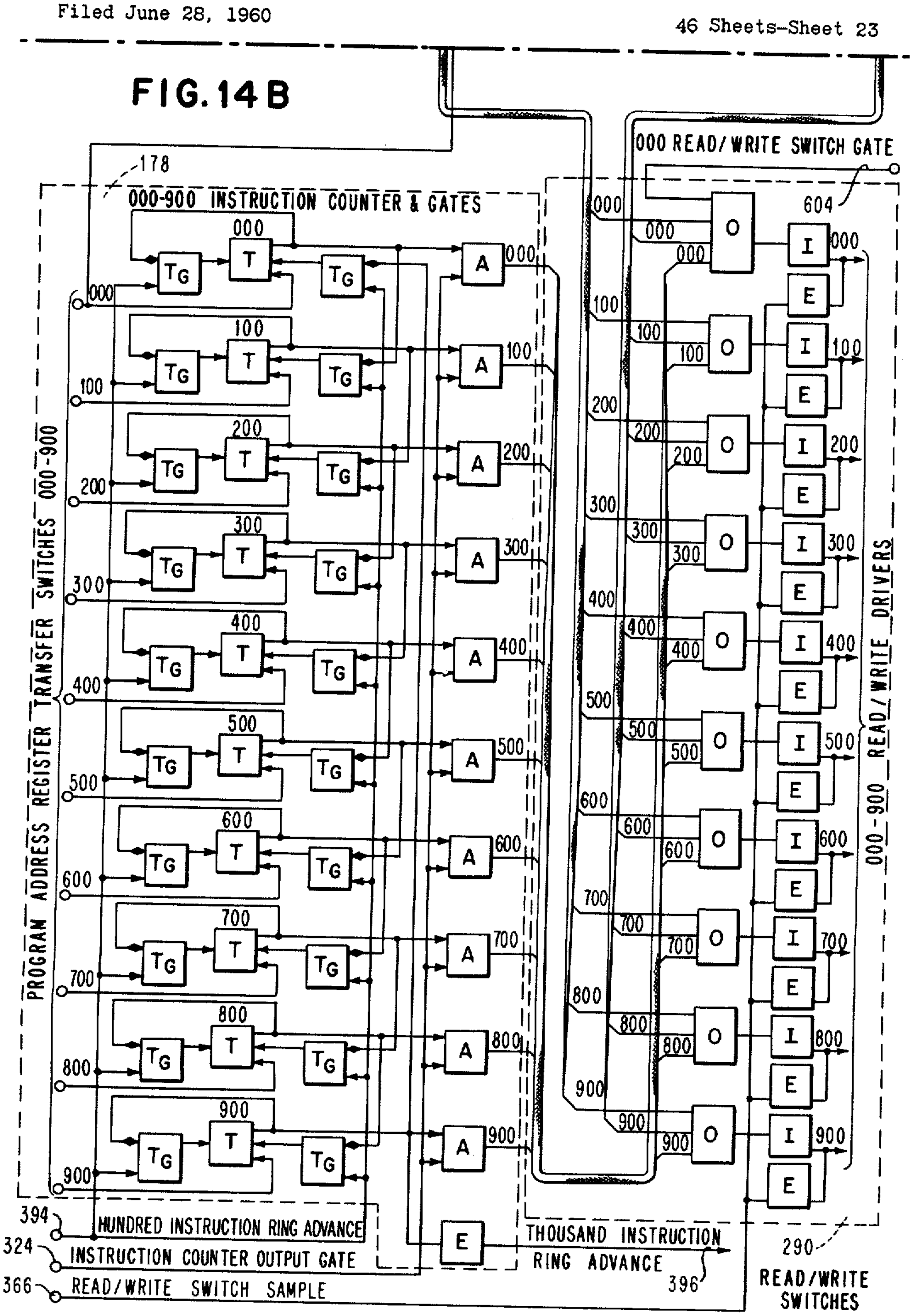

FIG. 14 shows details of the 000–900 selection registers and switches, comprising the 000–900 instruction counter 178, the 000–900 data address register 292, the 000–900 input address register **554*c* and the read-write switch block 290**. It will be noted that no index register is shown as the index word addresses are confined to the addresses 00 to 99 inclusive in the first one hundred memory addresses.

The 000–900 instruction counter 178 is similar to the other instruction counters described above and has a lead 396 for transmitting a thousands instruction ring advance pulse to the 0000–9000 instruction counter. The counter 178 receives ring advance pulses over the lead 394 and has its output controlled by a pulse over the output gate lead 324.

The 000–900 data address register 292 is similar to the other data address registers and receives its input pulses from the sense amplifiers 21 through 25. The input to the block 292 is controlled by pulses over the program register gate lead 336 and the output from the block is controlled by pulses over the data address register output gate lead 346.

The 000–900 input address register **554*c* is similar to the other input address registers. A 000 read-write switch gate line 604 is provided for operating the 000 read-write switch independently of the units 178, 292 and 554*a*. The 000 read-write switch may be connected over a line 608 (FIG. 2) to one or more logic matrices such as the mask-shift matrix block 88 and the adder 46**.

The read-write switch block 290 is similar to the read-write switch block 266 and controls the switching of read-write pulses received over the lead 366.

An illustrative fragment of an address transfer switch is shown as an and-circuit 380 having inputs connected to the 000 and 300 triggers in the address register 292, another input connected to a transfer lead 382, and an output connected to an on-input terminal of the 000 trigger in the instruction counter 178.

Figure 15A:
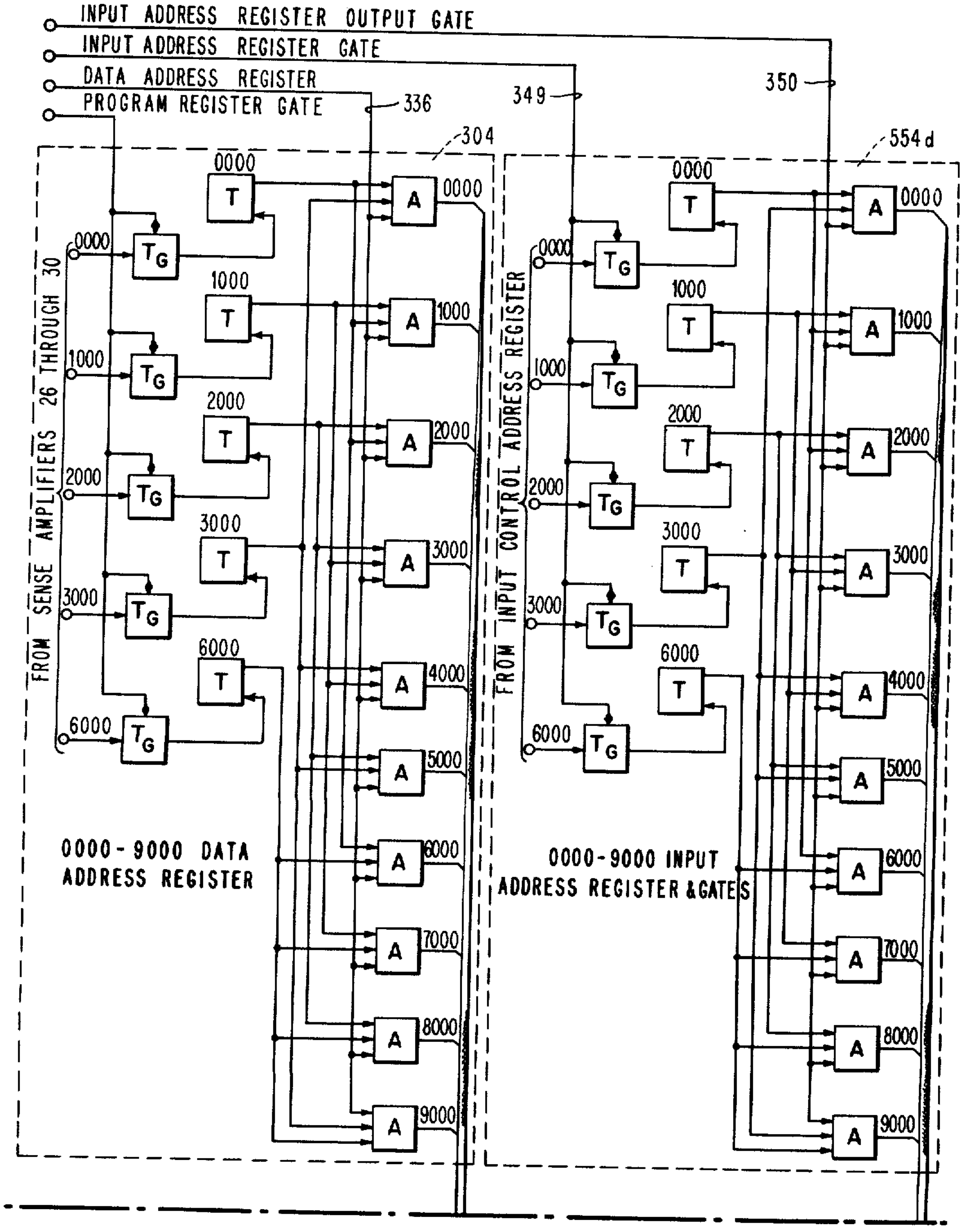
Figure 15B:
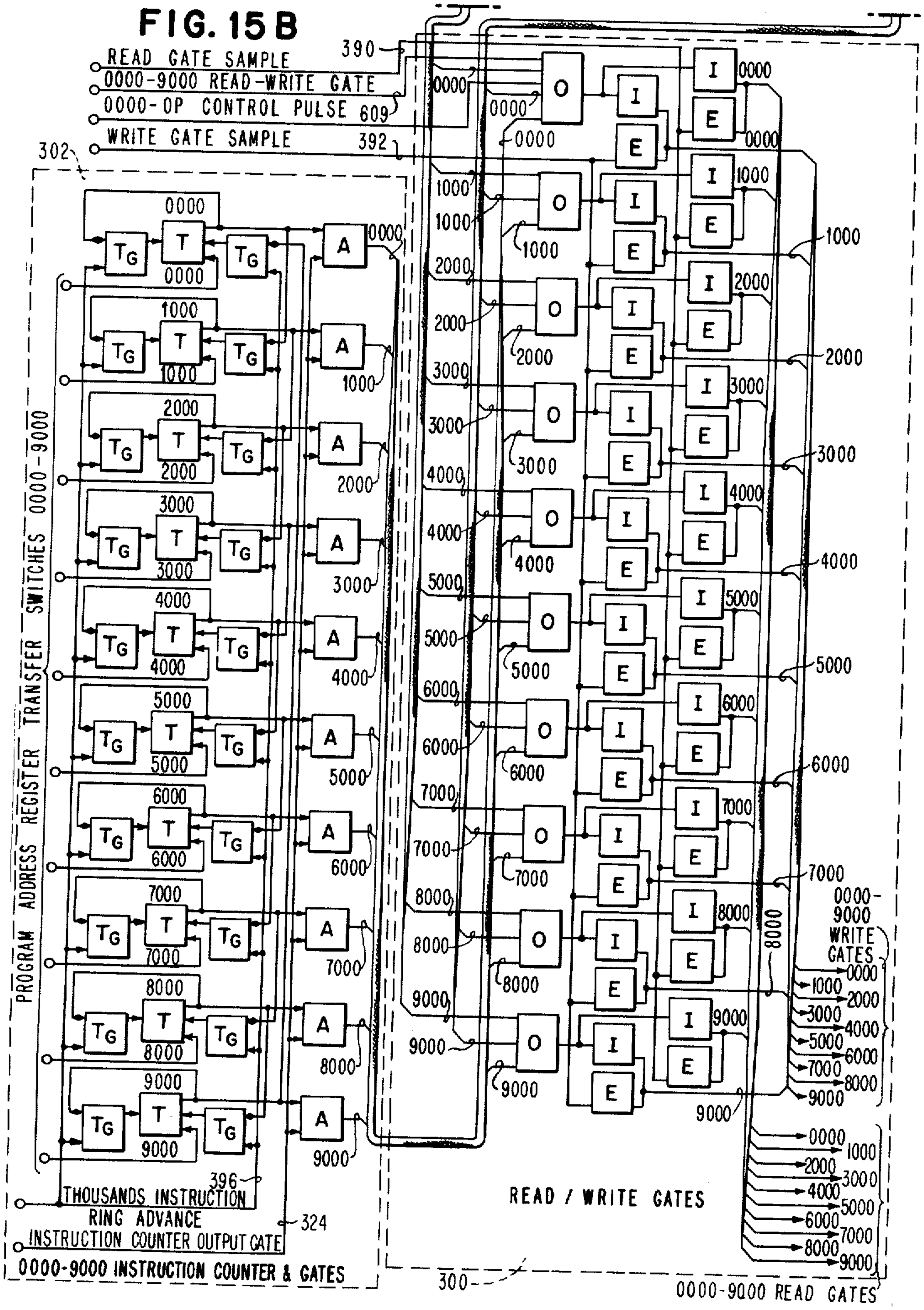

FIG. 15 shows details of the 0000–9000 selection registers and switches, comprising the 0000–9000 instruction counter 302, the 0000–9000 data address register 304, the 0000–9000 input address register **554*d* and the current gate read-write switch block 300**.

The 0000–9000 instruction counter 302 is similar to the other instruction counters. The counter 302 receives advance pulses over the lead 396 and has its output controlled by pulses received over the lead 324. This counter, however, does not pass an instruction counter advance pulse to any other counter. When the 0000–9000 counter changes from 9000 to 0000, all the lower order counters also change to zero and the set of instruction counters as a whole is ready to begin a new count from 0000 without need for any advance pulse.

The 0000–9000 data address register 304 is similar to the other data address registers except that it receives its input from the sense amplifiers 26 through 30.

The 0000–9000 input address register **554*d*** is similar to the other input address registers.

A 0000 read-write gate line 609 is provided for operating the 0000 read-write gates independently of the units 302, 304 and **554*d***.

The read-write block 300 is similar to the read-write block 278 and is controlled by a read gate sample pulse over the lead 390 or by a write sample pulse over the lead 392.

ADDITION

The block 46 of adder matrices is shown in more detail in FIG. 16 as comprising a total sum generator 406, a partial sum and initial carry generator 408, a negative and-circuit block 410 for indicating the absence of a decimal digit 9 (or, more general, radix minus one) and a propagated carry generator 412. A reset lead 414 and a write lead 416 are indicated for controlling blocks 406 and 408.

The two numbers that are to be added together are assumed to be stored respectively in the storage register 50 and in some other register, such as the accumulator register 62. For definiteness, the accumulator register 62 will be assumed to be the second register. The addition is carried out in four steps, of which the first step in a core matrix type of embodiment is to combine the two numbers digit by digit in a plurality of matrices within the partial sum and initial carry generator 408, over inhibit lines 580 from storage register 50 to partial sum and initial carry generator 408 and over inhibit lines 582 and 584 from the accumulator register 62 to the generator 408 via the total sum generator 406. Generator 408 determines for each digit position (*a*) the sum of two digits without regard to carry, and (*b*) the presence or absence of a carry. These results are called partial sum and initial carry respectively. There is a partial sum for each digit position and there may or may not be an initial carry from each.

In the second step, the partial sums are read out of the partial sum and initial carry generator 408 into the accumulator register over digit sense lines 586 and the initial carries are read out of the partial sum and initial carry generator into the carry register 130 over carry sense lines 588. The accumulator register is automatically cleared before the partial sums are read in, so that the accumulator register now registers the partial sum where it previously registered one of the numbers to be added. This partial sum will be augmented in the fourth step by the initial carries and by the propagated carries, if any, under the control of the carry register 130.

In the third step, information concerning the presence or absence of a nine in each digit position of the partial sum is read into the propagated carry generator 412 from the accumulator register 62 over inhibit lines 582, 584, 590, 592, via the negative and-circuit block 410 and generators 408 and 406. At the same time, the initial carries are read into the propagated carry generator over carry sense lines 594 and 596 via the generator 406. Also simultaneously with this process, all the partial sums are read over the inhibit lines 582 into the total sum generator 406 where each digit is automatically increased by one in anticipation of a possible carry into each digit position. By increasing by one here is meant that 0 is turned to 1, 1 to 2, etc., and that 9 is turned to 0, without carry. This augmented sum will be selectively utilized or not, digit by digit as required, when it comes to the final step, in order to take account of carry where a carry is needed and cancel the anticipated carry where no carry is actually called for. This is done under the control of triggers in the carry register 130. Also in this step, the propagated carries are generated in the propagated carry generator 412 and are transmitted to the carry register 130 over carry sense lines 598 and 588.

In the fourth step, certain of the digits registered in the total sum generator 406 are read out of that generator into the accumulator register over digit sense lines 600 and 586 under the control of pulses from the carry register 130 coming over the carry write lines 594. Only those digit positions in the accumulator register will receive an output from the total sum generator for which the carry register shows a carry. The remaining digit positions in the accumulator register retain the partial sum digits which were put there in the second step. These latter digits have not been increased by any anticipated carry. The result is that the accumulator is now set to the true sum of the two numbers added.

The above-described process of addition will be explained by means of the following numerical example:

390989997
152020008
543010005

The partial sum without regard to carries is:

442909995 and the initial carries are:

100100010

The propagated carries are:

001011100

It will be noted that where there is an initial carry and a partial sum of 9 in the same decimal order there is a propagated carry developed and that this carry propagates until it reaches a decimal order in which the partial sum is not a nine and stops there. In general, for any radix, the carry propagates until it reaches a digit position in which the partial sum differs from the radix less one. The final list of carries is found by combining the initial carries and the propagated carries, the result of which in the present example is:

101111110

Now if each digit of the partial sum is increased by one without regard to carry the result is:

553010006

It will be noted that if the digit in the partial sum is retained in each decimal order for which there is no carry and if the digit increased by one is used in each decimal order for which there is a carry, either initial or propagated, then the correct result is obtained:

−4−−−−−−5
5−301000−
543010005

FIG. 17 shows illustrative details of the wiring between the component parts of the adder matrix block 46 and of the wiring to the block 46 from other parts of the computer. The component partial sum and initial carry generator 408 of FIG. 16 comprises a separate core matrix for each digit position. In FIG. 17 a few of these matrices are shown as represented by blocks and are labeled **408*a*, 408*b*, 408*s*, and 408*t*, for the digit positions 1, 2, 19 and 20, respectively. Similarly, the total sum generator 406 comprises a separate core matrix for each of the digit positions. In FIG. 17, blocks 406*a*, 406*b*, 406*s*, 406*t*, represent the total sum matrices for the digit positions 1, 2, 19 and 20 respectively. The no-9 negative and-circuit block 410 of FIG. 16, comprises one negative and-circuit for each digit position except the first, which has no need for such a circuit. In FIG. 17, blocks 410*b*, 410*s*, 410*t*, represent the no-9 negative and-circuits for the digit positions 2, 19, 20, respectively. The carry register 130 comprises carry triggers, one for the carry from each digit position. In FIG. 17, blocks 130*a*, 130*b*, 130*s*, 130*t*, represent the triggers for carries originating in the digit positions 1, 2, 19, 20, respectively. To effect the control of the carry triggers over the reading out operation from the total sum generator to the accumulator register, a plurality of negative and-circuits are used. In FIG. 17, blocks 418*a*, 418*b*, 418*s*, 418*t***, represent these negative and-circuits for the digit positions 1, 2, 19, 20, respectively.

Lines 1 to 50, inclusive, in the cable 81 and lines 56 to 105, inclusive, in the cable 83 from the $Z_1$ inhibit block 52 connect to the $Z_1$ Y-inhibit input lines in FIG. 17 for the digit positions 1 through 20. Lines 1 through 5 connect to the 6, 3, 2, 1, 0 inhibit input lines respectively of partial sum and initial carry generator block **408*a*. Lines 6 through 10 connect to the 6, 3, 2, 1, 0 inhibit input lines respectively of block 408*b*, etc. Lines 96 through 100 connect to the 6, 3, 2, 1, 0 inhibit input lines respectively of block 408*s*. Lines 101 through 105 connect to the 6, 3, 2, 1, 0 inhibit input lines respectively of block 408*t***. By this means the pattern of inhibit currents determined by the number in the storage register is impressed upon the Y dimension of the adder.

In a similar manner, a pattern of inhibit currents determined by the number in the accumulator register 62 is impressed upon the X dimension of the adder over wires in the cables 95 and 97 controlling $Z_2$ drivers in the block 64. The $Z_2$ inhibit wires pass through the total sum generator blocks on the way to the partial sum and initial carry generator blocks so that the inhibit currents are available to either the blocks **406*a*, etc., or the blocks 408*a*, etc. In each total sum block 406*a*, etc., a set of sense wires S–0, S–1, S–2, S–3, S–6, of one of the cables 104, 118 (FIG. 2) pass through and are made available for use in the associated block 408*a*, etc., respectively, and pass thence, among other places, to the accumulator register 62**.

The $Z_2$ inhibit wires for each decimal position are labeled respectively I–0, I–1, I–2, I–3, I–6. In each decimal position except the first, the inhibit wires I–3 and I–6, which jointly represent the decimal digit 9, pass through the partial sum and initial carry generator block in the respective digit position and enter the no-9 negative and-circuit for that digit position. For example, the I–3 and I–6 wires which pass through the total sum block **406*b*, continue through the partial sum and initial carry generator block 408*b* to the no-9 negative and-circuit 410*b*. Each partial sum and initial carry generator block 408*a*, etc., contains a carry sense wire 422*a*, etc., which runs by way of the propagated carry generator 412 and wires 436*a*, etc., to an associated carry sense amplifier in the sense amplifier block 106*a*. It will be understood that the carry sense amplifiers control the carry register triggers as is shown in FIG. 17 and also in FIG. 6, through the intermediary of the carry register gate 128** although for simplicity the gate is omitted in FIG. 17.

Each negative and-circuit **418*a*, etc., is conditioned by the associated carry trigger 130*a*, etc. so that when a timing pulse is received over a line 107**, and a carry is simultaneously present, a digit may be read out of the associated total sum generator into the accumulator register. If no carry is present, the digit will not be read out of the total sum generator.

In case a carry is generated in the twentieth digit position a pulse is sent from the negative and-circuit **418*t* to an overflow indicator 472** to indicate that the capacity of the adder has been exceeded. The overflow indicator may also be used as a high order carry signal in division, to indicate the need for a shift in the divisor, as will be explained below, and as a high order carry signal in subtraction to distinguish between positive and negative differences.

To transfer initial carries to the propagated carry generator at proper times another set 419*a*, 419*b*, etc., of negative and-circuits is provided. Each of these negative and-circuits is conditioned by the associated carry trigger 130*a*, etc., so that when a timing pulse is received over a line 109, and a carry is simultaneously present, a pulse is transmitted to the propagated carry generator 412.

FIG. 18 shows the wiring scheme of a representative core matrix in the partial sum and initial carry generator. This matrix is used to add together two decimal digits to determine a partial sum digit and an initial carry, if any, in accordance with the arithmetical addition table shown in FIG. 19. One matrix like that shown in FIG. 18 is provided for each digit position, each matrix requiring a ten by ten array of cores. Each core is threaded by two X inhibit wires and two Y inhibit wires. Each core which represents a partial sum without a carry is threaded by two sense wires and each core which represents a partial sum plus a carry is threaded by two digit sense wires and a carry sense wire 422. In addition, each of the one hundred cores is threaded by a read wire and by a write wire. In FIG. 18, the read and write wires are shown joined into a cable 420 which threads through all the cores of the matrix.

The wiring scheme is determined by the addition table of FIG. 19 together with the numeric code of FIG. 3. For example, the Z inhibit wires 0 and 3 pass together through all the cores in the top row, for representing a 0 decimal digit in the accumulator register. The X inhibit wires 0 and 1 pass together through all the cores in the next row, for representing a 1 decimal digit in the accumulator register. In the tenth column, at the extreme right, the Y inhibit wires 3 and 6 thread through all the cores in the column, for representing a decimal digit 9 in the storage register. The sense wires pass through the cores in diagonal lines from lower left to upper right or vice versa. Sense lines 1 and 6, for example, for representing a partial sum of 7, pass together through all the cores which according to FIG. 19 produce a partial sum of 7, either 7 with no carry or 17 which gives a partial sum of 7 with one to carry. The carry sense wire threads through all the cores in those positions which represent a partial sum of more than nine, i.e., 10 through 18.

In the system illustrated, digits are indicated by the absence of inhibit current. Therefore, to add two digits, such as a 4 in the storage register to a 3 in the accumulator, for example, there must not be any current flowing in the X and Y inhibit lines representing these two digits. Thus, when a write pulse is generated in the adder by the read-write pulse generator, the only core in the matrix that is allowed to flip into the "one" state is that one through which are threaded the 1 and 3 Y-inhibit lines representing the 4 and the 1 and 2 X-inhibit lines representing the 3. This core is in the fifth column and fourth row of the matrix as shown in FIG. 18. This action constitutes the generation of a partial sum. There is no inhibit current flowing in any wire threading this core, whereas inhibit current is flowing in at least one wire in all the other cores.

When a read pulse is sent into the adder, the partial sum, 7 in the present example, is read out on the diagonal sense lines 6 and 1 that thread through all the cores which represent partial sums of 7 or 17. The sum 7 is passed to the accumulator register. In cases where the partial sum is more than 9, the flipping action of the core is also detected by the carry sense line 422. This action constitutes the generation of an initial carry. At the same time that the partial sum is read out into the accumulator register, the carry, if there be one, is read out into the appropriate trigger of the carry register. In the carry register, the triggers which are set on will later control what is read from the total sum generator into the accumulator register. On the next cycle point, both the partial sums that are less than 9 and the initial carries are utilized in the propagated carry generator. There the propagated carries are generated and deposited into the carry register. While the propagated carries are being generated, all of the partial sums are brought into the total sum generator over the $Z_2$ inhibit lines and in the total sum generator the digit in each digit position is automatically increased by one in anticipation of the carry that might be generated for it. Increasing the digit by one is accomplished by having the two inhibit lines that control writing thread through the same core that the next higher digit sense lines do. This wiring arrangement is illustrated in FIG. 23. On the next cycle point, all the triggers that were set on by either the initial carry generators or the propagated carry generator allow outputs to be read from the total sum generators into the accumulator register. Digits in digit positions for which there is no carry remain unchanged in the accumulator register. This action sets the accumulator register to the true sum of the two numbers to be added.

PROPAGATED CARRY GENERATION

FIG. 20 shows the wiring of a core matrix for the propagated carry generator 412. The cores are arranged in a triangular array with 19 cores in the top row and with the number of cores decreasing by one in each row down to a single core at the bottom. The lines 424*a*, 424*b*, etc., shown in FIG. 17 as coming out of the negative and-circuits 419*a*, 419*b*, etc., respectively, enter the matrix of FIG. 20 as carry write lines which run diagonally through the matrix. The carry write line 424*a* associated with the first digit position in the initial carry generator threads through the 19 cores in the righthand-most diagonal row of cores in FIG. 20. The carry write line 424*b* associated with the second digit position in the initial carry generator threads through the 18 cores of the next diagonal row toward the left, etc., carry write line 424s from the nineteenth digit position in the initial carry generator threading through the single core in the upper lefthand corner of the matrix. A cable 430 threads through all the cores diagonal row by diagonal row. The cable 430 is made up of lines from the respective no-9 negative and-circuits 410*b*, etc., 410*s*, 410*t*, shown in FIG. 17, a line 432*b* coming from block 410*b*, a line 432*s* from block 410*s*, a line 432*t* from block 410*t*, etc. Each of the lines 432*b*, etc., carries an inhibit pulse if and only if the digit position which the line represents has a partial sum that is not a 9. The constituency of the lines in the cable 430 changes from core to core along the route of the cable, according to a wiring scheme which is shown more clearly in diagrammatic form in FIG. 21. A write-reset cable 434 threads through every core in the entire matrix. Carry sense lines 436*b*, 436*c* etc., each thread through the cores in a respective vertical column of cores. These carry sense lines connect to the carry sense amplifiers in the block 106, which in turn control the carry triggers 130, 130*a*, etc., (FIG. 17).

In FIG. 21, each core of the matrix shown in FIG. 20 is represented by a small rectangle. The carry sense lines are shown as vertical lines, each sense line connecting the rectangles which represent those cores which are threaded by the given sense line In each rectangle, the upper line of notation indicates the number of the carry write line 1C, 2C, 3C, etc., which threads through the core that the rectangle represents. The lower line of notation in each rectangle indicates which of the no-9 inhibit lines thread through the core that the rectangle represents. For example, 2–3 in the lower line of notation indicates that the no-9 inhibit lines of the second and third digit positions are threaded, 4–14 indicates that the no-9 inhibit lines of the fourth through fourteenth digit positions are threaded, etc.

FIG. 22 shows a carry propagation scheme of the same type as that shown in FIGS. 20 and 21 but simplified by limiting the number of decimal positions to six instead of twenty. At the top of the figure, the first six digit positions of a multidigit register are represented, each by five triggers corresponding respectively to the bits 0, 1, 2, 3, 6 of the code. This register may be the accumulator register 62 or any other register in which it is desired to accumulate the result of an adding operation. The triggers for the first or lowest order digit position appear in the right hand column, the triggers for the second digit position in the next column to the left, etc. In each column the triggers that are ringed are those which are set on as partial sums in the numerical example given above, representing the following decimal number according to the code of FIG. 3:

909995

Immediately below the accumulator register, the triggers for the first six digit positions in the carry register 130 are shown. The triggers that are ringed are those which are set on as initial carries in the numerical example, namely, a carry from the first digit position and a carry from the fifth digit position. In the numerical example, these carries were set down in the digit position *into which each is to be carried,* so that they were represented as follows:

0100010

Each carry register trigger **130*a*, 130*b*, etc., is arranged to condition one of a set of and-circuits 438*a*, 438*b*, etc. Such of these and-circuits as are conditioned may be actuated simultaneously by means of a carry register output gate pulse over a lead 440. Each of these and-circuits controls one of a set of inverters 442*a*, 442*b*, etc., which in turn controls one of a set of core drivers 444*a*, 444*b*, etc. Each of these core drivers controls one of the carry write lines 424*a*, 424*b***, etc.

A feature of the circuit of FIG. 22 as compared to the circuit of FIG. 17 is an alternative way of utilizing the information regarding presence or absence of a digit 9 in the partial sum. In FIG. 22, the state of the number 3 and number 6 triggers in the accumulator register is employed for this purpose instead of the state of the number 3 and number 6 inhibit lines as was done in the circuit of FIG. 17.

In each digit position in the accumulator register the number 3 trigger and the number 6 trigger are connected to one of a set of and-circuits **446*b*, 446*c*, etc. Any one or more of these and-circuits may be actuated to produce a positive output potential if and only if a partial sum of 9 is present in the associated digit position in the accumulator register. If not actuated, the and-circuit produces a negative output potential. Each of these and-circuits is connected to one of a set of negative and-circuits, actually or-circuits, 450*b*, 450*c*, etc. each of which in turn is connected to one of a set of core drivers 452*b*, 452*c*, etc. Each of the core drivers 452*b*, 452*c*, etc., controls one of the no-9 inhibit lines 432*b*, 432*c***, etc.

In the numerical example given above, the first carry trigger **130*a* is set on. This conditions the and-circuit 438*a*. When the carry register output gate pulse is received, the and-circuit 438*a* is actuated to pass a positive pulse to the inverter 442*a*. In response to the pulse received, the inverter puts out a negative output pulse. With this negative pulse applied to its input, the core driver 444*a* is turned on. The result is that a write current is produced in the first carry write line 424*a*. In similar manner, the carry indicated by the fifth carry trigger results in the generation of a write current on the fifth carry write line. The absence of carries in the second, third, fourth and sixth carry triggers results in the absence of write currents in the second, third, fourth and sixth carry write lines. For examples, the absence of a carry in the second carry register 130*b* produces a negative output pulse in the and-circuit 438*b*. The presence of a negative output pulse in the and-circuit 438*b* brings a positive response in the inverter 442*b* which prevents the core driver 452*b*** from coming on.

In the numerical example, there is a 9 in the second digit position. As a result, the and-circuit **446*b* generates a positive pulse which passes through the or-circuit 450*b*. The core driver 452*b*, however, is of the type which responds only to a negative input. So, in the presence of the 9 in the second digit position, no inhibit current is applied to the no-9 inhibit line 432*b*. In similar manner, inhibit currents are prevented from being sent over the third, fourth and sixth no-9 inhibit lines. In this same example, there is no 9 in the fifth decimal position, the digit in this position being a zero. Triggers 3 and 0 are set on, but since the trigger 6 is not set on, the and-circuit 446*e* generates not a positive pulse, but a negative pulse instead. In the absence of a positive pulse at the input of the or-circuit 450*e*, the input to the core driver 452*e*** remains negative and continually sends inhibit current over the fifth no-9 inhibit line.

When a write pulse is sent through all the cores over the write line in the cable 434, those cores in which a carry write pulse also passes through are set on if they are not inhibited. The cores that are set on in the example are the cores that are encircled in the figure. They are threaded respectively by the second, third, fourth and sixth carry sense lines. The application of a read pulse on the read line of the cable 434 causes propagated carries to be read into the carry sense amplifiers **106*b*, 106*c*, 106*d* and 106*f***.

It will be understood that the no-9 inhibit drivers **452*b*, etc., which operate under the control of a negative gate pulse applied to an or-circuit such as 450*b*, are typical of inhibit drivers in other parts of the system, for example, the inhibit drivers contained in blocks 52, 64, 100 and 548**. In general, an inhibit driver is turned on when there is a coincidence of pulses in an associated switching circuit.

TOTAL SUM GENERATION

FIG. 23 shows the wiring scheme for one digit position of the total sum generator 406. Ten cores are needed, two of which are designated 454 and 456, respectively. Each core is threaded by two $Z_2$ inhibit lines as from block 64 under the control of the information contained in the accumulator register 62. The two inhibit lines indicate a digit according to the code given in FIG. 3. Each core is also threaded by two sense lines. In each case, the sense lines indicate a digit one higher than the digit indicated by the inhibit lines threading the same core. For example, core 454 is threaded by inhibit lines 2 and 3, indicating a digit 5. This core is threaded by the sense lines 0 and 6, indicating the digit 6. The ten cores are threaded by each of a group of lines comprising a read line 458, a write line 460 and a carry read line 462. If there is no inhibit current on inhibit lines 2 and 3, indicating a 5 in the accumulator register, and a write pulse is impressed upon lead 460, only the one core 454 will flip, since all the other cores are threaded by at least one inhibit line carrying current, it being assumed that one inhibit current alone is sufficiently strong to overcome the write pulse. It will be noted that the carry read pulse in the total sum generator is the same pulse that was called the carry write pulse in the propagated carry generator of FIG. 22. This carry pulse is applied during at least part of the time that the write pulse is applied to the total sum generator and these two pulses are opposed to each other in the core 454 for example. Accordingly, provision must be made to insure writing into the selected core in the total sum generator, as by making the write pulse stronger than or of longer duration than the carry read pulse, or using other measures of similar effect. Later, then, if a half-select read pulse is impressed upon the lead 458 simultaneously with a half-select carry read pulse on lead 462, only one core will respond, for example core 454. The core 454 will generate output pulses in the sense lines 0 and 6, indicating a digit 6. To take another case, that of the core 456, if the digit in the accumulator register is a 9, there will be inhibit currents on all the inhibit lines except lines 3 and 6. Now, the only core that can be written into is core 456 and when this core is read, it will generate output pulses on sense lines 0 and 3, indicating a zero. When no half-select pulse is present on the carry read line 462, no reading out from the total sum generator can occur.

COLUMN SHIFTING

FIG. 24 shows a wiring scheme for a left shift matrix. The matrix is designed to receive an input in the form of a ten-digit number and to generate therefrom a twenty-digit number which comprises the original number shifted to the left any number of decimal places from 0 to 10 inclusive. It will be noted hereinafter in reference to the operations of multiplication and division that a maximum shift of ten decimal places is required when the capacity of the machine is twenty places. Additional digits are automatically placed before and after the digits of the original number as may be required to fill out the twenty digit positions. If the original number is the complement of some given number, the matrix may be controlled in such a way that nines will be supplied to fill out the unfilled digit positions at the left and zeros will be supplied to fill out on the right. If the original number is a true number as distinguished from a complement, the matrix may be controlled to supply zeros to fill out all the unfilled digit positions. Another purpose of the ten-place left shift herein is to set up in the storage register a twenty-digit number which has previously been stored half at one memory address and half in another, as for example, when two ten-digit numbers have been multiplied together and the resultant twenty-digit product has been broken up into two ten-digit sections and stored in two addresses of a ten-digit memory device. In this case, separate input gates to the high and low order divisions of the storage register may be provided.

In the arrangement of FIG. 24, fifty $Z_1$ inhibit lines as from block 52 thread respectively through the first fifty cores at the right in the top row of cores. These fifty lines then drop down to the second row of cores and thread respectively through cores in positions 6 through 55 from right to left in that row, thus in effect shifting one digit position to the left. The fifty lines then drop down to the third row and thread respectively through cores in positions 11 through 60 in that row. This wiring scheme continues in successive rows until in the bottom row the fifty lines thread respectively through cores in positions 51 through 100 in that row. One hundred sense lines, representing twenty digit positions, thread respectively through all cores in positions 1 through 100. In addition to the cores above mentioned, in the top ten rows there is a core threaded by a sense line at every core position where the sense line is designated S–0 or S–3. In the digit positions 11–20, inclusive, there is also a core threaded by a sense line at every core position designated S–6. A "true" inhibit line 464 threads through all the cores which are threaded by an S–6 sense line but are not threaded by any one of the inhibit lines from block 52. A "complement" inhibit line 466 threads through all the cores, in digit positions 11 through 20 only, which are threaded by an S–0 sense line but are not threaded by any one of the inhibit lines from block 52. The cores that are threaded by an S–3 sense line but are not threaded by any one of the fifty inhibit lines from block 52 are not threaded by either the true inhibit line 464 or the complement inhibit line 466 and so are never inhibited. The reason for this arrangement will be evident from the fact that the number 3 bit appears in the codes for both 0 and 9. A read-write cable 468 threads through all the cores in the entire matrix shown in FIG. 24. A shift register to control core drivers used to impress half-select pulses upon a selected horizontal row of cores is shown in FIG. 26.

For an example of the operation of the left shift matrix of FIG. 24, let it be supposed that a true left shift of six decimal places is desired. The information defining the ten-digit number in the storage register will be impressed upon the fifty inhibit lines from block 52. Inhibit current will be sent over the true inhibit line 464 to inhibit all cores before those representing the number to be shifted which are threaded by S–6 sense lines. Since cores before and after those representing the number to be shifted and which are threaded by S–3 lines are not threaded by either the true line 464 or the complement inhibit line 466, the cores on the S–0 and S–3 sense lines in all the flanking digit positions are left uninhibited. In all, the uninhibited cores are those in each row which represent the number to be shifted, with zeros before and after to fill out the twenty digit positions. The uninhibited cores in the sixth row may be set on by means of a half-select write pulse sent over the write line in the cable 468 simultaneously with a half-select pulse over the sixth horizontal line. Thereafter, the shifted number with the flanking zeros may be read into the storage register in place of the original number by way of the sense amplifiers upon sending a full select read pulse over the read wire in the cable 468.

If a left shift of a complemented number is desired, inhibit current is sent over the complement line 466 to inhibit certain of the cores on the left of those representing the number to be shifted, more particularly the cores through which the S–0 sense lines are threaded, thus leaving cores on the S–3 and S–6 lines uninhibited to supply nines in the unfilled digit positions. On the right of the number to be shifted, zeros are supplied by means of the set of permanently uninhibited cores threaded by the S–0 and S–3 sense lines.

FIG. 25 shows a wiring scheme for a right shift matrix. This matrix provides for shifting 0 to 10 digit positions, inclusive. The original number may be a twenty place number but the number that is sensed is limited to the first ten digit positions from the right. By means of this matrix, digits in the righthand positions may be eliminated by shifting the number to the right. Another use is in breaking a twenty-digit number up into two sections for separate storage in two ten-digit capacity memory addresses.

In the arrangement of FIG. 25, one hundred $Z_2$ inhibit lines from the accumulator register are shown coming into the matrix. There are eleven rows of fifty cores each in the matrix, the cores occupying the first fifty core positions counting from the right. Fifty sense lines are provided, one sense line threading through each vertical column of cores. In the top row of cores, the righthand fifty of the one hundred inhibit lines threaded respectively through the cores in positions 1 through 50. In the next row, row 1, the sixth through the fifty-fifth inhibit lines thread respectively through the cores in positions 1 through 50. In row 2, the eleventh through the sixtieth inhibit lines thread respectively through the cores in positions 1 through 50, etc. Finally, in row 10, the fifty-first through the one hundredth inhibit lines thread respectively through the cores in positions 1 through 50. A read-write cable 470 threads through all the cores in the entire matrix shown in FIG. 25. The shift register of FIG. 26 may be used in selecting the number of places to be shifted. No provision is made in the arrangement of this figure to shift numbers that are in complemented form. Such numbers may first be formed in the left shift matrix of FIG. 24 and then given any desired right shift in the matrix of FIG. 25, with the saving of a considerable amount of equipment and wiring. The operation of the matrix of FIG. 25 is similar to that of FIG. 24.

A code involving the masking digits in digit positions 7 and 8 of the instruction word is employed to specify the number of decimal places to be shifted. Whether the shift is to be to the left or to the right may be specified in the operational control code.

If either of the masking digits in digit positions 7 and 8 of the instruction word is a nine and the other masking digit is not zero, then these two masking digits will be used in the above-mentioned code to specify the number of places to be shifted. It will be evident that masking will not involve nine places on one side and one or more places on the other side, for the reason that a masking of nine places on one side of a ten-digit number and one digit on the other side would leave no number at all. Thus it is seen that the code given below in Table 1 will not interfere with masking instructions.

*Table 1*

| Digit Position 8 | Digit Position 7 | Shift |
|---|---|---|
| 9 | 1 | 0 |
| 9 | 2 | 1 |
| 9 | 3 | 2 |
| 9 | 4 | 3 |
| 9 | 5 | 4 |
| 9 | 6 | 5 |
| 9 | 7 | 6 |
| 9 | 8 | 7 |
| 9 | 9 | 8 |
| 1 | 9 | 9 |
| 3 | 9 | 10 |

It can be seen by inspection of Table 1 that the number of places to be shifted may be determined by summing the digits in digit positions 7 and 8 and using the unit digit of the sum for selective control of a set of core drivers each individual to a different horizontal row of cores in a shift matrix such as shown in FIG. 24 or 25. There are two exceptions to this rule, namely shifts 9 and 10. The exceptions are taken care of by modified circuitry, together with the regular cases in a shift register shown in FIG. 26.

In FIG. 26, a shift register is shown having ten triggers representing respectively from left to right the bits 0, 1, 2, 3, 6, of digit position eight and the bits 0, 1, 2, 3, 6 of digit position seven. An and-circuit 540 is connected so as to be conditioned if and only if there is a nine in digit position eight. An and-circuit 542 is connected so as to be conditioned if and only if there is a nine in digit position seven. The and-circuits 540 and 542 when conditioned may be actuated simultaneously by means of a shift register output gate pulse applied over a line 544. A bank 546 of eleven and-circuits is provided, each assigned to a different shift value from 0 to 10, inclusive. The triggers in digit position seven are permanently connected to the inputs of certain of the and-circuits in the bank 546 in accordance with the code of Table 1 up to and including the shift value of 8. The and-circuits for shift values 0–8 inclusive require a sampling pulse from and-circuit 540 before they can be actuated and then only the one will be actuated that is conditioned by the triggers in digit position seven. The end-circuits for shift values 9 and 10 are conditioned by the triggers in digit position eight and require sampling by the and-circuit 542 before they can be actuated. The triggers for bits 0 and 1 in digit position eight are connected to the input of the and-circuit for shift value 9 and the triggers for bits 1 and 2 are connected to the input of the and-circuit for shift value 10 in accordance with the code in Table 1. When the digits in digit positions seven and eight have been registered in the triggers in FIG. 26, the application of the shift output gate pulse to the line 544 will cause one and only one of the and-circuits in bank 546 to be actuated in accordance with the code given in Table 1.

MASKING

FIG. 27 shows a masking matrix with accompanying mask register and decoding circuits. The arrangement accommodates fifty-four distinguishable cases wherein a ten-digit word is masked so that from zero to nine digit positions are masked out at the left and from zero to nine digit positions are masked out at the right, leaving in each case from one to nine digit positions which are not affected by the masking. When a ten-digit word is impressed upon the matrix, the output word consists of zeros in all the masked out positions, with the digits as given in the impressed word appearing unchanged in the digit positions which are not masked out. Table 2 shows the digit positions in which zeros are substituted for the original digits for the various masking combinations.

*Table 2*

MASK MEMORY WORD FORMATS

| Word Number | Word Address | | Digit Positions | | | | | | | | | |
|---|---|---|---|---|---|---|---|---|---|---|---|---|
| | Left Mask | Right Mask | 10 | 9 | 8 | 7 | 6 | 5 | 4 | 3 | 2 | 1 |
| 1 | 0 | 1 | ---- | ---- | ---- | ---- | ---- | ---- | ---- | ---- | ---- | 0 |
| 2 | 0 | 2 | ---- | ---- | ---- | ---- | ---- | ---- | ---- | ---- | 0 | 0 |
| 3 | 0 | 3 | ---- | ---- | ---- | ---- | ---- | ---- | ---- | 0 | 0 | 0 |
| 4 | 0 | 4 | ---- | ---- | ---- | ---- | ---- | ---- | 0 | 0 | 0 | 0 |
| 5 | 0 | 5 | ---- | ---- | ---- | ---- | ---- | 0 | 0 | 0 | 0 | 0 |
| 6 | 0 | 6 | ---- | ---- | ---- | ---- | 0 | 0 | 0 | 0 | 0 | 0 |
| 7 | 0 | 7 | ---- | ---- | ---- | 0 | 0 | 0 | 0 | 0 | 0 | 0 |
| 8 | 0 | 8 | ---- | ---- | 0 | 0 | 0 | 0 | 0 | 0 | 0 | 0 |
| 9 | 0 | 9 | ---- | 0 | 0 | 0 | 0 | 0 | 0 | 0 | 0 | 0 |
| 10 | 1 | 0 | 0 | ---- | ---- | ---- | ---- | ---- | ---- | ---- | ---- | ---- |
| 11 | 1 | 1 | 0 | ---- | ---- | ---- | ---- | ---- | ---- | ---- | ---- | 0 |
| 12 | 1 | 2 | 0 | ---- | ---- | ---- | ---- | ---- | ---- | ---- | 0 | 0 |
| 13 | 1 | 3 | 0 | ---- | ---- | ---- | ---- | ---- | ---- | 0 | 0 | 0 |
| 14 | 1 | 4 | 0 | ---- | ---- | ---- | ---- | ---- | 0 | 0 | 0 | 0 |
| 15 | 1 | 5 | 0 | ---- | ---- | ---- | ---- | 0 | 0 | 0 | 0 | 0 |
| 16 | 1 | 6 | 0 | ---- | ---- | ---- | 0 | 0 | 0 | 0 | 0 | 0 |
| 17 | 1 | 7 | 0 | ---- | ---- | 0 | 0 | 0 | 0 | 0 | 0 | 0 |
| 18 | 1 | 8 | 0 | ---- | 0 | 0 | 0 | 0 | 0 | 0 | 0 | 0 |
| 19 | 2 | 0 | 0 | 0 | ---- | ---- | ---- | ---- | ---- | ---- | ---- | ---- |
| 20 | 2 | 1 | 0 | 0 | ---- | ---- | ---- | ---- | ---- | ---- | ---- | 0 |
| 21 | 2 | 2 | 0 | 0 | ---- | ---- | ---- | ---- | ---- | ---- | 0 | 0 |
| 22 | 2 | 3 | 0 | 0 | ---- | ---- | ---- | ---- | ---- | 0 | 0 | 0 |
| 23 | 2 | 4 | 0 | 0 | ---- | ---- | ---- | ---- | 0 | 0 | 0 | 0 |
| 24 | 2 | 5 | 0 | 0 | ---- | ---- | ---- | 0 | 0 | 0 | 0 | 0 |
| 25 | 2 | 6 | 0 | 0 | ---- | ---- | 0 | 0 | 0 | 0 | 0 | 0 |
| 26 | 2 | 7 | 0 | 0 | ---- | 0 | 0 | 0 | 0 | 0 | 0 | 0 |
| 27 | 3 | 0 | 0 | 0 | 0 | ---- | ---- | ---- | ---- | ---- | ---- | ---- |
| 28 | 3 | 1 | 0 | 0 | 0 | ---- | ---- | ---- | ---- | ---- | ---- | 0 |
| 29 | 3 | 2 | 0 | 0 | 0 | ---- | ---- | ---- | ---- | ---- | 0 | 0 |
| 30 | 3 | 3 | 0 | 0 | 0 | ---- | ---- | ---- | ---- | 0 | 0 | 0 |
| 31 | 3 | 4 | 0 | 0 | 0 | ---- | ---- | ---- | 0 | 0 | 0 | 0 |
| 32 | 3 | 5 | 0 | 0 | 0 | ---- | ---- | 0 | 0 | 0 | 0 | 0 |
| 33 | 3 | 6 | 0 | 0 | 0 | ---- | 0 | 0 | 0 | 0 | 0 | 0 |
| 34 | 4 | 0 | 0 | 0 | 0 | 0 | ---- | ---- | ---- | ---- | ---- | ---- |
| 35 | 4 | 1 | 0 | 0 | 0 | 0 | ---- | ---- | ---- | ---- | ---- | 0 |
| 36 | 4 | 2 | 0 | 0 | 0 | 0 | ---- | ---- | ---- | ---- | 0 | 0 |
| 37 | 4 | 3 | 0 | 0 | 0 | 0 | ---- | ---- | ---- | 0 | 0 | 0 |
| 38 | 4 | 4 | 0 | 0 | 0 | 0 | ---- | ---- | 0 | 0 | 0 | 0 |
| 39 | 4 | 5 | 0 | 0 | 0 | 0 | ---- | 0 | 0 | 0 | 0 | 0 |
| 40 | 5 | 0 | 0 | 0 | 0 | 0 | 0 | ---- | ---- | ---- | ---- | ---- |
| 41 | 5 | 1 | 0 | 0 | 0 | 0 | 0 | ---- | ---- | ---- | ---- | 0 |
| 42 | 5 | 2 | 0 | 0 | 0 | 0 | 0 | ---- | ---- | ---- | 0 | 0 |
| 43 | 5 | 3 | 0 | 0 | 0 | 0 | 0 | ---- | ---- | 0 | 0 | 0 |
| 44 | 5 | 4 | 0 | 0 | 0 | 0 | 0 | ---- | 0 | 0 | 0 | 0 |
| 45 | 6 | 0 | 0 | 0 | 0 | 0 | 0 | 0 | ---- | ---- | ---- | ---- |
| 46 | 6 | 1 | 0 | 0 | 0 | 0 | 0 | 0 | ---- | ---- | ---- | 0 |
| 47 | 6 | 2 | 0 | 0 | 0 | 0 | 0 | 0 | ---- | ---- | 0 | 0 |
| 48 | 6 | 3 | 0 | 0 | 0 | 0 | 0 | 0 | ---- | 0 | 0 | 0 |
| 49 | 7 | 0 | 0 | 0 | 0 | 0 | 0 | 0 | 0 | ---- | ---- | ---- |
| 50 | 7 | 1 | 0 | 0 | 0 | 0 | 0 | 0 | 0 | ---- | ---- | 0 |
| 51 | 7 | 2 | 0 | 0 | 0 | 0 | 0 | 0 | 0 | ---- | 0 | 0 |
| 52 | 8 | 0 | 0 | 0 | 0 | 0 | 0 | 0 | 0 | 0 | ---- | ---- |
| 53 | 8 | 1 | 0 | 0 | 0 | 0 | 0 | 0 | 0 | 0 | ---- | 0 |
| 54 | 9 | 0 | 0 | 0 | 0 | 0 | 0 | 0 | 0 | 0 | 0 | ---- |

The figure shows left and right mask registers each consisting of a group of triggers. It will be assumed that masking information contained in digit positions 7 and 8 of an instruction word has been sensed and set up by means of the triggers, there being two triggers set on in the left mask register and two triggers set on in the right mask register. For example, to mask off three digits on the left, the left mask register may be set at 3, as by setting on the number 1 trigger and the number 2 trigger, triggers 0, 3 and 6 being off. In the example, to mask off four digits on the right, the right mask register may be set at 4, as by setting on the number 1 trigger and the number 3 trigger, triggers 0, 2 and 6 being off. For purposes of clarity, the input connections to the triggers are not shown in the figure.

The off output terminal of each trigger in the left mask register is connected through wires in a cable 610 to input terminals of a plurality of or-circuits which function as negative and-circuits. The or-circuit 612 which is the first or-circuit from the left has conections to its input from the number 0 trigger and the number 1 trigger and is associated with the presence of a digit one in the left mask register. The or-circuit 614 has connections to its input from the number 0 trigger and the number 2 trigger and is associated with the presence of a digit two in the left mask register. The other or-circuits in line with the or-circuits 612 and 614 in the figure are similarly associated with the presence of digits 3, 4, 5, 6, 7, 8 and 9, respectively, in the left mask register.

The off output terminal of each trigger in the right mask register is similarly connected through wires in a cable 616 to input terminals of a plurality of or-circuits, of which or-circuit 618 is exemplary. The or-circuit 618 has connections to its input from the number 0 trigger and number 1 trigger in the right mask register and is associated with the presence of a digit one in the right mask register. Each of the or-circuits has its output connected to the input of an individual core driver which is in turn connected to an inhibit line. For example, the or-circuit 612 is connected to a core driver 620 which is in turn connected to an inhibit line L1; the or-circuit 614 is connected to a core driver 622 which is in turn connected to an inhibit line L2; and the or-circuit 618 is connected to a core driver 624 which is in turn connected to an inhibit line R1. A mask pulsing line 626 is connected in common to the inputs of all the or-circuits 612, 614, 618, etc.

Seven cores are provided in the mask matrix in each digit position, ten digit positions being indicated and six being shown in detail. The cores for digit position ten are shown at 628 representing a 0 bit, 630 representing a 1 bit, 632 a 2 bit, 634 a 3 bit, 636 a 6 bit, the two extra cores 638 and 640 representing an output digit zero which may result from masking out the ten digit position. Cores for the digit positions 9, 8, 7, etc. are shown to the right of the cores for the tenth digit position. Each of the cores 628, 630, 632, 634 and 636 is threaded by an inhibit line of cable 81 (FIG. 2) and a sense line of cable 104 (FIG. 2), and the corresponding five cores in each of the other digit positions are similarly threaded. The sense lines S–0 and S–3, representing a zero digit thread through the cores 638 and 640 respectively. In each of the other digit positions, the two extra cores are threaded by the S–0 and S–3 sense lines for the respective digit position. All of the cores in all of the digit positions are threaded by a read line 641 and a write line 643 threads through cores 628, 630, 632, 634, 636, in each digit position, skipping cores 638 and 640 in each digit position. In each digit position, the read line 641 threads through the two extra cores 638 and 640 in polarity opposite to that in which it threads through the five ordinary cores. In other words, the read line 641, when viewed as passing from right to left, threads upwardly trough the cores 628, 630, 632, 634 and 636, and downwardly through the cores 638 and 640. The mask inhibit line L1 threads through the seven cores of digit position 10, passing upwardly through the cores 628, 630, 632, 634 and 636, and downwardly through cores 638 and 640. The mask inhibit line L2 threads through the cores in digit positions 9 and 10 in a manner similarly to the threading of line L1 through the cores of digit position 10. The mask inhibit lines L3 through L9 thread through the cores of digit positions 10, 9, 8, and digit positions 10, 9, 8, 7, and so forth, respectively, the line L9 threading through all the cores in digit positions 10 down to 2, inclusive. These mask inhibit lines are represented in the figure as being gathered into a cable 644. The mask inhibit line R1 threads through the cores in digit position 1, the mask inhibit line R2 threads through the cores in digit positions 1 and 2, etc., the mask inhibit line R9 threading through the cores in digit positions 1 through 9. These lines are represented as being formed into a cable 646. In the region of the cores, the left mask inhibit lines are represented by a cable 648 while the right mask inhibit lines are represented by a cable 650. All the mask inhibit lines meet finally in a common point 652.

The operation of the arrangement of FIG. 27 will now be explained with reference to the example of an instruction which calls for masking out three digit positions on the left and four on the right. In this case, trigger number 1 and trigger number 2 in the left mask register are on and triggers number 0, 3 and 6 are off. The triggers that are on have a relatively low potential or a negative potential at the off output terminal, while the triggers that are off have a relatively high or positive potential at the off output terminal. Thus the or-circuit 613, which is associated with a digit 3, has two negative inputs while all the other or-circuits connected to the triggers of the left mask register have at least one positive input each. If the or-circuits are gated by means of a negative gating pulse (masking gate) over the wire 626, the output of the or-circuit 613 is negative and thus capable of turning on its associated core driver, while the outputs of all the other or-circuits associated with the left mask register are positive. Thus, only the one core driver 623 will be turned on. The turning on of this core driver supplies inhibit current over the left mask inhibit line L3 which is threaded through all the cores in digit positions 10, 9 and 8. The effect in digit position 10 is indicative of the effect in digit positions 9 and 8. In digit position 10, the presence of inhibit current in the wire L3 inhibits the five ordinary cores 628, 630, 632, 634 and 636 but sets up the cores 638 and 640 because the current passes through these last two cores in the polarity opposite to that in which it passes through the five ordinary cores. The application of a write pulse to these cores while the masking pulse and data inhibit currents are on will now have no effect upon the state of cores 628, 630, 632, 634 and 636, which are all inhibited. The write pulse will also not change the state of the cores 638 and 640 because it will be noted that the write line 643 is purposely not threaded through these cores, so that these cores remain in the set state. When the masking gate pulse, data inhibit current and the write pulse have been removed and a read pulse is applied, outputs will be obtained only from the cores 638 and 640, giving a zero in the tenth digit position regardless of what digit may be represented by the inhibit currents for this digit position.

In the example, the right mask register contains a digit 4, represented by the triggers numbers 1 and 3 being on while the triggers numbers 0, 2 and 6 are off. In this case, the only or-circuit that gives a negative output when gated by the masking pulse is the or-circuit 615, which turns on the core driver 625, thereby supplying inhibit current to line R4. This insures the appearance of zeros in digit positions 1 through 4 regardless of what these digit positions may represent. Digit positions 5 through 7 receive no inhibit currents over any of the masking inhibit lines. In these digit positions the data inhibit lines in the cable 81 control the process of writing into the five ordinary cores in normal manner. It will be noted that since the write pulse does not pass through the two extra cores the latter cores are not written into. When the read pulse is applied, therefore, the original information content of these digit positions is read out as intended. The over-all result is that the unmasked digits are read out flanked by zeros in the masked positions. The timing sequence of the control pulses is shown in FIG. 27A, which shows that the masking gate and the ordinary data inhibit lines are first energized. Then the write pulse is applied while the mask gate and data inhibits remain on. The write pulse goes off first, followed by the mask gate and the data inhibit pulse. Thereafter, the read pulse is applied. The application of the read pulse produces the desired output and at the same time clears the mask matrix.

The different kinds and timing of pulses as shown in FIG. 27A are illustrative of pulses supplied by the control pulse generator 188 in response to an operation code word contained in the operation word storage unit 92. Pulses of desired kind and timing are generated by the unit 188 and the pulses required in any desired operation are selected and switched onto the proper control lines by the unit 92, not only in a masking operation but generally in all types of operations of which the computer is capable.

FIG. 28 shows an alternative form of masking matrix which may be controlled by the same sets of core drivers shown in FIG. 27. The matrix is shown diagrammatically at 654. It may be a 9 by 9 by 50 array of cores. The left mask inhibit lines serve to address one coordinate dimension of the matrix 654 and the right mask inhibit lines to address a second coordinate dimension. The core drivers may be so adjusted and so connected to the cores as to deliver half-select currents instead of inhibit currents. As a result of the addressing process, a single row of 50 cores may be selected. The cores at each address may be used to accommodate one of the 54 mask words shown in Table 2. In each case, the inhibit lines of cable 81, instead of passing through all cores in all digit positions pass through the five cores in each of the digit positions that are shown in Table 2 as having no zero in them. In the digit positions that have a zero, two cores are placed, on the sense lines S–0 and S–3, respectively, representing a zero. These two cores have no inhibit lines passing through them. The core drivers will always switch the zero insert cores in whatever mask word is selected, in both the writing and the reading operations. However, only the cores that correspond to the information carried by the data inhibit lines will be written into in the positions that are not to be masked. Therefore, when the information is read out of the mask register it will be in the desired form.

SUBTRACTION

Subtraction is accomplished in the adder by first generating the complement of the subtrahend and using that as an addend in an adding operation.

When any two numbers are to be combined in the adder, it will be understood that both may be positive numbers, both negative numbers or either one may be positive and the other negative. In general, one of the numbers may be obtained from a register, for example the accumulator register, and the other may be obtained from memory or from another register, for example the storage register. In any case, each number is accompanied by its algebraic sign to show whether it is positive or negative. An instruction will be provided which will specify whether the second number is to be added to or subtracted from the first number. A useful distinction may be made at this point between an instruction and an arithmetical operation. For example, when two numbers of the same algebraic sign are to be combined under an instruction to add, the resulting arithmetical operation may be regarded as addition, whether the numbers combined are both positive or both negative. An instruction to subtract a negative number from a positive number may be carried out by adding the two numbers without regard to sign and prefixing a positive sign to the answer, essentially an adding operation. Similarly, an instruction to subtract a positive number from a negative number results in what is essentially an adding operation. Likewise, when two numbers of the same algebraic sign are to be combined under an instruction to subtract the second from the first, the resulting arithmetical operation may be regarded as subtraction, whether the numbers combined are both positive or both negative. An instruction to add two numbers of opposite sign results in what is essentially a subtracting operation.

In what is essentially an adding operation, there is actually no subtrahend and no complementing operation is required. The problem of overflow does, however, occur, and the presence of an overflow is indicated by the overflow indicator 472 (FIG. 17).

In what is essentially a subtracting operation, the second number is a subtrahend regardless of whether it is positive or negative. Accordingly, the second number is complemented before it is sent to the adder. It will be noted that overloading never occurs in a subtracting operation as above defined. However, an overload signal will nevertheless be transmitted to the indicator 472 whenever the subtrahend is smaller in absolute magnitude than the minuend. Use may be made of overload signal and of the absence of an overload signal in the subtracting operation to determine when the algebraic signal of the difference computed by the adder is opposite from the algebraic sign of the minuend and when the difference computed by the adder must be complemented to obtain the true difference. It is found that when no overload signal is obtained the result computed by the adder must be complemented and given the opposite algebraic sign to that of the minuend. When the overload signal appears, the result computed by the adder is the true difference. It will be noted that if the overflow signal is regarded as a high order carry digit, this digit is to be disregarded in a subtracting operation, as the carry digit so obtained does not enter into the computation of the true difference.

Known comparison circuits may be used as needed to compare the algebraic signs of the numbers to be combined and to take account of the nature of the instruction, whether to add to subtract, in order to determine whether the arithmetical operation which will result from the given instruction is essentially an adding operation or a subtracting operation. Such circuits are no part of the present invention and so are not shown in the drawings nor described in detail herein. The comparison circuits may be used to bring in a branch instruction by the method of operation described above in connection with FIG. 7.

MULTIPLICATION

Multiplication is performed by successive addition together with column shifting. The number of times the multiplicant is added and the position to which it is shifted, is controlled by the value of the multiplier. The MQ digit register 116 is used to control the number of times the multiplicant is added before shifting. The MQ digit register is a one-digit position trigger register that counts in ascending order when pulsed at its input. It may be similar in form to the 0–9 instruction counter block 176 shown in FIG. 12. The additions during the multiplication process preferably start at the left and proceed by right shifts one less in number than the number of digit positions in the multiplier.

To start the multiplication, the tens complement of the highest order significant digit of the multiplier is placed in the MQ digit register. The multiplicand is then shifted to the left by a number of digit positions one less than there are digits in the multiplier and in this position the multiplicand is added into the accumulator register, which has first been cleared to receive it. As this addition is completed, the MQ digit register is given one pulse over its advance line to increase by one the reading in this register. If no carry is produced in the MQ digit register, the addition of the multiplicand into the accumulator register is repeated. In the MQ digit register, a carry corresponds to a tens instruction counter ring advance pulse over the lead 330 in the instruction counter block 176 of FIG. 12. As each addition cycle is completed and the subtotal set up in the accumulator register, the MQ digit register is pulsed and advanced by one until a carry output is generated in the MQ digit register. At this time, addition in that shift position ceases, the multiplicand is shifted to the right one digit position and the tens complement of the next lower order digit of the multiplier is read into the MQ digit register. It will be noted that the MQ digit register turns to zero at the same time that it generates the carry output pulse, and is therefore ready to receive the new tens complement number. The process of alternately adding and shifting continues until the tens complement of the unit digit of the multiplier has been processed through the MQ digit register and the resulting carry output has been generated.

At this time the multiplication has been completed and the total in the accumulator is the final product of the mulitplication. The multiplication process may be initiated and controlled automatically by means of an appropriate instruction word together with appropriate operation control words. The product in the accumulator register may have its most significant digit in the twentieth digit position or elsewhere in the higher order portion of the register. To store the product in memory it may be transferred over the $Z_2$ inhibit lines to the right shift matrix (FIG. 25) where it may be shifted to the right whatever number of places is required to bring the most significant digit to a desired digit position in the lower order portion, whence the resultant ten-digit number (possibly rounded off) may be transferred to the storage register and thence to memory. Alternatively, the twenty-digit product in the accumulator register may be passed through the right shift matrix twice. In one pass, with zero shift, the lower order ten digits may be routed through the storage register to one memory address, and, in another pass, with a right shift of ten decimal places, the higher order ten digits may be routed through the storage register to another memory address. Thus, the entire twenty-digit number may be stored by utilizing two memory locations.

Representative values of machine operating time taken in performing multiplication may be found from FIG. 5. Assuming a ten-digit multiplicand, an average case may be illustrated by multiplying the multiplicand by 55,555. This case requires five additions in each of five shift positions, a total of 25 additions. In terms of FIG. 5, 12 cycle points elapse before the first addition is started. After that, each addition requires 10 cycle points. The total for the entire multiplication operation is 262 cycle points, or 262 microseconds. The case requiring the longest time is the multiplication of a ten-digit multiplicand by 9,999,999,999. This case requires nine additions in each of ten shift positions, a total of 90 additions.

DIVISION

Division is performed by successive subtraction together with column shifting. The MQ digit register 116 is used to count the number of subtractions performed between column shifts, thereby determining the successive digits of the quotient. These digits are read out from the MQ digit register one by one as they are determined and are deposited in their respective digit positions in the MQ register 90, thereby developing and storing the value of the quotient.

Preparatory to division, the dividend is placed in the accumulator register. The subtractions of the divisor from the dividend preferably start at the left and proceed by right shifts until the division is completed. At the start, the MQ digit register is reset to zero. The subtraction is done by taking the complement of the divisor and adding it to the number in the accumulator register. Successive subtractions are made in any given shift position as long as each subtraction produces a high order carry (overflow indication) in the adder, the high order carry being used as a signal to make another subtraction without shifting, and also to advance the MQ digit register count by one. When a subtraction is made that does not generate a high order carry, the divisor is added back and the complemented divisor shifted one digit position to the right. The digit then registered in the MQ digit register is transferred to the proper digit position in the MQ register, as the first significant digit of the quotient. The MQ digit register is then reset and the process repeated until the units digit of the quotient has been developed and stored in the MQ register. Thereafter, the quotient may be read out of the MQ register into the storage register for other processing operations.

INPUT AND OUTPUT BUFFERS

FIG. 29 shows a wiring scheme for an input buffer matrix. This matrix contains 55 cores arranged to receive and temporarily store a ten-digit-and-sign word coming in from the input device 48 (FIG. 2). The word is fed in serially by digit and parallel by bit. The input translator 102 receives pulses from the input device 48 which may, for example, be a punched card reader, and translates the pulses into suitable form to operate a set of triggers in the input register switch and driver block 100. In this block, $Z_3$ inhibit drivers are set up, for the five bits of a single digit, one digit at a time. The five inhibit drivers in the block 100 are connected respectively to the five input register inhibit lines which are shown running diagonally through successive sets of five cores each in FIG. 29. There are five cores for the sign and five cores each for the ten digits of a number to be stored in the input buffer. Fifty-five sense lines which run through the buffer matrix are so arranged that each core is threaded by one and only one sense line. The sense lines S–0, S–1, S–2, S–3, S–6 for the sign each thread through the core which is threaded by the respective one of the inhibit lines I–0, I–1, I–2, I–3, I–6. Similarly, the sense lines for any given digit each thread through one of the cores for that digit together with the respective inhibit line. By means of the inhibit lines, the information concerning a single digit is impressed in identical manner upon each set of five cores in the form of a pattern of inhibit currents. Half-select drive lines are provided so that the information may be recorded in a single set of five cores corresponding to the digit position to which the information relates. Cores for one digit at a time are set up and information may later be read out of all the ten digit positions and the sign position simultaneously. To prevent the information that is being written into any input buffer from causing errors to be inserted, care must be exercised to insure that writing into any input buffer will only occur during intervals when the sense lines are not gated into any register. This is possible since the high speed characteristics of the computer permit the information entering from the much slower input device to be sequenced to give this effect.

Of the above-mentioned drive lines, the line labeled OX–WI threads through all the cores for the sign and all the cores for digits 10, 9, 8, 7, 6. The line labeled 6X–WI threads through all the cores for the digits 5, 4, 3, 2, 1. The line labeled IY–WI threads through all the cores for the sign and for digit 5. The line labeled 2Y–WI similarly serves digits 10 and 4; the line 3Y–WI serves digits 9 and 3; the line 4Y–WI serves digits 8 and 2; the line 5Y–WI, digits 7 and 1; and the line 6Y–WI, digit 6. A read-out line RO threads through every core in the entire array. For compactness, the 55 cores of the matrix may be arranged in a three-dimensional array of 5 cores by 6 cores by 2 cores.

The sign and digits of a word may be written into the matrix of FIG. 29 in the usual order beginning with the sign and reading in the digits one at a time beginning with the left or most significant digit.

When the sign has been written into the input register 100, the five $Z_3$ switches in this unit are set to send inhibit currents which go over a selected three of the inhibit lines in the matrix of FIG. 29 to indicate the sign. Now, all but two cores in each set of five cores are inhibited. Half-select currents may now be sent over the lines OX–WI and IY–WI. This action sets only the two uninhibited cores in the top row, which represent the sign.

The input register may now be cleared and digit 10 may be set up therein. This action sends a new pattern of inhibit currents into the matrix of FIG. 29, representing the value of digit 10. Again, all but two cores in each set of five cores are inhibited. Half-select currents to effect the writing in of digit 10 in its proper position may now be sent over the lines OX–WI and 2Y–WI. This action sets only the uninhibited cores in the second row, representing the digit 10. The other digits are similarly handled. For example, when digit 1 is set up in the input register, sending a pattern of inhibit currents into the matrix to represent digit 1, half-select currents may be sent over the lines 6X–WI and 5Y–WI. This action sets only the two uninhibited cores in the bottom row. Two trigger rings may be used for automatically sequentially energizing the X– and Y–WI lines, respectively.

When two cores have been set on for the sign and two for each digit of the number, a read out pulse may be sent over the line RO. This action will send a pulse over each sense line that is threaded through a core that has been set on. In this way the number may be read out in parallel by digits and in parallel by bits. The word may be sent to the storage register over the sense lines.

Inasmuch as the input devices are generally slower acting than the computer, a plurality of input buffer matrices may be provided, all connected to the common set of sense lines. A plurality of input devices may be employed. These may be running simultaneously, each input device loading up an input buffer matrix. These matrices may be unloaded one after another into the storage register and from thence to the memory unit. In this way, the slower input devices may supply information at the rapid rate called for by the computer.

FIG. 30 shows a wiring scheme for an output buffer matrix. The form of the matrix is similar to that of the input matrix of FIG. 29. However, the diagonal lines in FIG. 30 represent a set of five sense lines and the vertical lines represent a set of 55 inhibit lines, instead of vice versa as is the case of FIG. 29. A word to be read out is set up on the inhibit lines. Two cores may be set on for the sign and two for each digit by sending a full select pulse through all the cores simultaneously over the line WI. Half-select drive lines OX–RO, 6X–RO, 1Y–RO, 2Y–RO, 3Y–RO, 4Y–RO, 5Y–RO and 6Y–RO are provided by means of which the two set-on cores associated with the sign or with any single digit may be read out one digit position at a time over the set of five sense lines. These sense lines are connected to the output register 138 by way of output sense amplifier gate block 134 and output sense amplifier block 136. A plurality of output buffer matrices may be provided, each connected to its individual output register, and a number of the matrices may be operated simultaneously. As in the case of the input buffer of FIG. 26, X and Y trigger rings may be used for sequentially reading out the respective digits.

INPUT-OUTPUT ADDRESSING

The input-output register 552 is a three-dimensional storage device for pairs of numbers which are representative of addresses to be found in the instruction and data storage unit 40. Each pair of numbers stored in the register 552 is composed of the beginning address and the ending address of a block of addresses in the memory unit 40. This block of memory addresses is preferably assigned to an individual one of a plurality of input devices such as the input device 48 illustrated in FIG. 2 which serve to supply data and instructions to the memory 40 as needed. The beginning and ending addresses to be used by the input device in question are preferably entered at an address in the register 552 which address is assigned for the use of this input device. For each input device there is preferably provided an output device which is used exclusively for reading information out of memory 40 from the same block of memory addresses into which information will be read by the corresponding input device. The beginning and ending addresses may be read into the register 552 from memory 40 by way of the storage register 50, $Z_1$ inhibit switch and driver block 52 and inhibit cable 81, and may be changed whenever desired by writing new numbers in over the old.

When an input device such as 48 has been connected to the input translator 102, the input device will be actuated in known manner to read its distinctive X and Y address coordinates into the addressing units 47, 49, thereby energizing the proper address position in the register 552 assigned to the particular input device that is connected. The register 552 thereupon reads the proper beginning address through the sense amplifiers 553 into the input-output register 554. The register 554 in turn sends pulses over the cable 556 to the 0–9 memory address switch and drive block 54 and the 000–900 memory address switch and driver block 56 to set up the units and hundreds digits of the beginning address in memory and over the cable 557 to the 00–90 switch and gate block 58 and the 0000–9000 switch and gate block 59 to set up the tens and thousands digits of the beginning address in memory. The input device may then load up the input buffer 42, which may then be unloaded into memory at the beginning address which has been set up. The beginning address is then augmented by one and the augmented address is transmitted over the cable 550 to the $Z_4$ switch and driver block 548 where inhibit currents are switched on for writing the augmented address into the register 552 in the position formerly occupied by the beginning address. The augmented address is then automatically compared with the ending address in known manner and if the end of the block has not been reached the new address is sent to the register 554 and the process repeated. When one input device has filled its allotted space in the memory, another input device may be connected to the input translator in place of the first input device.

When it is desired to unload a section of memory, the particular output device such as output device 74 assigned to the memory section in question may be connected to the output translator 140. The output device 74 will send its distinctive X and Y coordinates to the address blocks 47, 49, over a cable 73 to call for the beginning address in its assigned section of memory. The input-output register 552 will control the input-output address register 554 in the same manner as described above in connection with the operation of loading the memory.

It will be evident that loading and unloading may be carried on alternately, using any desired number of input and output devices and in any desired order.

ILLUSTRATIVE INSTRUCTIONS

In connection with the illustrative instructions given below it will be noted that, since the operation code is stored and is gotten out of storage during the cycle points 1 and 2, the operation code is not available for setting up the control switches, gate pulses, etc., required during the cycle points 1 and 2. Therefore, it is necessary to generate the necessary controls during cycle points 1 and 2 independently of any operation code in storage. For this purpose, the primary timer may be directly connected to the necessary control lines during the cycle points 1 and 2. These connections may be made in more or less permanent fashion in the control word storage unit 92 and the control pulse generator 188. For many instructions, the control lines actuated during cycle points 1 and 2 will be those listed below in Table 3. For other types of instructions a different set of control lines will be actuated initially. Provision may be made in the units 92 and 188 so that in response to a suitable prefatory signal the proper set of initial connections for cycle points 1 and 2 may be set up. In any case, at the beginning of cycle point 3, the control pulse generator 188 automatically takes over the generation of the requisite control pulses in accordance with the particular instruction which has been taken out of memory.

A first example will now be given, which is a relatively simple instruction involving no indexing and specifying zero shift. In ordinary English the instruction in question may read: "Store contents of MQ core matrix register with shift zero." The instruction word for this instruction, in the format of FIG. 4A will have 00 in digit positions 1 and 2 to indicate that there is no indexing. Digit positions 3 through 6 will contain a four-digit address in the storage unit 40 into which address the contents of the MQ register 90 are to be stored.

Digit positions 7 and 8 will contain the number 91 to indicate a shift of zero. Digit positions 9 and 10 will contain a two-digit address of the location of the operational control word for this operation in the operation word storage 92. This operation requires only ten cycle points of the primary timer for completion. Table 3 shows an analysis of the operation into steps carried out at the various cycle points, together with a list of the control lines that are actuated by the control pulse generator 188 during each cycle point.

*Table 3*

| Primary Timer Cycle | Operation | Control Lines Actuated |
|---|---|---|
| 1-2 | Read instruction from memory into storage register and simultaneously read digit positions 1 and 2 into index register 61, digit positions 3 through 6 into program address register 60, digit positions 7 and 8 into mask-shift register 57 and digit positions 9 and 10 into operational code register 63. | (a) Program address register input gate.<br>(b) Program index register input gate.<br>(c) Mask-shift register input gate.<br>(d) Operation code register input gate.<br>(e) Storage register input gate.<br>(f) Instruction counter output gate.<br>(g) 00-90 and 0000-9000 read gate sample.<br>(h) Read-write switch sample. |
| 3-4 | Regenerate instruction from storage register into memory. | (a) Storage register output gate.<br>(b) $Z_1$ inhibit sample.<br>(c) 00-90 and 0000-9000 write gate sample.<br>(d) Read-write switch sample.<br>(e) Instruction counter output gate. |
| 5 | Read contents of MQ register into storage register. | (a) MQ read gate.<br>(b) Storage register input gate.<br>(c) 0 read-write gate.<br>(d) 000 read-write gate.<br>(e) Read-write switch sample.<br>(f) Advance instruction counter. |
| 6-7 | Clear data word position that MQ word is to be stored in. | (a) Program address register output gate.<br>(b) 00-90 and 0000-9000 read gate sample.<br>(c) Read-write switch sample. |
| 8-9 | Store contents of storage register into memory location specified by program address register. | (a) Storage register output gate.<br>(b) 00-90 and 0000-9000 write gate sample.<br>(c) Read-write switch sample.<br>(d) Program address registe output gate.<br>(e) $Z_1$ inhibit sample. |
| 10 | Reset primary timer and operation code register. | (a) Reset primary timer and operation code register. |

It is assumed that at the start of the operations set forth in Table 3 the instruction in question is in storage in the memory unit 40 at the address then current in the instruction counter. Thus, during cycle points 1 and 2, the instruction counter output gate pulse is applied to the instruction counter to pass the current address in the instruction counter to the read-write switch blocks 266 in FIG. 12, 278 in FIG. 13, 290 in FIG. 14 and 300 in FIG. 15. The read-write switch sample pulse actuates the one selected read-write switch in each of the blocks 266 and 290, turning on the associated core drivers. The 00–90 and 0000–9000 read gate sample pulse actuates the one selected read switch in each of the blocks 273 and 300, in turn actuating the selected 00–90 and 0000–9000 read gates, thereby reading the contents of the selected memory address position onto the common sense lines. The input gates, which meanwhile have been operated, permit the pulses travelling over the sense lines to set triggers in the storage register and in the program address register, the program index register, the mask-shift register and the operation code register.

Since the act of reading out the instruction from memory has erased the instruction from memory, it is now necessary to rewrite the instruction in memory. This is done during cycle points 3 and 4, passing the information from the storage register to memory and leaving intact the contents of the program address register, the program inex register, the mask-shift register and the operation control register. To effect this result, the storage register output gate is actuated, setting up switches in the $Z_1$ inhibit switch unit 52. The $Z_1$ inhibit sample pulse turns on the necessary core drivers to transmit a pattern of inhibit currents to the memory unit 40 corresponding to the content of the storage register. The instruction counter output gate pulse sets up the read-write switches for the same memory address as before. The 00–90 and 0000–9000 write gate sample pulse operates the gates to determine a write-in operation, and the read-write switch sample pulse turns on the necessary core drivers, writing the information back into memory at the original address.

Next, in cycle point 5, the contents of the MQ register are read into the storage register. To prepare for this step, the MG read pulse is applied to the MQ register and the storage register input gate pulse is applied to the storage register. The 0 read-write gate pulse and the 000 read-write gate pulse each turn on a core driver, thereby providing two half-select current sources. The read-write switch sample pulse serves to send currents from both these sources over lines 606 and 608 respectively through the core windings of the MQ register, thereby reading the contents onto the sense lines and into the storage register, and clearing the MQ register. At this point the instruction counter may be advanced one step, as it will not be used again under the present instruction.

In cycle points 6 and 7, the memory address in which the contents of the MQ register are to be stored is cleared in preparation of writing the new information in. This is merely a read-out from memory without any input gates being actuated, so that the information read out is not recorded in any register. To do this, the program address output gate pulse is applied and the instruction counter output gate pulse is not applied, so that the address in memory from which the reading takes place will be the address determined by the program address register and not that determined by the instruction counter. The read gates are conditioned by the 00–90 and 0000–9000 read gate sample pulse and the core drivers are turned on by the read-write switch sample pulse.

In cycle points 8 and 9, the present contents of the storage register are read into the memory location specified by the program address register. This is accomplished in the same manner as the regeneration of the instruction word from the storage register into memory in cycle points 3 and 4, the only difference being that the program address register output gate is actuated instead of the instruction counter output gate. The main object of the instruction has now been attained. It remains only to reset the primary timer back to zero in readiness for the next machine operation and to clear the operation code register for the next operation. This is accomplished by a single control pulse in cycle point 10, sending a reset pulse to the timer and to the operation code register.

An example of an indexed instruction is shown in Table 4. In English this instruction may read: "Store in memory at an address adjusted by the index register, the lower order digits and sign of the contents of the accumulator register."

*Table 4*

| Primary timer cycle point | Operation | Control lines actuated |
|---|---|---|
| 1-2 | Read instruction from memory into storage register and simultaneously read index address, data address, mask-shift digits and operation code address into their respective registers. | (a) Program address register input gate. (b) Program index register input gate. (c) Mask-shift register input gate. (d) Operation code register input gate. (e) Storage register input gate. (f) Instruction counter output gate. (g) 00-90 and 0000-9000 read gate sample. (h) Read-write switch sample. |
| 3-4 | Regenerate instruction from storage register into memory. | (a) Storage register output gate. (b) $Z_1$ inhibit sample. (c) 00-90 and 0000-9000 write gate sample. (d) Read-write switch sample. (e) Instruction counter output gate. |
| 5-6 | Read index word from memory into storage register. | (a) Storage register input gate. (b) Program index register output gate. (c) 000 read-write gate. (d) 0000 read gate. (e) Read-write switch sample. (f) 00-90 and 0000-9000 read gate sample. (g) Advance by one the number in digit positions 3-6 of storage register. |
| 7-8 | Regenerate index word from the storage register into memory. | (a) Storage register output gate. (b) $Z_1$ inhibit sample. (c) Program index register output gate. (d) 000 read-write gate. (e) 0000 read-write gate. (f) Read-write switch sample. (g) 00-90 and 0000-9000 write gate sample. |
| 9 | Add index word and data adress word in adder. | (a) Storage register output gate. (b) Program address register output gate. (c) $Z_1$ inhibit sample. (d) $Z_2$ inhibit sample. (e) 0 read-write gate. (f) 000 read-write gate. (g) Adder address modification write. (h) Read-write switch sample. |
| 10 | Read partial sums and initial carries from adder into program register and carry register, respectively. | (a) Program address register input gate. (b) Carry register input gate. (c) 0 read-write gate. (d) 000 read-write gate. (e) Adder address modification partial sum and initial carry read gate. (f) Read-write switch sample. |
| 11 | Read No-9s from program register and initial carries from carry register into propagated carry generator and simultaneously develop total sum digits. The propagated carries are automatically entered into the carry register in this time. | (a) Program address register output gate. (b) Carry register output gate. (c) $Z_2$ inhibit sample. (d) Carry register input gate. (e) Total sum write. (This has 1½ select value to overcome carry write which is ½ select value in total sum generator.) (f) No-9 inhibit gate. |
| 12 | Read proper total sum digits from total sum generator into program address register, advance instruction counter and reset propagated to carry generator. (Use carry register to select which total sum digits are read from.) | (a) Program address register input gate. (b) Carry register output gate. (c) Total sum read. (This has ½ select and is combined with the carry pulse for reading out.) (d) Advanced instruction counter. (e) Propagated carry generator reset pulse. |
| 13 | Read the contents of the accumulator register into the right shift matrix and shift right zero. | (a) Accumulator register output gate. (b) Shift register output gate. (c) Right shift write gate. (d) $Z_2$ inhibit sample. (e) Read-write switch sample. |
| 14 | Read contents of right shift matrix into storage register and transfer accumulator sign to storage register. | (a) Storage register input gate. (b) Shift register output gate. (c) Right shift read gate. (d) Read-write switch sample. (e) Transfer accumulator sign to storage register. |
| 15-16 | Reset data word position that is specified by address in program address register. | (a) Program address register output gate. (b) 00-90 and 0000-9000 read gate sample. (c) Read-write switch sample. |
| 17-18 | Read contents of positions 1-10 of storage register and storage register sign into memory location that is specified by the address in the program address register. | (a) Storage register output gate. (b) 00-90 and 0000-9000 write gate sample. (c) Read-write switch sample. (d) Program address register output gate. (e) $Z_1$ inhibit sample. |
| 19 | Reset primary timer and operation code register. | (a) Reset primary timer and operation code register. |

Table 4 is no different from Table 3 in respect to cycle points 1 through 4. Cycle points 5 and 6 in Table 4 relate to a read operation from memory, but it is somewhat special inasmuch as the index word that is to be read out of memory is specified by only a two digit address, in the range from 00 through 99. To fill this address out to the range from 0000 through 0099, it is necessary to select a 000 core driver and a 0000 read gate. Otherwise, the operation is a normal read operation. Also, the index word in the storage register is advanced one digit to effect a tallying operation. The regeneration of the index word from the storage register into memory in cycle points 7 and 8 is likewise a normal write operation except that the 000 core driver and the 0000 write gate must be selected to fill the address up to four digits.

In cycle point 9, an add operation is started in which the index word is to be added to the data address word. The index word, obtained from memory in cycle points 5 and 6 and deposited in the storage register is a four-digit word and so is the data address word a four-digit word. Under the control of the storage register output gate pulse, the index word in the storage register sets up switches in the unit 52 and the $Z_1$ inhibit sample pulse turns on core drivers which deliver inhibit currents to one dimension of the adder. Under the control of the program address register output gate pulse, the data address word in the program address register sets up switches in the unit 64 and the $Z_2$ inhibit sample pulse turns on core drivers which deliver inhibit currents to a second dimension of the adder. These inhibit currents are absent from a certain one of the cores in each of the adder matrices, leaving these cores uninhibited. To write in the uninhibited cores, half-select currents are generated by two core drivers, one controlled by the 0 read-write gate pulse and the other controlled by the 000 read-write gate pulse. These core drivers have their circuits completed through the adder matrices by means of a gate controlled by the adder address modification write gate pulse. The core drivers are turned on by means of the read-write switch sample pulse, to send write currents over the write line of cable 420 in each layer of the adder matrix.

In cycle point 10, the partial sums are read out of the adder into the program address register and the initial carries are read into the carry register. The currents from the core drivers now are channeled through the read line of cable 420 in each layer of the adder matrix, the connection being completed under the control of the adder address modification partial sum and initial carry read gate. The read out pulses appear on the digit sense lines that thread through the adder matrices and on the carry sense lines 422.

In cycle point 11, the 3-bits and 6-bits, indicative of the presence or absence of nines, are read out of the program address register into the propagated carry generator under the control of the program address register output gate pulse. The 3-bit and 6-bit inhibit lines may be permanently connected to the and-circuits **446*b*, etc., in the propagated carry generator. The initial carries are read out of the carry register into the propagated carry generator under the control of the carry register output gate pulse. The carry triggers may be permanently connected to the and-circuits 438*a*, etc., in the propagated carry generator. The No-9 inhibit gate pulse is applied over the line 448 in the circuit of FIG. 22, and turns on the selected ones of the core drivers 452*b*, etc. The carry register input gate pulse serves to connect the carry sense lines to the input of the carry register, thereby adding the propagated carries to the assemblage of initial carries in the carry register. The total sum write pulse is applied to the line 460** in the circuit of FIG. 23, increasing each digit by one in the total sum generator under the control of the $Z_2$ inhibit lines, which are sampled by the $Z_2$ inhibit sample pulse.

In cycle point 12, the digits in the total sum generator are selectively read into the program address register under the control of the carry register. It will be noted that, in writing into the total sum generator, in cycle point 11, a total sum write pulse of one and a half-select value is used to overcome a half-select pulse on the carry read line 462 in FIG. 23. In reading out the total sum generator, in cycle point 12, a half-select pulse on the read line 458 combines additively with a half-select pulse on the carry end line 462. When the carry read pulse is not present, no readout from the total sum generator occurs. During this cycle point, the instruction counter is pulsed ahead by one count, ready for the next instruction, being no longer needed in respect to the present instruction. The data address as amended by the index word is now found in the program address register.

In cycle point 13, the accumulator register output gate is actuated to place the inhibit pattern of the number in the accumulator register upon the $Z_2$ inhibit lines. These lines pass through the right shift matrix (FIG. 25). The $Z_2$ inhibit sample pulse energizes the inhibit lines. The shift register output gate energizes a selected one of the drive lines in the right shift matrix, in this case the 0 shift drive line, sending a half-select pulse through one row of cores in the right shift matrix. The read-write switch sample pulse supplies a second half-select pulse, thereby setting up the requisite cores in the right shift matrix.

In cycle point 14, a normal read operation takes place to read the contents of the right shift matrix into the storage register. At the same time, the algebraic sign of the number in the accumulator register is transferred to the storage register by means of a special pulse.

In cycle points 15 and 16, the new address specified in the program address register is cleared by reading out with no register being made receptive to the material read out.

In cycle points 17 and 18, the digit positions 1 through 10 and the sign position in the storage register are read into memory at the address that was cleared during cycle points 15 and 16.

In cycle point 19, the primary timer and the operation code register are reset.

It will be noted that the instruction analyzed in Table 4 includes an addition operation as a subroutine, making it unnecessary herein to describe an addition operation separately.

The next example is the instruction: "Store the contents of the core input buffer into memory." In this example it is assumed that the memory address into which the incoming information is to be stored is the current address in the input address register 554. The operational steps are shown in Table 5.

*Table 5*

| Primary timer cycle point | Operation | Control lines actuated |
|---|---|---|
| 1-2 | Read incoming data word from core input buffer into storage register and current working address and ending address from input control address register into input address register. | (a) Input control address register output gate.<br>(b) Storage register input gate.<br>(c) Input address register input gate.<br>(d) Input buffer read gate.<br>(e) 0 read-write gate.<br>(f) 000 read-write gate.<br>(g) Read-write switch sample. |
| 3-4 | Clear the contents of the memory location specified by the input address register. | (a) Input address register output gate.<br>(b) 00-90 and 0000–9000 read gate sample.<br>(c) Read-write switch sample. |
| 5–6 | Store contents of storage register into memory at address specified by input address register. | (a) Storage register output gate.<br>(b) 00–90 and 0000–9,000 write gate sample.<br>(c) Read-write switch sample.<br>(d) Input working address register output gate.<br>(e) $Z_1$ inhibit sample. |
| 7 | Advance working address portion of input address register by one and then compare working and ending addresses. | (a) Advance working input address register and compare working and ending addresses. |
| 8–9 | Store the contents of the input address register into the core input address register. | (a) Input address register output gate.<br>(b) Core input address register write gate.<br>(c) Read-write switch sample.<br>(d) 0 read-write gate.<br>(e) 000 read-write gate. |
| 10 | Reset primary timer and operational code register. | (a) Reset primary timer and operation code register. |

It will be noted that in the example given in Table 5, no cycle time is needed for taking an instruction word out of memory and writing it back in. This is because the requisite instruction may be contained in the input control address register, including the current working address and the ending address. It will be noted also that the control lines activated during the cycle points 1 and 2 are not identical with those activated in the examples given in Tables 2 and 3. However, as in the preceding examples, during cycle points 3 and 4, the machine goes under the control of an operation code which is contained in the operation code register and the latter may be more or less permanently wired to the input control address register 552.

The operations effected in Table 5 and the mode of effecting them should now be clear from the examples given in Tables 3 and 4.

ERROR DETECTION

For detecting errors in transmission of the 2-out-of-5-bit code, the $Z_1$ error detection block 86 comprises two cores for each of the twenty digit positions and two cores for the sign. Both cores in a pair of cores assigned to detect errors in a given digit position detect current flow in the inhibit lines of all five bits associated with the given digit position. In the absence of error, a digit is always defined by current flowing in three of the five inhibit lines. One core in the error detection matrix responds if more than three inhibit lines carry current and another core responds if less than three inhibit lines carry current. In case of error, one of the two cores will flip. This action will result in setting a trigger in the Error Trigger No. 1 block 200, thereby indicating an error. If desired, this trigger may be used to stop the computer, by so arranging the programming. Instead of one error trigger, a plurality may be provided, one for each digit position, in order that the digit position in which the error occurs may be specifically indicated. The $Z_2$ Error Detection block 98 and the Error Trigger No. 2 in block 204 are similar in structure and mode of operation to the respective blocks 86 and 200.

SPECIAL INSTRUCTIONS

Any desired special instructions may be built into the machine by providing a core matrix or other functional unit for each operation or routine that is wanted, such, for example, as sorting and merging, in either ascending or descending order, etc. Any of these special units may be brought into use by means of instructions and programming whereby the machine is made to perform automatically the operation desired.

The usual power supplies are assumed to be provided and as these are well known they are not shown.

Cooling means may be provided in well known manner if needed. However the small size of the core element and the extensive use of transistors and diodes eliminates much of the need for cooling.

While illustrative forms of apparatus and methods in accordance with the invention have been described and shown herein, it will be understood that numerous changes may be made without departing from the general principles and scope of the invention.

What is claimed is:

1. In an information processing device, in combination, a memory unit, a plurality of registers including a storage register and a control information register, individual control means for said registers, a plurality of processing units, said memory unit and said processing units employing circuit elements which are responsive to impulses supplied by drive lines extending bodily through said units, and which supply outputs in sense lines which extend bodily through said units, unit selection means for said memory unit and said processing units, at least one distinctive drive line for each said processing unit and for said memory unit, said drive line extending through said unit to said unit selection means, common sense lines extending through said memory unit and said processing units to said registers, common transmission lines extending from the output of said storage register through said memory unit and said processing units, and control lines extending from the output of said control information register to said register control means, said memory unit and said unit selection means, said control lines serving to control selective transfer of information from said memory unit to a plurality of said registers or from any said processing unit to said storage register over said common sense lines, and to control selective transfer of information from said storage register to said memory unit or to any said processing unit over said common transmission lines.

2. In a program controlled data processing machine having a core matrix memory unit, a core matrix arithmetic unit, a core matrix logic unit, a matrix unit selection means, at least one distinctive drive line for each matrix unit connected to said matrix unit selection means, a storage register, a control information storage means, common sense lines through said core matrix memory unit and said core matrix arithmetic unit and said core matrix logic unit connected to the input of said control information storage means and the input of said storage register, common drive lines connecting the output of said storage register through said core matrix memory unit and said core matrix arithmetic unit and said core matrix logic unit, control lines from the output of said control information storage means to said matrix unit selection means, and means for selectively transferring information over the common sense lines to any one or more of the matrix units under control of the control lines.

3. In a program controlled data processing machine having a core matrix memory unit, a core matrix arithmetic unit, a core matrix logic unit, a matrix unit selection means, at least one distinctive drive line for each matrix unit connected to said matrix unit selection means, a storage register, a control information storage means, common sense lines through said core matrix memory unit and said core matrix arithmetic unit and said core matrix logic unit connected to the input of said control information storage means and the input of said storage register, common drive lines connecting the output of said storage register through said core matrix memory unit and said core matrix arithmetic unit and said core matrix logic unit, control lines from the output of said control information storage means to said matrix unit selection means, and means for selectively transferring information from the storage register over the common drive lines to any one or more of the matrix units under control of said control lines.

4. In a program controlled data processing machine, a memory unit, a logic unit, said memory unit and said logic unit each employing circuit elements which are responsive to impulses supplied by drive lines extending bodily through said units, and which supply outputs in sense lines which extend bodily through said units, a storage register, and a control information storage means; common sense lines through said memory unit and said logic unit connected to the input of said control information storage means and the input of said storage register, common drive lines connecting the output of said storage register through said memory unit and said logic unit; control lines controlled by said control information storage means extending to said memory unit, said logic unit and said storage register; and means operated by said control information storage means for causing the transfer of either control information or data information over the common sense lines to either said control information storage means or said storage register under control of the control lines; said last-mentioned means being operative for causing the transfer of control or data information from the storage register over the common drive lines to the memory unit or the logic unit under the control of said control lines.

5. In a program controlled data processing machine, a memory unit, an arithmetic unit, a logic unit, each of said memory unit, said arithmetic unit and said logic unit comprising an ordered arrangement of pulse responsive bistable magnetic elements the magnetic states of which are controllable by drive lines magnetically coupled thereto and which are capable of inducing output pulses in sense lines magnetically coupled thereto, a storage register and a control information storage means; common sense lines extending through and magnetically coupled to the bistable elements of said memory unit and said arithmetic unit and said logic unit and connected to the input of said control information storage means and the input of said storage register, common drive lines connecting the output of said storage register and extending through and coupled in predetermined arrangements to the magnetic elements of said memory unit and said arithmetic unit and said logic unit; control lines from the output of said control information storage means to said memory unit, said logic unit and said storage register; and means operative within the control information storage means for causing the transfer of either control information or data information over the common sense lines to either said control information storage means or said storage register under control of the control lines, said last-mentioned means also being operative for causing the transfer of control or data information from the storage register over the common drive lines to the memory unit, or the arithmetic unit, or the logic unit under the control of said control lines.

6. In a program controlled data processing machine having a core matrix memory unit, a core matrix arithmetic unit, a storage register, a control information storage means, common sense lines through said core matrix memory unit and said core matrix arithmetic unit connected to the input of said control information storage means and the input of said storage register, common drive lines connecting the output of said storage register through said core matrix memory unit and said core matrix arithmetic unit, control lines from the output of said control information storage means to said core matrix memory unit, said core matrix arithmetic unit and said storage register, and means operative within the control information storage means for causing the transfer of either control information or data information over the common sense lines to either said control information storage means or said storage register under the control of the control lines, said last mentioned means being operative for causing transfer of control or data information from the storage register over the common drive lines to the core matrix memory unit or core matrix arithmetic unit under control of said control lines.

7. In a program controlled data processing machine having a core matrix memory unit, a core matrix arithmetic unit, a core matrix logic unit, a matrix unit selection means, at least one distinctive drive line for each matrix unit connected to said matrix unit selection means, a storage register, a control information storage means, common sense lines through said core matrix memory unit and said core matrix arithmetic unit and said core matrix logic unit connected to the input of said control information storage means and the input of said storage register, common drive lines connecting the output of said storage register through said core matrix memory unit and said core matrix arithmetic unit and said core matrix logic unit, control lines from the output of said control information storage means to said matrix unit selection means, means for selectively transferring information over the common sense lines to any one or more of the matrix units under control of the control lines, and means for selective transfer of information from the storage register over the common drive lines to any one or more of the matrix units under control of said control lines.

8. In a program controlled data processing machine, a core matrix memory unit, a core matrix arithmetic unit, a storage register, a control information storage means, common sense lines through said memory unit and said arithmetic unit connected to the input of said control information storage means and the input of said storage register, common drive lines connecting the output of said storage register through said memory unit and said arithmetic unit; control lines from the output of said control information storage means to said memory unit, said arithmetic unit and said storage register; and means operative over the control lines under control of the control information storage means for causing the transfer of either control information or data information over the common sense lines to either said control information storage or said storage register, said last-mentioned means also being operative for causing the transfer of control or data information from the storage register over the common drive lines to the memory unit or the arithmetic unit under control of said control lines.

9. In a program controlled data processing machine, a memory unit, an arithmetic unit, said memory unit and said arithmetic unit each comprising an ordered arrangement of pulse responsive circuit elements which are controllable by impulses supplied by drive lines extending bodily through said units, and which will supply outputs in sense lines which extend bodily through said units, a storage register, an accumulator register, a control information storage means, common sense lines through said memory unit and said arithmetic unit connected to the input of said control information storage means, and the input of said storage register, and the input of said accumulator register; common first drive lines connecting the output of said storage register through said memory unit to said arithmetic unit, common second drive lines connecting the output of said accumulator register to said arithmetic unit; control lines from the output of said control information storage means to said memory unit, said arithmetic unit, said storage register, and said accumulator register; means for transferring either control information or data information over the common sense lines to one or more among said control information storage means, said accumulator register and said storage register under control of the control lines, means for controlling the transfer of data information simultaneously from the storage register over the common first drive lines to the arithmetic unit and from the accumulator reigster over said common second drive lines to the arithmetic unit under control of said control lines, said arithmetic unit performing an arithmetic operation on the information from the said two registers, and means for transferring the result over the sense lines from said arithmetic unit to said accumulator register.

10. In a program controlled data processing machine having a core matrix memory unit, a core matrix arithmetic unit, a storage register, an accumulator register, a control information storage means, common sense lines through said core matrix memory unit and said core matrix arithmetic unit connected to the input of said control information storage means, and the input of said storage register, and the input of said accumulator register, common drive lines connecting the output of said storage register through said core matrix memory unit and said core matrix arithmetic unit, second drive lines connecting the output of said accumulator register to said core matrix arithmetic unit, control lines from the output of said control information storage means to said core matrix memory unit, said core matrix arithmetic unit, said storage register, and said accumulator register, means for transferring either control information or data information over the common sense lines to one or more from among said control information storage means and said accumulator register and said storage register under control of the control lines, and means for controlling the transfer of data information simultaneously from the storage register and the accumulator register over their respective drive lines to the core matrix arithmetic unit under the control of said control lines, said arithmetic unit producing an arithmetic operation on the two sources of information and transferring the result over the sense lines to said accumulator register.

11. In a program controlled data processing machine, a plurality of functional units including a memory unit and a logic unit, said memory unit and said logic unit each comprising an ordered arrangement of pulse responsive bistable magnetic elements the magnetic states of which are controllable by drive lines magnetically coupled thereto and which are capable of inducing output pulses in sense lines magnetically coupled thereto; a storage register, a control information register, a unit output gate for each of said functional units, an input gate for each of said registers, means connecting each input gate to its associated register, common sense lines extending through and coupled to the bistable magnetic elements of said memory unit and said logic unit and connected to said control information register gate and to said storage register gate; common first drivers, means connecting the output of said storage register to said common first drivers, common drive lines extending from said common first drivers through said memory unit and said logic unit, control lines from the output of said control information register to each of said gates, common unit drivers, unit drive lines connected from the common unit drivers through each functional unit to its respective output gate, and means operative under control of the control information register and the unit drive lines and the control lines for causing the transfer of either control or data information over the common sense lines to either said control information register or said storage register, said last mentioned means also being operative for causing the transfer of control or data information from the storage register over the common drive lines to the memory unit or the logic unit under control of said control lines and unit drive lines.

12. In a program controlled data processing machine having a core matrix memory unit, a core matrix logic unit, a storage register, a control information storage means, a unit gate for each of said matrix units, a gate for each of said registers, means connecting each gate to its associated register, common sense lines through said core matrix memory unit and said core matrix logic unit connected to said control information storage means gate and said storage register gate, common first drivers, common first drive lines connecting the output of said storage register through said common first drivers to said core matrix memory unit and said core matrix logic unit, control lines from the output of said control information storage means to each of said gates, common unit drivers, unit drive lines connected from the common drivers through each said matrix unit to its respective gate, and means operative within the control information storage means for causing the transfer of either control or data information over the common sense lines to either said control information storage or said storage register under control of the control lines and the unit drive lines, said last mentioned means being operative for causing the transfer of control or data information from the storage register over the common first drive lines to the core matrix memory unit or core matrix logic unit under the control of said control lines and unit drive lines.

13. In a program controlled data processing machine having a core matrix memory unit, a core matrix arithmetic unit, a storage register, an accumulator register, a program address register, an operation control register, common lower order sense lines through said core matrix memory unit and said core matrix arithmetic unit connected to the input of said program address register and the lower order of the storage register and the accumulator register, common higher order sense lines connected to the input of the operation control unit and the higher orders of the storage register and the accumulator register, common first drive lines connecting the lower order output of the storage register through the memory matrix unit and the lower orders of the core matrix arithmetic unit, common second drive lines from the higher orders of the storage register to the higher orders of the core matrix arithmetic unit, additional drive means for said core matrix arithmetic unit including third drive lines extending through said core matrix arithmetic unit, means connecting said additional drive means to both said accumulator register and said program address register to said additional drive means so that information from either said accumulator register or said program address register may be transmitted over said third drive lines to the core matrix arithmetic unit, means connecting said program address register to said memory unit to control memory address, and means connected from the operation control unit to each of said other units to control the transfer of information between units over the sense and drive lines.

14. In a program controlled data processing machine, a plurality of functional units including a core matrix memory unit, a core matrix arithmetic unit, and a core matrix logic unit; a storage register, an accumulator register, a control information register, an output gate for each of said functional units, an input gate for each of said registers, means connecting each gate to its associated device, common sense lines passing through said memory unit, said arithmetic unit, and said logic unit and connected to said control information register input gate, said accumulator register input gate, and said storage register input gate; common first inhibit drivers, common first inhibit drive lines connecting the output of said storage register through said common first inhibit drivers to said memory unit, to said arithmetic unit, and to said logic unit; common second inhibit drivers, common second inhibit drive lines connecting the output of said accumulator register through said second drivers ot said arithmetic unit; a plurality of control means actuated by said control information register, control lines from said control means to each of said gates; common unit drivers, unit drive lines connected from the common unit driver through each said functional unit to its respective gate, said control means being operative for causing the transfer of either control or data information over the common sense lines to either said control information register, said accumulator register, or said storage register under the control of the control lines and the unit drive lines; said control means being operative for causing the transfer of control or data information from the storage register over the common first inhibit drive lines to the memory unit, the arithmetic unit, or said logic unit under control of said control lines and unit drive lines, said control means also being operative for causing the transfer of control or data information from the accumulator register over the second inhibit drive lines to the arithmetic unit.

References Cited in the file of this patent

UNITED STATES PATENTS

| | | |
|---|---|---|
| 2,604,262 | Phelps et al. | July 22, 1952 |
| 2,897,482 | Rosenberg | July 28, 1959 |
| 2,901,735 | Lawrence | Aug. 25, 1959 |
| 2,937,364 | Rosenberg | May 17, 1960 |
| 2,939,119 | Einsele | May 31, 1960 |
| 2,954,168 | Maddox | Sept. 27, 1960 |
| 2,962,213 | Namian | Nov. 29, 1960 |
| 2,966,305 | Rosenberger | Dec. 17, 1960 |
| 2,967,296 | Chien et al. | Jan. 3, 1961 |
| 2,978,175 | Newman et al. | Apr. 4, 1961 |
| 2,985,865 | Merz | May 23, 1961 |
| 3,001,708 | Glaser et al. | Sept. 26, 1961 |
| 3,018,961 | Ward | Jan. 30, 1962 |